United States Patent
Kodama et al.

(10) Patent No.: US 7,454,069 B2
(45) Date of Patent: Nov. 18, 2008

(54) IMAGE PROCESSING APPARATUS, IMAGE COMPRESSING APPARATUS, IMAGE DECOMPRESSING APPARATUS, IMAGE PROCESSING METHOD, IMAGE COMPRESSING METHOD, IMAGE DECOMPRESSING METHOD, INFORMATION PROCESSING APPARATUS, INFORMATION PROCESSING METHOD, PROGRAM AND RECORDING MEDIUM

(75) Inventors: Taku Kodama, Kanagawa (JP); Junichi Hara, Kanagawa (JP); Nekka Matsuura, Kanagawa (JP); Takanori Yano, Kanagawa (JP); Toshio Miyazawa, Kanagawa (JP); Yasuyuki Shinkai, Kanagawa (JP); Hiroyuki Sakuyama, Tokyo (JP); Yasuyuki Nomizu, Kanagawa (JP); Takayuki Nishimura, Tottori (JP); Keiichi Suzuki, Tokyo (JP); Takashi Maki, Kanagawa (JP); Ikuko Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 894 days.

(21) Appl. No.: 10/717,090

(22) Filed: Nov. 20, 2003

(65) Prior Publication Data

US 2004/0156548 A1 Aug. 12, 2004

(30) Foreign Application Priority Data

| Nov. 20, 2002 | (JP) | ............................. 2002-336022 |
| Feb. 13, 2003 | (JP) | ............................. 2003-034548 |
| Feb. 19, 2003 | (JP) | ............................. 2003-041529 |
| Sep. 29, 2003 | (JP) | ............................. 2003-338079 |

(51) Int. Cl.
*G06K 9/36* (2006.01)
(52) U.S. Cl. ...................... 382/232; 382/240
(58) Field of Classification Search ................. 382/100, 382/166, 232, 233, 240; 713/160, 161; 380/54
See application file for complete search history.

(56) References Cited

U.S. PATENT DOCUMENTS

| 5,764,807 | A  | * | 6/1998 | Pearlman et al. ............ 382/240 |
| 6,192,139 | B1 | * | 2/2001 | Tao ............................ 382/100 |
| 6,571,071 | B2 |   | 5/2003 | Kanoshima et al. ........... 399/79 |
| 6,674,982 | B2 |   | 1/2004 | Saitoh et al. ................. 399/110 |

(Continued)

FOREIGN PATENT DOCUMENTS

JP 7-203198 8/1995

(Continued)

OTHER PUBLICATIONS

U.S. Appl. No. 10/390,193, filed Mar. 14, 2003, Sakuyama, Hiroyuki.

(Continued)

*Primary Examiner*—Duy M Dang
(74) *Attorney, Agent, or Firm*—Oblon, Spivak, McClelland, Maier & Neustadt, P.C.

(57) ABSTRACT

A code stream generating part converts image data into two-dimensional wavelet coefficients, quantizes the same and coding the quantization result so as to compress the image data and generate a code stream. An additional information creating part creates additional information concerning the image data, and an additional information embedding part embeds the thus-created additional information into the code stream as a code in an off-rule zone which is not decoded by a JPEG 2000 standard rule.

29 Claims, 57 Drawing Sheets

U.S. PATENT DOCUMENTS

| | | | |
|---|---|---|---|
| 7,158,679 B2 * | 1/2007 | Sano et al. | 382/232 |
| 2001/0050778 A1 | 12/2001 | Fukuda et al. | |
| 2002/0154826 A1 | 10/2002 | Okada | 382/240 |
| 2002/0159644 A1 | 10/2002 | Sakuyama | |
| 2002/0171743 A1 | 11/2002 | Kimizuka et al. | 348/222.1 |
| 2003/0095272 A1 | 5/2003 | Nomizu | |
| 2003/0099373 A1 * | 5/2003 | Joo et al. | 382/100 |
| 2003/0137695 A1 | 7/2003 | Nomizu | |
| 2005/0129268 A1 * | 6/2005 | Maeno et al. | 382/100 |

FOREIGN PATENT DOCUMENTS

| | | |
|---|---|---|
| JP | 2001-43239 | 2/2001 |
| JP | 2001-218067 | 8/2001 |
| JP | 2002-247580 | 8/2002 |
| JP | 2003-37740 | 2/2003 |

OTHER PUBLICATIONS

U.S. Appl. No. 10/390,263, filed Mar. 14, 2003, Kodama, Taku.
U.S. Appl. No. 10/372,479, filed Feb. 21, 2003, Nomizu, Yasuyuki.
U.S. Appl. No. 10/348,444, filed Jan. 21, 2003, Nomizu.
U.S. Appl. No. 10/283,350, filed Oct. 30, 2002, Nomizu.
U.S. Appl. No. 10/082,308, filed Feb. 26, 2002, Sakuyama.
U.S. Appl. No. 09/847,192, filed May 2, 2001, Fukuda et al.
U.S. Appl. No. 09/821,248, filed Mar. 30, 2001, Seki et al.
U.S. Appl. No. 09/846,244, filed May, 2, 2001, Shogi et al.
U.S. Appl. No. 09/855,665, filed May 16, 2001, Yamagata et al.
U.S. Appl. No. 09/912,364, filed Jul. 26, 2001, Sakuyama.
U.S. Appl. No. 09/940,589, filed Aug. 29, 2001, Inoue et al.
U.S. Appl. No. 09/964,584, filed Sep. 28, 2001, Shinkai et al.
U.S. Appl. No. 10/102,633, filed Mar. 22, 2002, Ameyama et al.
U.S. Appl. No. 10/156,093, filed May 29, 2002, Sano et al.
U.S. Appl. No. 10/164,545, filed Jun. 10, 2002, Sano et al.
U.S. Appl. No. 10/272,857, filed Oct. 18, 2002, Watanabe et al.
U.S. Appl. No. 10/330,349, filed Dec. 30, 2002, Seki et al.
U.S. Appl. No. 10/379,533, filed Mar. 6, 2003, Takeyama et al.
U.S. Appl. No. 10/461,399, filed Jun. 16, 2003, Sugiura et al.
U.S. Appl. No. 10/600,333, filed Jun. 23, 2003, Suino et al.
U.S. Appl. No. 10/609,577, filed Jul. 7, 2003, Nakajima et al.
U.S. Appl. No. 10/717,090, filed Nov. 28, 2003, Kodama et al.
U.S. Appl. No. 10/717,090, filed Nov. 20, 2003, Kodama et al.
U.S. Appl. No. 10/986,781, filed Nov. 15, 2004, Matsuura et al.
U.S. Appl. No. 12/047,839, filed Mar. 13, 2008, Kodama.

* cited by examiner

0LL
(ORIGINAL IMAGE TILE)

DECOMPOSITION_LEVEL_0

DECOMPOSITION_LEVEL_1

DECOMPOSITION_LEVEL_2

DECOMPOSITION_LEVEL_3

DECOMPOSITION LEVEL 1

FIG.5D

|  | -84 | -84 | -77 | -79 |
|---|---|---|---|---|
| LAYER # = 0 | − | − | − | − |
| LAYER # = 1 | 1 | 1 | 1 | 1 |
|  | 0 | 0 | 0 | 0 |
|  | 1 | 1 | 0 | 0 |
| LAYER # = 2 | 0 | 0 | 1 | 1 |
| LAYER # = 3 | 1 | 1 | 1 | 1 |
|  | 0 | 0 | 0 | 1 |
|  | 0 | 0 | 1 | 1 |

|  |  |  |  |  |
|---|---|---|---|---|
| 1 | -1 | 8 | 4 | ← COEFFICIENT VALUE |
| + | − | + | + | ← COEFFICIENT SIGN (MSB) |
| 0 | 0 | 0 | 0 | ⎫ |
| 0 | 0 | 0 | 0 | ⎪ COEFFICIENT |
| 0 | 0 | 0 | 0 | ⎬ ABSOLUTE VALUE |
| 0 | 0 | 1 | 0 | ⎪ |
| 0 | 0 | 0 | 1 | ⎪ |
| 0 | 0 | 0 | 0 | ⎪ |
| 1 | 1 | 0 | 0 | ⎭ (LSB) |

| -1 | 0 | -1 | -5 |
|---|---|---|---|
| − | 0 | − | − |
| 0 | 0 | 0 | 0 |
| 0 | 0 | 0 | 0 |
| 0 | 0 | 0 | 0 |
| 0 | 0 | 0 | 0 |
| 0 | 0 | 0 | 1 |
| 0 | 0 | 0 | 0 |
| 1 | 0 | 1 | 1 |

| 2 | 2 | -2 | 4 |
|---|---|---|---|
| + | + | − | + |
| 0 | 0 | 0 | 0 |
| 0 | 0 | 0 | 0 |
| 0 | 0 | 0 | 0 |
| 0 | 0 | 0 | 0 |
| 0 | 0 | 0 | 1 |
| 1 | 1 | 1 | 0 |
| 0 | 0 | 0 | 0 |

1HH

FIG.8A
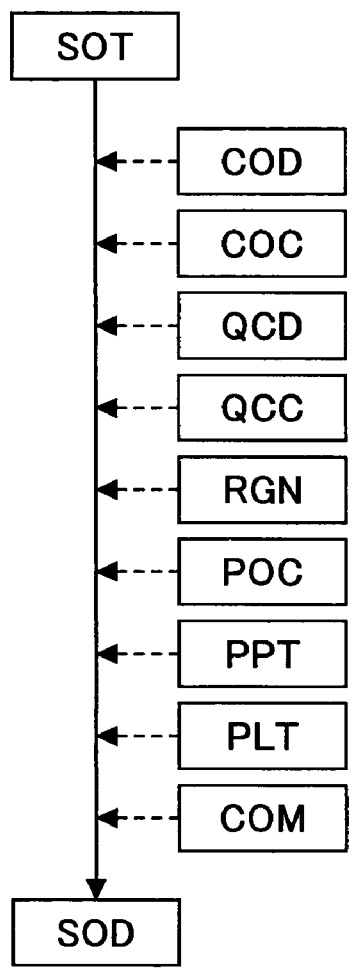
FIG.8B
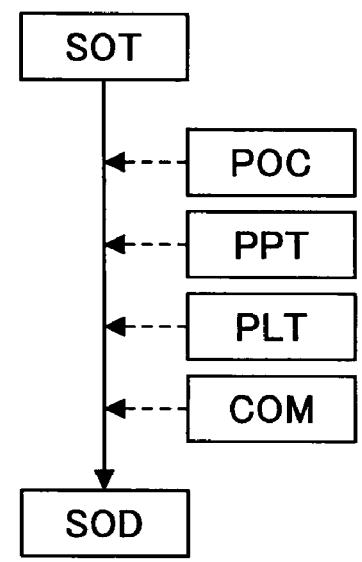
FIG.9
| SOT | Lsot | Isot | Psot | TPsot | TNsot |

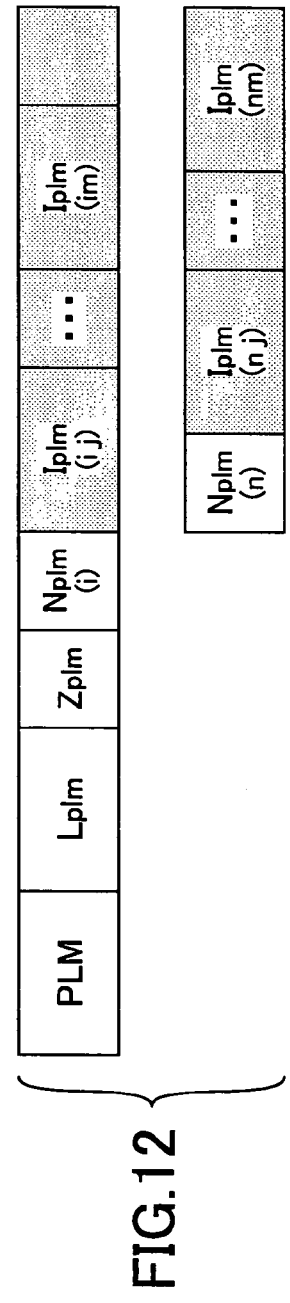

TILE-PART HEADER

TILE-PART LENGTH (SOT (Psot))

TILE-PART HEADER · EMBEDDING INFORMATION (ADDITIONAL INFORMATION)

TILE-PART LENGTH (SOT (Psot))

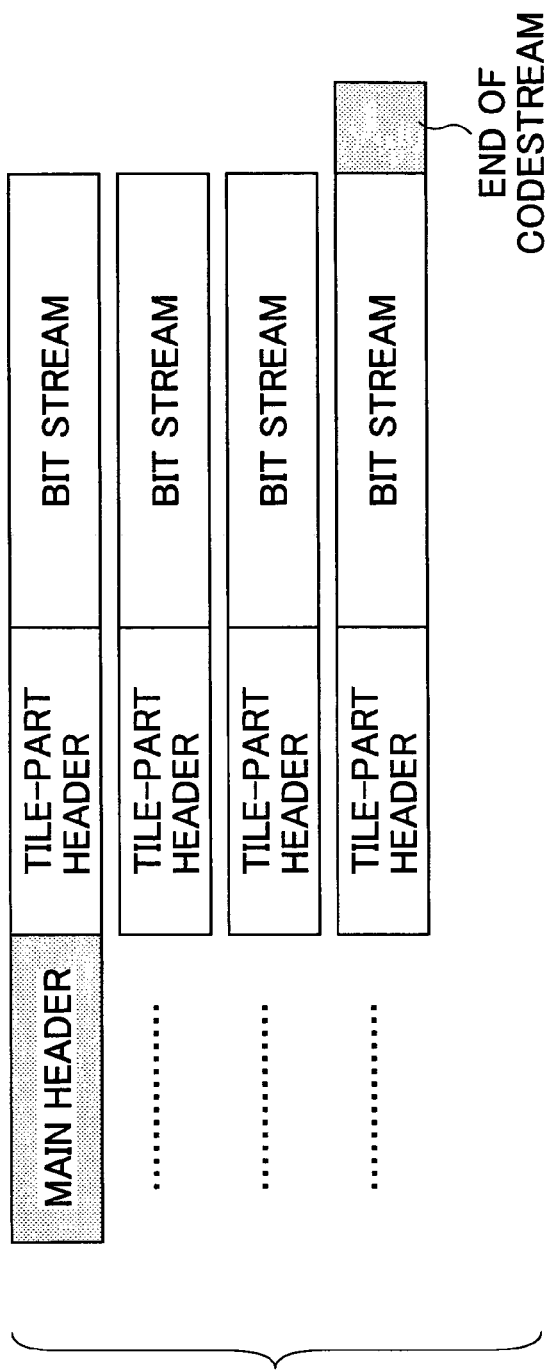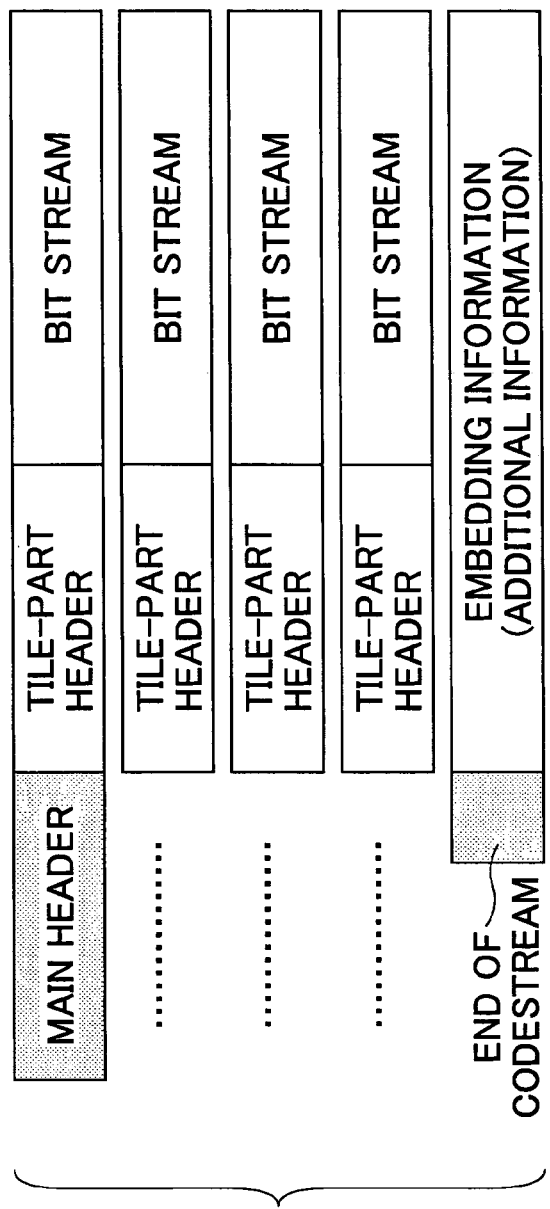
FIG.23A
FIG.23B

ORIGINAL RGB IMAGE (S201)  COLOR CONVERSION (S202)  WAVELET TRANSFORM (S203)  PROGRESSIVE SUB-BIT-PLANE CODING (S204)  ENTROPY CODING (S205)

DECOMPOSITION_LEVEL_0

DECOMPOSITION_LEVEL_1

DECOMPOSITION_LEVEL_2

DECOMPOSITION_LEVEL_3

| DISPLAY DEVICE (bps) | THUMBNAIL |
|---|---|
| DIGITAL CAMERA | CENTER TILE<br>LAYER 3 |
| IMAGE VIEWER SOFTWARE | DECOMPOSITION LEVEL 3<br>LAYER 5 |
| CELLULAR PHONE | DECOMPOSITION LEVEL 5 |
| DIGITAL VIDEO CAMERA | FRAME NUMBER: 2N+1<br>DECOMPOSITION LEVEL 3 |
| TV BROADCAST | ALL FRAMES<br>TILES 6, 7, 10, 11<br>DECOMPOSITION LEVEL 3 |
| HIGH-VISION BROADCAST | ALL FRAMES<br>DECOMPOSITION LEVEL 3 |

FIG.44

TAG DESCRIPTION LEVEL (2) – 0th IFD Exit Private Tag –

| TAG NAME | Field Name | TAG NUMBER Dec | TAG NUMBER Hex | NON-COMPRESSION POINT ORDER | NON-COMPRESSION PLANE ORDER | NON-COMPRESSION YCC | COMPRESSION |
|---|---|---|---|---|---|---|---|
| EXPOSURE TIME | ExposureTime | 33434 | 829A | △ | △ | △ | △ |
| F NUMBER | FNumber | 33437 | 829D | △ | △ | △ | △ |
| EXPOSURE PROGRAM | ExposureProgram | 34850 | 8822 | △ | △ | △ | △ |
| SPECTRAL SENSITIVITY | SpectralSensitivity | 34852 | 8824 | △ | △ | △ | △ |
| ISO SPEED RATE | ISOSpeedRatings | 34855 | 8827 | △ | △ | △ | △ |
| PHOTOELECTRIC CONVERSION FUNCTION | OECF | 34856 | 8828 | △ | △ | △ | △ |
| EXIF VERSION | ExifVersion | 36864 | 9000 | ◎ | ◎ | ◎ | ◎ |
| ORIGINAL IMAGE DATA CREATED DATE | DateTimeOriginal | 36867 | 9003 | △ | △ | △ | △ |
| DIGITAL DATA CREATED DATE | DateTimeDigitized | 36868 | 9004 | △ | △ | △ | △ |
| MEANING OF EACH COMPONENT | ComponentsConfiguration | 37121 | 9101 | × | × | × | ◎ |
| IMAGE COMPRESSION MODE | CompressedBitsPerPixel | 37122 | 9102 | × | × | × | △ |
| SHUTTER SPEED | ShutterSpeedValue | 37377 | 9201 | △ | △ | △ | △ |
| APERTURE VALUE | ApertureValue | 37378 | 9202 | △ | △ | △ | △ |
| BRIGHTNESS VALUE | BrightnessValue | 37379 | 9203 | △ | △ | △ | △ |
| EXPOSURE CORRECTION VALUE | ExposureBiasValue | 37380 | 9204 | △ | △ | △ | △ |
| LENS MINIMUM F NUMBER | MaxApertureValue | 37381 | 9205 | △ | △ | △ | △ |
| SUBJECT DISTANCE | SubjectDistance | 37382 | 9206 | △ | △ | △ | △ |
| PHOTOMETRIC METHOD | MeteringMode | 37383 | 9207 | △ | △ | △ | △ |
| LIGHT SOURCE | LightSource | 37384 | 9208 | △ | △ | △ | △ |
| FLASH | Flash | 37385 | 9209 | △ | △ | △ | △ |
| LENS FOCAL LENGTH | FocalLength | 37386 | 920A | △ | △ | △ | △ |
| MANUFACTURER'S NOTES | MakerNote | 37500 | 927C | △ | △ | △ | △ |
| USER'S COMMENTS | UserComment | 37510 | 9286 | △ | △ | △ | △ |
| SUB SEC OF DATE TIME | SubSecTime | 37520 | 9290 | △ | △ | △ | △ |
| SUB SEC OF DATE TIME ORIGINAL | SubSecTimeOriginal | 37521 | 9291 | △ | △ | △ | △ |
| SUB SEC OF DATE TIME DIGITIZED | SubSecTimeDigitized | 37522 | 9292 | △ | △ | △ | △ |
| FLASH PIX VERSION | FlashPixVersion | 40960 | A000 | ◎ | ◎ | ◎ | ◎ |
| COLOR SPACE INFORMATION | ColorSpace | 40961 | A001 | ◎ | ◎ | ◎ | ◎ |
| EFFECTIVE IMAGE WIDTH | PixelXDimension | 40962 | A002 | × | × | × | ◎ |
| EFFECTIVE IMAGE HEIGHT | PixelYDimension | 40963 | A003 | × | × | × | ◎ |
| RELATED SOUND FILE | RelatedSoundFile | 40964 | A004 | △ | △ | △ | △ |
| POINTER FOR INTEROPERABILITY IFD | Interoperability IFD Pointer | 40965 | A005 | × | × | × | △ |
| FLASH ENERGY | FlashEnergy | 41483 | A20B | △ | △ | △ | △ |
| SPATIAL FREQUENCY RESPONSE | SpatialFrequencyResponse | 41484 | A20C | △ | △ | △ | △ |
| FOCAL PLANE WIDTH RESOLUTION | FocalPlaneXResolution | 41486 | A20E | △ | △ | △ | △ |
| FOCAL PLANE HEIGHT RESOLUTION | FocalPlaneYResolution | 41487 | A20F | △ | △ | △ | △ |
| FOCAL PLANE RESOLUTION UNIT | FocalPlaneResolutionUnit | 41488 | A210 | △ | △ | △ | △ |
| SUBJECT LOCATION | SubjectLocation | 41492 | A214 | △ | △ | △ | △ |
| EXPOSURE INDEX | ExposureIndex | 41493 | A215 | △ | △ | △ | △ |
| SENSOR METHOD | SensingMethod | 41495 | A217 | △ | △ | △ | △ |
| FILE SOURCE | FileSource | 41728 | A300 | △ | △ | △ | △ |
| SCENE TYPE | SceneType | 41729 | A301 | △ | △ | △ | △ |
| CFA PATTERN | CFAPattern | 41730 | A302 | △ | △ | △ | △ |

MEANING OF SYMBOL:
◎ MANDATORY (WHICH SHOULD BE DESCRIBED)
○ SEMI-MANDATORY (WHICH SHOULD BE DESCRIBED UNLESS LIMITATION DUE TO HARDWARE OR SO)
△ OPTIONAL (DESCRIBED AS NEEDED ACCORDING TO PARTICULAR DEVICE)
× NOT BE DESCRIBED
※ NOT BE DESCRIBED SINCE DESCRIBED IN JPEG MARKER

FIG.62

| EMBEDDING INFORMATION | | |
|---|---|---|
| IMAGE ATTRIBUT<br>EMBED ORIGINAL IMAGE INFORMATION TO EXTRACTED IMAGE<br>EMBED EXTRACTED IMAGE INFORMATION TO ORIGINAL IMAGE | SIZE | |
| | CRATED DATE/TIME | |
| | UPDATED DATE/TIME | |
| | COMMENTS | |
| | ACCESS DATE/TIME | |
| | POSSESSOR | |
| | CREATOR | |
| | TITLE | |
| | SUBJECT | |
| | CATEGORY | |
| | NUMBER OF PAGES | |
| | COPYRIGHT | |
| | COMPANY NAME | |
| | APPLIED SOFTWARE | |
| | COMPRESSION METHOD | JPEG、J2K、GIF、... |
| | COMPRESSION CONDITION: | IMAGE SIZE, POSITION OFFSET |
| | | TILE SIZE, OFFSET |
| | | PRECINCT SIZE |
| | | CODE BLOCK SIZE |
| | | PROGRESSION ORDER |
| | | NUMBER OF LAYERS |
| | | COLOR TRANSFORM |
| | | NUMBER OF LEVELS |
| | | QUANTIZATION PARAMETER |
| SENDER, RECEIVER<br>SERVER, CLIENT | NAME | |
| | PC NAME | URL, IP ADDRESS |
| | TRANSFER METHOD | TCP/IP、HTTP、FTP |
| | DATE/TIME | |
| EXTRACTION CONDI TON | TILE NUMBER | |
| | PACKET NUMBER | |
| | EXTRACTING PACKET COMPONENT | RESOLUTION |
| | | COLOR COMPONENT |
| | | PRECINCT |
| | | LAYER |
| | EXTRACTION TIME | |

IMAGE PROCESSING APPARATUS, IMAGE COMPRESSING APPARATUS, IMAGE DECOMPRESSING APPARATUS, IMAGE PROCESSING METHOD, IMAGE COMPRESSING METHOD, IMAGE DECOMPRESSING METHOD, INFORMATION PROCESSING APPARATUS, INFORMATION PROCESSING METHOD, PROGRAM AND RECORDING MEDIUM

BACKGROUND OF THE INVENTION

1. Field of the Invention

The present invention relates to an image information handling technology, and, in particular, to an image processing apparatus, an image compressing apparatus, an image decompressing apparatus, an image compressing method, an image processing method, an image decompressing method, an information processing apparatus, an information processing method, a program for causing a computer to achieve image the information handling scheme, and a recording medium storing therein the program.

2. Description of the Related Art

Recently, development in image input/output technology is remarkable. For example, a copier employs a digital information processing technology rather than an analog manner, so that various types of image handling manners are available. Furthermore, in addition to a copying function, a printer function, a facsimile function and so forth may be applied together. Such a machine is called a composite machine (MFP: multi-function printer) or so, and has been in widespread use in the market.

In such a composite machine, in order to save a memory capacity, a high-definition image compressing/decompressing technology such as that of JPEG (joint photographic experts group) 2000 may be applied. Thereby, image data read in, with a scanner is once compressed into code data, which is then stored in a memory. After that, in a reverse procedure, the code data is decompressed into image data, which is then output to a printer device. Then, the printer device performs printing operation therewith.

Further, in such a composite machine, for the purpose of reuse copy documents, printing documents, facsimile documents, or so may be once registered in a memory.

In view of such a situation, and also, in view of the necessity of increase in available memory capacity, creation of image database (image server) is advantageous in such a composite machine which thus has a capacity of storing a large amount of image data. Specifically, the image database may be built storing various types of image data while such image data is input by reading in, via a scanner or so, necessarily, along with a routine copying operation, facsimile transmission operation and so forth.

In fact, various types of devices are connected to a communication network such as the Internet recently for the purpose of utilization of the network environment for which base technology has been developed remarkably as being well known. The above-mentioned MFP is one of them, and, may not be connected to a personal computer directly but via the network. Then, in such a case, the MFP operates according to instructions given via the network, and thus, may act as a part of a total image server system.

For example, as an expected business model, by effective utilization of the functions of the MFP to the fullest extent, a server of a publishing firm which dispatches various types of image data via the Internet, may have an image database (image server) such as that mentioned above in which, in use of the MFP or so, image data is stored in a form of digital data. Then, therefrom, electronic data is dispatched free of charge or with some charge via the Internet. Especially, thanks to a high-definition image compressing/decompression technology such as that of JPEG 2000, lossless compression/decompression can be easily achieved, and, thus, each user can obtain a high-definition image reproduced on hand very equivalent to that stored in the server. Thus, such a business model may be easily achieved.

On the other hand, in such an MFP (multi-function printer), especially in a full-color MFP, a demand for improvement in printing quality of color images has been increased. Especially, a demand for achieving true black and sharp printing of black characters (letters) or black fine lines has been increased even in color images. In fact, when a black image is decomposed in terms of color, as a signal for reproducing black, respective signals of yellow, magenta, cyan, and black should be generated. However, actually, upon reproducing black by overlapping these respective primary colors, color blurring may occur due to positional error among the respective colors. Such a phenomenon may be remarkable especially in case of printing black fine lines or thin lines, and thereby, the originally black lines may not appear as those of true black or sharp definition may not be achieved, accordingly. As a result, the printing quality may be remarkably degraded.

In order to cope with such a problematic situation, the following technology may be applied, for example: Line generating components and halftone dot components are separated from color image data (referred to as image area classification or so), characters (letters) and line drawings are thus extracted from an original image, thickness or color saturation of the characters and line drawings are determined respectively, and, then, based on these determination results, predetermined image processing is performed. As to such a technology, see Japanese laid-open patent application No. H07-203198, for example. Thereby, the thickness of lines of the characters or line drawings may be changed gradually, and, thus, it becomes possible to avoid degradation in image quality which may otherwise occur upon reproduction of black fine lines/thin lines as mentioned above.

However, in such a high-definition image processing environment, assuming that an image server (image database) system is build as mentioned above as in an expected business model, as image data handled there is digital one, with utilization of features of the technology of JPEG 2000 in which lossless compression/decompression can be easily achieved as mentioned above, illegal copy or illegal tamper may be made at a user end. Such an issue in terms of copyright protection should be effectively coped with (first problem).

Furthermore, in case of performing image area classification or so mentioned above with the art of Japanese laid-open patent application No. H07-203198, information obtained there such as the determination results concerning the thickness or color saturation, which may be called 'management information' for managing the relevant image data, is in many case stored in a location different from a location in which the relevant image data is stored.

In fact, in case of reading an original image via a scanner of an MFP, compressing the thus-obtained image data according to the technology of JPEG 2000 algorithm, and storing the thus-compressed code data into a memory, some image degradation may occur during the compression process. Thereby, sharpness in an edge portion of an image may be degraded in the image data, for example. In case where such an edge sharpness degradation or so occurs, a problem such as erroneous detection of edge portion may occur upon reuse of the image data with a personal computer or so. If the above-mentioned 'management information' or so may be utilized, such a problem may be effectively solved. However, if the management information is stored in a location separately from the relevant image data, it may not be available at the occasion (second problem)

Thanks to JPEG technology, high-definition images may be easily obtained via an input device such as a digital still camera, a scanner, or so, and also, via an output device such as an ink-jet printer, a display device or so which apply the JPEG 2000 technology. According to conventional JPEG, basically in order to remove redundancy in space domain, two-dimensional cosine transform is applied.

Basically, this technology enables simply compressing and decompressing a still image. Accordingly, basically, it is not possible to manipulate an image or decompress so as to reproduce only a part of an image in a form of a compressed file. Further, basically, this technology handles image data by treating it as a flat structure, and, thus, it is necessary to completely decode the compressed code data once, for the purpose of making some modification of so on the image.

Furthermore, according to conventional JPEG, basically, along with increase in image definition or image size, in other words, increase in the number of pixels included, a time required for decompressing the relevant image data for the purpose of actually displaying the image on a display device increases accordingly. Especially, due to increase in image inputting performance of the above-mentioned input device, an image thus-obtained has an increased definition or increased size recently. Furthermore, in a technical field of handling satellite photographs or aerial photographs, a field of handling images of medical or science field, or a field of handling images of cultural property, the above-mentioned problem of increase in time required for decompressing the code data for actually displaying the relevant image on the display device or so may have already become a serious problem to be solved absolutely. According to conventional JPEG, basically, the time required for decompression is fixed regardless of the rate of size reduction which may have to be performed so as to make the thus-reproduced image adapt to the particular performance of the actually applied display device. This is because, as mentioned above, regardless of how to process the image data decompressed, the code data which was coded according to JPEG should be completely decompressed once.

In fact, it is difficult to display the entirety of an image having such an increased size or definition on a display device at hand since the particular display device has its limit of reproducing the number of pixels. Actually, as mentioned above, the image data decompressed is reduced so that the data may adapt to the particular performance of the display device applied. On the other hand, also as mentioned above, the code data should be once decompressed completely according to conventional JPEG technology. The time required for decompression depends on the number of pixels, and minutes or tens of minutes may be required in general until the relevant image can be actually displayed on the display device.

Furthermore, according to the conventional JPEG algorithm, even when a user does not necessarily wish to use the image data which is obtained from completely decompressing the given code data, the decompression should be performed completely. In the decompression process, the order of data processing cannot be controlled, i.e., a position of a given image, a color component of the image, a process of a predetermined series of processes, which should be processed first, cannot be controlled. Therefore, even a user wishes to merely obtain a grayscale image from an originally color image, or wishes to merely obtain a particular position of an original image, merely view a thumbnail image, view at high speed a series of motion picture frame images, or so, the compete decompression is needed each case according to the conventional JPEG technology.

In order to solve this problem, the applicant of the present application proposed an art by which a time required for decompression can be reduced, i.e., coded high-definition image data of still image or a motion picture made of a series of still images can be displayed at high speed. In this technology, according to a novel code sequence production function, an image area or a color component to be decompressed is defined, or the order of decompression operation to be performed is controlled, so that the image decompression can be performed efficiently. In other words, a decompression operation to be performed is defined.

For example, in an image display device, an image thumbnail is displayed often. According to the conventional art, for the purpose of displaying an image thumbnail, decompression for the entire original image is performed first, and, after that, the resolution thereof is reduced. In another method, a thumbnail is previously prepared and is stored for an occasion in which it is actually displayed. In any method, according to the JPEG standard, image compression/decompression is performed in use of a basic function of the standard or an expanded function. As the expanded function, the above-mentioned technology proposed by the applicant of the present application may be applied.

However, in case of outputting, i.e., displaying, printing or transmission of a thumbnail image, a considerable time is required when the above-mentioned method of once decompressing code data for the entire image and after that reducing the resolution thereof is applied.

In case of applying the above-mentioned method in which such a thumbnail image is stored previously, and is read out in a occasion of actual use thereof for display or so, a method may be applied in general in which the substantial data of the thumbnail image itself is written in a header portion of the compressed data of the original image as is standardized in Exif (exchangeable image file format) or so. In this method, a time required for achieving a display of the thumbnail image can be effectively reduced. However, the entire data amount of the compressed data increases accordingly by the amount of the substantial data of thumbnail (third problem).

On the other hand, the above-mentioned JPEG 2000 scheme (ISO/IEC FCD 15444-1) has been standardized as a next generation image coding scheme of JPEG. According to JPEG 2000, an image is stored with maintaining a high-definition condition thereof, and, then, a specific resolution image part or a specific image-quality image part may be extracted therefrom. Thereby, output (display, printing or transmission) of a thumbnail image or so can be easily achieved at high speed. As a result, the number of cases where such thumbnail images are actually used may increase further.

In case of achieving a display of a thumbnail image in a digital still camera or so in use of a once compressed or divided image file (code data) which is obtained through a process of the JPEG 2000, it is necessary to reduce the file size of the image data accordingly. Such a process of reducing the image file size, i.e., re-compressing the image size, or extracting a divisional part of image data once divided for the purpose of reuse thereof is performed in many cases.

In such an occasion in which a partial extracted data obtained from re-compression or division is reused, an image file of the thus-obtained partial extracted data may be copied for the use. In such a case, the remaining part of the original image may be lost as will be described later. After that, however, a desire may occur in some case in a user to reuse the entire original image file which also includes the part thereof which is once lost as mentioned above. For example, the user may wish to obtain a high-definition version or a large-size version of the image to be printed out or so in a later occasion. However, in case the user possesses only the image file of the thumbnail image which was once reduced in the file size as mentioned above, such a desire cannot be satisfied easily. Such a problem may occur not only in a case where once re-compressed image data file is taken out but also a case where once simply compressed image data is taken out partially by a user (fourth problem).

SUMMARY OF THE INVENTION

A first object of the present invention is to solve the above-mentioned first and second problems, and to achieve a coding scheme in which illegal copy or illegal tamper of image data may be effectively avoided, or management of an image file for the purpose of reuse of once obtained management information may be positively achieved.

For the purpose of achieving this object, according to a first aspect of the present invention, an image processing apparatus includes: a code stream generating part converting image data into two-dimensional wavelet coefficients, quantizing the same and coding the quantization result so as to compress the image data and generate a code stream; additional information creating part creating additional information concerning the image data; and an additional information embedding part embedding the thus-created additional information into the code stream as a code in an off-rule zone which is not decoded by a JPEG 2000 standard rule.

Thus, in the code stream, additional information produced in connection with the image data is embedded as a code in the off-rule zone which is not decoded according to JPEG 2000 standard rule. Thereby, it is possible to utilize the additional information as hidden information, and thus, by producing the additional information according to a particular object as needed, it can be used for effectively avoiding tamper, or for a use of image management.

According to a second aspect of the present invention, a terminating code providing part is provided for forcibly providing a terminating code at a position before a code length position which is defined by header information, wherein: a zone defined by the position at which the terminating code is provided through the code length position is determined as the off-rule zone.

According to JPEG 2000 standard rule, the code length is described in the header. However, if a predetermined terminating code such as 0xFFFF occurs even at a position within the code length, this position can be made to be recognized as the termination position by a drive. Thereby, the drive does not decode the data which occurs after the position of the above-mentioned terminating code, and, thus, skips the range of data. Thus, such an area thus created can be used as the off-rule zone in which the additional information is embedded since such an area can not be easily changed by an end user. Accordingly, it becomes possible to embed the additional information which may be used for effectively avoiding tamper or avoiding illegal copy.

According to a third aspect of the present invention, the above-mentioned terminating code providing part provides the terminating code in a main header area of the code stream.

Thus, by providing the terminating code in the main header area in the code stream, the off-rule zone can be easily created as mentioned above.

According to a fourth aspect of the present invention, the above-mentioned terminating code providing part provides the terminating code before the code length position defined by a PLM marker which describes a main header packet length.

Thus, further specifically, by utilizing the PLM marker describing the main header packet length, the above-mentioned third aspect can be easily achieved. Especially, for the purpose of avoiding tamper, it becomes possible to achieve a control for each packet unit.

According to a fifth aspect of the present invention, in the above-mentioned third aspect of the present invention, the terminating code providing part provides the terminating code before the code length position defined by a TLM marker which describes a main header tile length.

Thereby, more specifically, by utilizing the TLM marker describing main header tile part length, the above-mentioned third aspect can be easily achieved. Especially, for the purpose of avoiding tamper, it becomes possible to achieve a control for each tile unit.

According to a sixth aspect of the present invention, in the above-mentioned third aspect of the present invention, the terminating code providing part provides the terminating code before the code length position defined by a PPM marker which collectively describes main header packet headers in summary.

Thereby, more specifically, by utilizing the PPM marker collectively describing main header packet headers, the above-mentioned third aspect can be easily achieved. Especially, for the purpose of avoiding tamper, it becomes possible to achieve a control for each packet unit.

According to a seventh aspect of the present invention, in the above-mentioned third aspect of the present invention, the terminating code providing part provides the terminating code before the code length position defined by a COM marker for comments.

Thereby, more specifically, by utilizing the COM marker for comments, the above-mentioned third aspect can be easily achieved.

According to an eighth aspect of the present invention, in the above-mentioned second aspect of the present invention, the above-mentioned terminating code providing part provides the terminating code in an actual code data area of the code stream.

Thereby, the second aspect of the present invention can be easily achieved by providing the terminating code in an actual code data of the code stream.

According to a ninth aspect of the present invention, in the above-mentioned eighth aspect of the present invention, the above-mentioned terminating code providing part provides the terminating code before the code length position defined by an SOT marker which is added at the top of a tile code sequence for starting a tile. Thus, more specifically, by utilizing the SOT marker, the eighth aspect of the present invention can be easily achieved. Especially, for the purpose of avoiding tamper, it becomes possible to achieve a control for each tile unit.

According to a tenth aspect of the present invention, in the eighth aspect of the present invention, the above-mentioned terminating code providing part provides the terminating code before the code length position defined by a PLT marker which describes a tile header packet length. Thus, more specifically, by utilizing the PLT marker, the eighth aspect of the present invention can be easily achieved. Especially, for the purpose of avoiding tamper, it becomes possible to achieve a control for each tile unit.

According to an eleventh aspect of the present invention, in the eighth aspect of the present invention, the above-mentioned terminating code providing part provides the terminating code before the code length position defined by a PPT marker which collectively describes tile header packet headers in summary. Thus, more specifically, by utilizing the PPT marker, the eighth aspect of the present invention can be easily achieved. Especially, for the purpose of avoiding tamper, it becomes possible to achieve a control for each tile unit.

According to a twelfth aspect of the present invention, in the eighth aspect of the present invention, the above-mentioned terminating code providing part provides the terminating code before the code length position defined by a COM marker for comments. Thus, more specifically, by utilizing the COM marker, the eighth aspect of the present invention can be easily achieved.

According to a thirteenth aspect of the present invention, in the above-mentioned first aspect of the present invention, the above-mentioned additional information embedding part regards a zone subsequent to an EOC marker which indicates the end of the code steam as the off-rule zone, and embeds the additional information therein as a code.

According to the JPEG 2000 standard rule, upon occurrence of the EOT marker which indicates the end of the code in the code stream, the drive finishes decoding operation as determining that no code data occurs thereafter. Accordingly, the zone subsequent to the EOT marker is not decoded according to the JPEG standard rule, i.e., this zone can be regarded as the 'off-rule zone', which cannot be easily changed by a general user and thus can be used for embedding the additional information. Thereby, the first aspect of the present invention can be achieved. Especially, this zone is advantageous for embedding image data management information or image position information concerning the above-mentioned image area classification.

According to a fourteenth aspect of the present invention, in the image processing apparatus according to the first aspect of the present invention, the above-mentioned additional information embedding part embeds the additional information in a comment space in a COM marker for comments, as a code. Thus, by utilizing the COM marker space, the first aspect of the present invention can be easily achieved.

According to a fifteenth aspect of the present invention, in the image processing apparatus according to the first aspect of the present invention, the above-mentioned additional information embedding part embeds the additional information in an off-rule zone of a marker itself other than a COM marker for comments.

Thereby, also the first aspect of the present invention can be achieved easily. For example, the additional information may be embedded into the TLM marker itself which is originally used for describing the main header tile part length, for example. Alternatively, the value of the length of the TLM marker Ltlm may be elongated by the length for the additional information, for example. Further alternatively, the additional information may be embedded subsequent to a marker itself other than the COM marker, for example.

According to a sixteenth aspect of the present invention, in any of the above-mentioned first through fifteenth aspects of the present invention, the above-mentioned additional information creating part creates, as the additional information, tamper resistance information for the image data.

Thus, by utilizing the tamper resistance information for the relevant image data embedded as the additional information in the off-rule zone which is not decoded according to the JPEG 2000 standard rule, it is possible to detect whether or not the image data is illegally copied or tampered by determining whether or not the tamper resistance information embedded there is removed, changed, or so. Thus, it is possible to effectively provide a measure for copyright protection or so for the relevant image data.

According to a seventeenth aspect of the present invention, in any of the above-mentioned first through fifteenth aspect of the present invention, the above-mentioned additional information creating part creates, as the additional information, management information for the image data.

The above-mentioned management information for the image data may include, for example, the name of a person who created the relevant image, the date of the creation, the storage location of the image data, or so. By embedding such management information, an application may be provided for decoding this additional information, and the thus-decoded management information may be used for appropriately arranging or sorting out image files of such image data.

According to an eighteenth aspect of the present invention, in any one of the above-mentioned first through fifteenth aspects of the present invention, the above-mentioned additional information creating part creates, as the additional information, image position information concerning image area classification according to an image feature such as edge part, character part, picture part, halftone dot part or so.

By embedding such image area classification information, an application may be provided for decoding this additional information, and the thus-obtained image area classification information may be used for properly determining the position of the edge or so in the image without examining the image data itself. Then, by appropriately processing the thus-detected position of the edge or so, the image can be reproduced (printed, displayed or so) without degradation in the sharpness of the edge or so.

According to a nineteenth aspect of the present invention, in any of the above-mentioned first through fifteenth aspects of the present invention, the above-mentioned additional information creating part creates, as the additional information, from the image data, other image data having an image quality different from the original image data.

By embedding such image data having image quality different from the original one, an application may be provided which can decode this additional information, and the thus-obtained image data having different image quality may be used for the purpose that, depending on a particular user's payment condition, an image with a higher quality more can be provided to the user, or so. Thus, such a payment dependent display system may be provided.

According to a twentieth aspect of the present invention, in an image proceeding apparatus, an inverse converting part decompresses, into image data, a code stream generated as a result of converting image data into two-dimensional wavelet coefficients, quantizing the same and coding the quantization result; and an off-rule zone information reading part which reads additional information which is embedded in an off-rule zone in the code stream as a code, the zone being not decoded according to a JPEG 2000 standard rule.

Thereby, the additional information which has a special meaning and embedded in the off-rule zone which is not decoded according to the JPEG 2000 standard rule in the code stream can be read out, and thereby, processing according to the thus-read additional information can be performed.

According to a twenty-first aspect of the present invention, in the above-mentioned image processing apparatus according to the twentieth aspect of the present invention, the additional information is created by the additional information creating part and embedded by the additional information embedding part according to any of the above-mentioned first through nineteenth aspect of the present invention.

Thus, it is possible to provide the image processing apparatus which can properly read out the additional information according to any of the above-mentioned first through nineteenth aspect of the present invention. Thus, it is possible to differentiate the present invention from an apparatus which can perform interpretation only according to the JPEG 2000 standard rule.

According to a twenty-second aspect of the present invention, in the above-mentioned image processing apparatus according to the twenty or twenty-first aspect of the present invention, an additional information processing part is provided which performs processing concerning the image data based on the additional information read by means of the off-rule zone information reading part.

Thus, the additional information which has a special meaning and is embedded in the off-rule zone which is not decoded according to the JPEG 2000 standard rule in the code stream can be read out, and thereby, processing concerning the relevant image data based on the thus-read additional information can be made to be performed in the image processing apparatus.

According to a twenty-third aspect of the present invention, in the above-mentioned image processing apparatus according to the twenty-second aspect of the present invention, the additional information processing part forcibly finishes decoding processing upon detecting a tamper based on a determination on the additional information read in case the additional information comprises tamper resistance information.

Thus, in case the additional information includes the tamper resistance information, the decoding operation is forcibly finished by the image processing apparatus upon detection of tamper operation based on determination result on the read tamper resistance information. Thereby, it is possible to substantially achieve copy protection or tamper protection.

According to a twenty-fourth aspect of the present invention, in the above-mentioned image processing apparatus according to the twenty-second aspect of the present invention, the additional information processing part generates an alarm upon detecting a tamper based on a determination on the additional information read in case the additional information comprises tamper resistance information.

Thus, in case the additional information includes the tamper resistance information, an alarm is caused by the image processing apparatus upon detection of tamper operation based on determination result on the read tamper resistance information. Thereby, it is possible to substantially achieve copy protection or tamper protection.

According to a twenty-fifth aspect of the present invention, in the image processing apparatus according to the twenty-second aspect of the present invention, the additional information processing part does not output a part having undergone tamper detected based on a determination on the additional information read in case the additional information comprises tamper resistance information.

Thus, in case the additional information includes the tamper resistance information, only the part at which the tamper operation is detected is not output by the image processing apparatus upon detection of tamper operation based on determination result on the read tamper resistance information. Thereby, it is possible to substantially achieve copy protection or tamper protection.

According to a twenty-sixth aspect of the present invention, in the image processing apparatus according to the twenty-second aspect of the present invention, the additional information processing part performs file arrangement concerning the relevant image data in case the additional information comprises management information.

Thus, in case the additional information includes the management information, file arrangement concerning the relevant image data can be achieved in use of the management information.

According to a twenty-seventh aspect of the present invention. In the image processing apparatus according to the twenty-second aspect of the present invention, the additional information processing part performs access control for the relevant image data in case the additional information comprises management information.

Thus, in case the additional information includes the management information, access control for the relevant image data can be achieved in use of the management information.

According to a twenty-eighth aspect of the present invention, in the image processing apparatus according to the twenty-second aspect of the present invention, the additional information processing part performs image processing such as filtering processing or so depending on a respective one of image areas on the relevant image data in case the additional information comprises image position information concerning image area classification according to image feature such as edge part, character part, picture part, halftone dot part or so.

Thus, in case the additional information includes the image position information concerning image area classification according to image feature such as edge part, character part, picture part, halftone dot part or so, the image area classification information read out therefrom may be used for properly determining the position of the edge or so in the image without examining the image data itself. Then, by appropriately processing the thus-detected position of the edge or so, the image can be reproduced (printed, displayed or so) without degradation in the sharpness of the edge or so.

According to a twenty-eighth aspect of the present invention, in the image processing apparatus according to the twenty-second aspect of the present invention, the additional information processing part outputs image data having an image quality according to a payment condition in case the additional information comprises image data having an image quality different from the original image data.

Thus, in case the additional information includes image data having an image quality different from the original image data, the image data having different image quality thus read out may be used for the purpose that, depending on a particular user's payment condition, an image with a higher quality can be decoded, or so. Thus, such a payment dependent display system may be achieved.

According to a thirtieth aspect of the present invention, an image reading apparatus includes: an photoelectric device reading an image of an original; an addition determining part selectively determining additional information concerning the image data read by means of said photoelectric device and determining whether or not the additional information is to be embedded; and the image processing apparatus claimed in claim 1 performing image processing including processing of embedding the additional information to the image data read by means of said photoelectric device in case embedding of the additional data is determined by the addition determining part.

Thus, a user can freely select whether or not the additional information is to be embedded upon reading image data and compressing so as to encode it. Thus, it is possible to determine a manner in which the relevant image data is stored.

According to a thirty-first aspect of the present invention, an image reading apparatus includes: an photoelectric device reading an image of an original; and an image processing apparatus according to any one of the above-mentioned twenty through twenty-ninth aspects of the present invention performing decompressing, into image data, code data created as a result of code data obtained from converting image data into two-dimensional wavelet coefficients, quantizing the same and coding the quantization result so as to compress the image data.

Thereby, it is possible to provide the image reading apparatus having a function of reading the additional information which has a special meaning and is embedded in the off-rule zone which is not decoded according to the JPEG 2000 standard rule in the code stream.

According to a thirty-second aspect of the present invention, an image forming apparatus includes: the image reading apparatus according to the thirtieth or thirty-first aspect of the present invention; and a printer engine forming an image onto a paper based on image data decompressed from code data by a decompressing part after being read by means of the image reading apparatus, and being processed by the image processing apparatus.

Thereby, it is possible to provide the image reading apparatus having a function of embedding the additional information which has a special meaning in the off-rule zone which is not decoded according to the JPEG 2000 standard rule in the code stream, and a function of reading the same. Especially, in case the additional information includes management information or image-area-classification image position information, or so, the additional information can be utilized effectively.

According to a thirty-third aspect of the present invention, in the image forming apparatus according to the thirty-second aspect of the present invention, an interface is provided for externally transmitting code data obtained from an image read by the image reading apparatus and then processed by the image processing apparatus.

Thereby, it is possible to effectively utilize the additional information such as the management information in case an image transmission function such as a facsimile transmission function is provided in the apparatus.

A thirty-fourth aspect of the present invention is a program which causes a computer included in the image processing apparatus according to any one of the above-mentioned first through twenty-ninth aspect of the present invention to execute each part of the image processing apparatus.

Thereby the apparatus including the computer can perform the same functions as those of any one of the first through twenty-ninth aspects of the present invention.

A thirty-fifth aspect of the present invention is a computer readable recording medium for storing therein the program according to the thirty-fourth aspect of the present invention.

Thereby the apparatus including the computer can perform the same functions as those of any one of the first through twenty-ninth aspects of the present invention after reading out the program according to the thirty-fifth aspect of the present invention from the recording medium with the computer.

Another object of the present invention is to solve the above-mentioned third problem, and, to provide an image compressing apparatus, an image compressing method, a computer-readable program, and a computer-readable recording medium storing therein the above-mentioned problem, by which compressed image data can be provided whereby, without increasing the data size of the compressed image data, a thumbnail image of the relevant image can be output therefrom at high speed.

Further another object of the present invention is to provide an image processing apparatus, an image decompressing apparatus, an image processing method, an image decompressing method, a computer-readable program, and a computer-readable recording medium storing therein the above-mentioned problem, by which, without increasing the data size of the compressed image data, a thumbnail image of the relevant image can be output therefrom at high speed.

For this purpose, according to the present invention, output (display, printing, transmission) of a thumbnail image can be made at high speed in use of a feature of the JPEG 2000 scheme (ISO/IEC FCD 15444-1) which is proposed as the next generation image coding scheme of JPEG as mentioned above, by which, an image is stored in a manner of maintaining high definition, and, therefrom, an image having a specific resolution, or a specific image quality can be extracted easily.

The present invention is advantageous in a case where data other than low resolution data is used as a thumbnail from code data, as JPEG 2000 code, from which an image can be extracted with respect to a particular resolution, position, image quality or color component. In compressed image data according to the present invention, for the purpose of achieving high speed recognition of an outline of the relevant image by a user, predetermined thumbnail information is held therewith.

Specifically, according to a thirty-sixth aspect of the present invention, an image compressing apparatus producing compressed code data for an image, includes a part setting image thumbnail information in one or a plurality of forms, and a part adding the thus-set forms of thumbnail to a header portion of the compressed code data upon formation of the code data. Thus, the thumbnail of the image can be easily taken out from the compressed code data therewith. Further, in the same aspect of the present invention, an image compressing method for producing compressed code data for an image, includes a step of setting image thumbnail information in one or a plurality of forms, and a step of adding the thus-set forms of thumbnail to a header portion of the compressed code data upon formation of the code data. Furthermore, this aspect of the present invention is also embodied in a form of a computer-readable program, or a computer-readable recording medium recording therein the above-mentioned program.

According to a thirty-seventh aspect of the present invention, image resolution information is applied as the image thumbnail information.

According to a thirty-eighth aspect of the present invention, image decomposition level information is applied as the image resolution information.

According to a thirty-ninth aspect of the present invention, image position information is applied as the image thumbnail information.

According to a fortieth aspect of the present invention, one or some of tile information, precinct information, code block information, and pixel position information is applied as the image position information.

According to a forty-first aspect of the present invention, image component information is applied as the image thumbnail information.

According to a forty-second aspect of the present invention, image quality information is applied as the thumbnail information.

According to a forty-third aspect of the present invention, layer information and/or bit plane information is applied as the image quality information.

According to a forty-fourth aspect of the present invention, image subband information is applied as the thumbnail information.

According to a fourth-fifth aspect of the present invention, an image processing apparatus extracting an image thumbnail, includes a part extracting a part of compressed code data produced by the image compressing apparatus according to any one of the above-mentioned thirty-sixth through forty-fourth aspects of the present invention, based on the thumbnail information. According to the same aspect of the present invention, an image processing method for extracting image thumbnail, includes a step of extracting a part of compressed code data produced by the image compressing apparatus according to any one of the above-mentioned thirty-sixth through forty-fourth aspects of the present invention, based on the thumbnail information. Furthermore, this aspect of the present invention is also embodied in a form of a computer-readable program, or a computer-readable recording medium recording therein the above-mentioned program.

According to a forty-sixth aspect of the present invention, an image decompressing apparatus outputting an image thumbnail, includes a part decompressing only a relevant thumbnail part of compressed code data produced by the image compressing apparatus according to any one of the above-mentioned thirty-sixth through forty-fourth aspects of the present invention, based on the thumbnail information. According to the same aspect of the present invention, an image decompressing method for outputting an image thumbnail, includes a step of decompressing only a relevant thumbnail part of compressed code data produced by the image compressing apparatus according to any one of the above-mentioned thirty-sixth through forty-fourth aspects of the present invention, based on the thumbnail information. Furthermore, this aspect of the present invention is also embodied in a form of a computer-readable program, or a computer-readable recording medium recording therein the above-mentioned program.

Another object of the present invention is to provide an information processing apparatus, an information processing method, a program, and a computer-readable recording medium recording therein the above-mentioned program, by which, even after a remaining part of information of an original image file is lost due to extraction of a part of the image data (code data) compressed, re-compressed or divided, the entire original image data can be reached which is one before the compression/recompression or the extraction of divided data is made, in other words, which includes the once lost remaining part of the image information as needed. Then, after that, the entire original mage data thus obtained may be then used.

According to a forty-seventh aspect of the present invention, an information processing apparatus producing compressed code data for an image, includes: an image inputting part inputting an image to be compressed; an image compressing part compressing the thus-input image; and a storage location adding part adding, to the thus-compressed image, information concerning a location storing the image to be compressed or the image before being compressed.

According to a forty-eighth aspect of the present invention, an information processing apparatus producing compressed code data for an image, includes: an image inputting part inputting an image to be compressed; an image compressing part compressing the thus-input image; a first storage location adding part adding, to the thus-compressed image, information concerning a location storing the image to be compressed; a compressed image outputting part outputting the compressed image; a second storage location adding part adding, to the image to be compressed, information concerning an outputting destination storing the compressed image to which the compressed image is thus output; and an image to be compressed outputting part outputting the image to be compressed having the information added thereto by the second storage location adding part, to an inputting source from which said image inputting part first inputs the image to be compressed.

According to a forty-ninth aspect of the present invention, an information processing apparatus producing compressed code data for an image, includes: an image inputting part inputting an image to be compressed; an image compressing part compressing the thus-input image; a compressed image outputting part outputting the compressed image; a storage location adding part adding, to the image to be compressed, information concerning an outputting destination storing the compressed image to which the compressed image is output; and an image to be compressed outputting part outputting the image to be compressed having the information added thereto by said storage location adding part, to an inputting source from which said image inputting part first inputs the image to be compressed.

According to a fifty aspect of the present invention, an information processing apparatus producing compressed code data for an image, includes: an image inputting part inputting an image to be compressed; an image compressing part compressing the thus-input image into a plurality of compressed images; and a storage location adding part adding, to the thus-obtained plurality of compressed images, information concerning a location storing the image to be compressed or image before being compressed.

According to a fifty-first aspect of the present invention, an information processing apparatus producing compressed code data for an image, includes: an image inputting part inputting an image to be compressed; an image compressing part compressing the thus-input image into a plurality of compressed images; a first storage location adding part adding, to the thus-obtained plurality of compressed images, information concerning a location storing the image to be compressed; a compressed image outputting part outputting the compressed images; a second storage location adding part adding, to the image to be compressed, information concerning the output destinations storing the respective ones of the plurality of compressed images to which the compressed images are output; and an image to be compressed outputting part outputting the image to be compressed having the information added thereto by the second storage location adding part, to an inputting source from which said image inputting part first inputs the image to be compressed.

According to a fifty-second aspect of the present invention, an information processing apparatus producing compressed code data for an image, includes: an image inputting part inputting an image to be compressed; an image compressing part compressing the thus-input image into a plurality of compressed images; a compressed image outputting part outputting the thus-obtained plurality of compressed images; a storage location adding part adding, to the image to be compressed, information concerning output destinations storing the respective ones of the plurality of compressed images to which the compressed images are output; and an image to be compressed outputting part outputting the image to be compressed having the information added thereto by said storage location adding part, to an inputting source from which said image inputting part first inputs the image to be compressed.

According to a fifty-third aspect of the present invention, the information processing apparatus according to any one of the above-mentioned fifty through fifty-second aspects of the present invention, includes: a compressed image outputting part outputting the respective compressed images; and a part adding, to a head portion of each of the plurality of compressed images compressed by said image compressing part, during forming the code data, information concerning a location storing another compressed image each other.

According to a fifty-fourth aspect of the present invention, the information processing apparatus according to any one of the above-mentioned fifty through fifty-third aspects of the present invention, includes: a compressed image outputting part outputting the respective compressed images; an image to be compressed outputting part outputting the image to be compressed or image before being compressed to an inputting source of the image inputting part; and a part adding, to a head portion of the image to be compressed, during forming the code data thereof, information concerning output destinations to which the respective one of the plurality of compressed images are output.

According to a fifty-fifth aspect of the present invention, in the information processing apparatus according to any one of the above-mentioned forty-seventh through fifty-fourth aspects of the present invention, the inputting source or the output destination comprises an internet-reachable storage location, and the information concerning the storage location comprises an IP address and/or an URL.

According to a fifty-sixth aspect of the present invention, the information processing apparatus according to any one of the above-mentioned forty-seventh through fifty-fifth aspects of the present invention, the compressed code data is produced based on a method defined by JPEG 2000.

According to a fifty-seventh aspect the present invention, an information processing method for producing compressed code data for an image, includes: an image inputting step of inputting an image to be compressed; an image compressing step of compressing the thus-input image; and a storage location adding step of adding, to the thus-compressed image, information concerning a location storing the image to be compressed or image before being compressed.

According to a fifty-eighth aspect of the present invention, an information processing method for producing compressed code data for an image, includes: an image inputting step of inputting an image to be compressed; an image compressing step of compressing the thus-input image; a first storage location adding step of adding, to the thus-compressed image, information concerning a location storing the image to be compressed; a compressed image outputting step of outputting the compressed image; a second storage location adding step of adding, to the image to be compressed or image before being compressed, information concerning an output destination storing the compressed image to which the compressed image is output; and an image to be compressed outputting step of outputting the image to be compressed or image before being compressed having the information added thereto in the second storage location adding step, to an inputting source from which the image to be compressed is first input in said image inputting step.

According to a fifty-ninth aspect of the present invention, an information processing method for producing compressed code data for an image, includes: an image inputting step of inputting an image to be compressed; an image compressing step of compressing the thus-input image; a compressed image outputting step of outputting the compressed image; a storage location adding step of adding, to the image to be compressed, information concerning an output destination storing the compressed image to which the compressed image is output; and an image to be compressed outputting step of outputting the image to be compressed having the information added thereto in said storage location adding step, to an inputting source from which the image to be compressed is first input in said image inputting step.

According to a sixty aspect of eth present invention, an information processing method for producing compressed code data for an image, includes: an image inputting step of inputting an image to be compressed; an image compressing step of compressing the thus-input image into a plurality of compressed images; and a storage location adding step of adding, to the thus-obtained plurality of compressed images, information concerning a location storing the image to be compressed.

According to a sixty-first aspect of the present invention, an information processing method for producing compressed code data for an image, includes: an image inputting step of inputting an image to be compressed; an image compressing step of compressing the thus-input image into a plurality of compressed images; a first storage location adding step of adding, to the thus-obtained plurality of compressed images, information concerning a location storing the image to be compressed; a compressed image outputting step of outputting the compressed images; a second storage location adding step of adding, to the image to be compressed, information concerning output destinations storing the respective ones of the plurality of compressed images to which the compressed images are output; and an image to be compressed outputting step of outputting the image to be compressed having the information added thereto in the second storage location adding step, to an inputting source from which the image to be compressed is first input in said image inputting step.

According to a sixty-second aspect of the present invention, an information processing method for producing compressed code data for an image, includes: an image inputting step of inputting an image to be compressed; an image compressing step of compressing the thus-input image into a plurality of compressed images; a compressed image outputting step of outputting the thus-obtained plurality of compressed images; a storage location adding step of adding, to the image to be compressed, information concerning output destinations storing the respective ones of the plurality of compressed images to which the compressed images are output; and an image to be compressed outputting step of outputting the image to be compressed having the information added thereto in the storage location adding step, to an inputting source from which the image to be compressed is first input in the image inputting part.

According to a sixty-third aspect of the present invention, the information processing method according to any one of the above-mentioned sixty through sixty-second aspect of the present invention, includes: compressed image outputting step of outputting the respective compressed images; and a step of adding, to a head portion of each of the plurality of compressed images compressed in the image compressing step, during forming the code data, information concerning a location storing another compressed image each other.

According to a sixty-fourth aspect the present invention, the information processing method according to any one of the above-mentioned sixty through sixty-third aspect of the present invention, includes; a compressed image outputting step of outputting the respective compressed images; an image to be compressed outputting step of outputting the image to be compressed to an inputting source of the image inputting step; and a step of adding, to a head portion of the image to be compressed, during forming the code data thereof, information concerning output destinations to which the respective one of the plurality of compressed images are output.

According to a sixty-fifth aspect of the present invention, in the information processing method according to any one of the above-mentioned fifty-seventh through sixty-fourth aspect of the present invention, the inputting source or the output destination comprises an internet-reachable storage location, and the information concerning the storage location comprises an IP address and/or an URL.

According to a sixty-sixth aspect of the present invention, in the information processing method according to any one of the above-mentioned fifty-seventh through sixty-fifth aspect of the present invention, the compressed code data is produced based on a method defined by JPEG 2000.

A sixty-seventh aspect of the present invention is a program for causing a computer to function as the information processing apparatus according to any one of the above-mentioned forty-seventh through fifty-sixth aspects of the present invention.

A sixty-eighth aspect of the present invention is a program for causing a computer to execute the information processing method according to any one of the above-mentioned fifty-seventh through sixty-sixth aspect of the present invention.

A sixty-ninth aspect of the present invention is a compute-readable recording medium for recording therein the program according to the sixty-seventh or sixty-eight aspect of the present invention.

According to a seventieth aspect of the present invention, an information processing apparatus includes: an extracting part extracting desired code data from image code data; and an extracted code data with concern information generating part adding information concerning the extraction to the thus-extracted code data so as to generate an extracted code data with concern information.

According to a seventy-first aspect of the present invention, an information processing apparatus includes: an extracting part extracting desired code data from image code data; and an image code data with concern information generating part adding information concerning the extraction to the original image code data so as to generate an image code data with concern information.

According to a seventy-second aspect of the present invention, an information processing apparatus includes: an extracting part extracting desired code data from image code data; and a relation information holding and managing part holding and managing information indicating a relation between information concerning the extraction and the thus-extracted code data.

According to a seventy-third aspect of the present invention, the information processing apparatus according to any one of the above-mentioned seventieth through seventy-second aspects of the present invention further includes: a transfer request receiving part receiving a transfer request externally, and wherein: the extracting part extracts the desired code data from the original code data in response to a reception of a transfer request in the transfer request receiving part.

According to a seventy-fourth aspect of the present invention, in the information processing apparatus according to any one of the seventy-third aspect of the present invention, the extracted code data with concern information generating part adds, in addition to the information concerning the extraction, information concerning the relevant transfer request to the extracted code data so as to generate the extracted code data with concern information.

According to a seventy-fifth aspect of the present invention, the information processing apparatus according to any one of the seventieth through seventy-fourth aspects of the present invention further includes: a transfer part transferring the extracted code data with concern information, wherein: the transfer part comprises a setting part for setting a transfer destination.

According to a seventy-sixth aspect of the present invention, in the information processing apparatus according to the seventy-fifth aspect of the present invention, the extracted code data with concern information generating part adds, in addition to the information concerning the extraction, information concerning the relevant transfer destination to the extracted code data so as to generate the extracted code data with concern information.

According to a seventy-seventh aspect of the present invention, in the information processing apparatus according to any one of the above-mentioned seventieth through seventy-sixth aspects of the present invention, the information concerning the extraction to be added to the extracted code data by said extracted code data with concern information generating part comprises information concerning the contents of the code data extracted from the original image code data.

According to a seventy-eighth aspect of the present invention, in the information processing apparatus according to any one of the seventieth through seventy-seventh aspect of the present invention, the information concerning the extraction to be added to the extracted code data by the extracted code data with concern information generating part comprises information concerning the original image code data.

According to a seventy-ninth aspect of the present invention, in the information processing apparatus according to any one of the seventieth through seventy-eighth aspects of the present invention, the information concerning the extraction to be added to the original image code data by the image code data with concern information generating part comprises information concerning the device which possesses the original image code data.

According to an eightieth aspect of the present invention, in the information processing apparatus according to any one of the seventieth through seventy-ninth aspects of the present invention, the information concerning the extraction to be added to the extracted code data by the extracted code data with concern information generating part comprises information concerning the device which possesses the extracted code data.

According to an eighty-first aspect of the present invention, an information processing method includes: an extracting step of extracting desired code data from image code data; and an extracted code data with concern information generating step of adding information concerning the extraction to the thus-extracted code data so as to generate an extracted code data with concern information.

According to an eighty-second aspect of the present invention, an information processing method includes: an extracting step of extracting desired code data from image code data; and an image code data with concern information generating step adding information concerning the extraction to the original image code data so as to generate an image code data with concern information.

According to an eighty-third aspect of the present invention, an information processing method includes: an extracting step of extracting desired code data from image code data; and a relation information holding and managing step of holding and managing information indicating a relation between information concerning the extraction and the thus-extracted code data.

According to an eighty-fourth aspect of the present invention, the information processing method according to any one of the above-mentioned eighty-first through eighty-third aspects of the present invention further includes: a transfer request receiving step of receiving a transfer request externally, wherein: the extracting step comprises a step of extracting the desired code data from the original code data in response to a reception of a transfer request in the transfer request receiving step.

According to an eighty-fifth aspect of the present invention, in the information processing method according to the eighty-fourth aspect of the present invention, the extracted code data with concern information generating step comprising a step of adding, in addition to the information concerning the extraction, information concerning the relevant transfer request to the extracted code data so as to generate the extracted code data with concern information.

According to an eighty-sixth aspect of the present invention, the information processing method according to any one of the above-mentioned eighty-first through eighty-fifth aspects of the present invention further includes: a transfer step of transferring the extracted code data with concern information, wherein: the transfer step comprises a setting step of setting a transfer destination.

According to an eighty-seventh aspect of the present invention, in the information processing method according to the eighty-sixth aspect of the present invention, the extracted code data with concern information generating step comprises a step of adding, in addition to the information concerning the extraction, information concerning the relevant transfer destination to the extracted code data so as to generate the extracted code data with concern information.

According to an eighty-eighth aspect of the present invention, in the information processing method according to the eighty-first through eighty-seventh aspects of the present invention, the information concerning the extraction to be added to the extracted code data in the extracted code data with concern information generating step comprises information concerning the contents of the code data extracted from the original image code data.

According to an eighty-ninth aspect of the present invention, in the information processing method according to any one of the eighty-first through eighty-eighth aspects of the present invention, the information concerning the extraction to be added to the extracted code data in the extracted code data with concern information generating step comprises information concerning the original image code data.

According to a ninetieth aspect of the present invention, in the information processing method according to any one of the eighty-first through eighty-ninth aspects of the present invention, the information concerning the extraction to be added to the extracted code data in the extracted code data with concern information generating step comprises information concerning the device which possesses the original image code data.

According to a ninety-first aspect of the present invention, in the information processing method according to any one of the above-mentioned eighty-first through ninetieth aspects of the present invention, the information concerning the extraction to be added to the extracted code data in the extracted code data with concern information generating step comprises information concerning the device which possesses the extracted code data.

A ninety-second aspect of the present invention is a program for causing a computer to execute the information processing method according to any one of the eighty-first through ninety-first aspects of the present invention.

A ninety-third aspect of the present invention is a computer-readable recording medium for recording therein the program according to the ninety-second aspect of the present invention.

According to the above-mentioned forty-seventh through ninety-third aspects of the present invention, even when image file information is partially lost during a process of compression/re-compression or partial extraction of divided code data for obtaining a thumbnail image or so, it is possible to easily reach and thus obtain the entire information of the original image file which is one before the above-mentioned compression/re-compression, or partial extraction of the divided code data is performed, i.e., includes even the above-mentioned once-lost information.

BRIEF DESCRIPTION OF THE DRAWINGS

FIGS. 5A through 5G illustrate an example of a process of giving an order to bit planes;

FIGS. 8A and 8B show a configuration of tile headers thereof;

FIG. 9 illustrates a configuration of an SOT marker segment;

FIG. 10 illustrates the contents of an EOC marker segment;

FIG. 11 illustrates a configuration of a TLM marker segment;

FIG. 12 illustrates a configuration of a PLM marker segment;

FIGS. 23A and 23B illustrate conditions of a code stream before and after additional information is embedded thereto with a use of the EOC marker;

FIG. 35 illustrates an example of layers and packets in a case where the number of decomposition levels is 2 (the number of resolution levels is 3) and shows a general example of layer configuration;

FIG. 36 illustrates an example of layers and packets in a case where the number of decomposition levels is 2 (the number of resolution levels is 3) and shows an example of layer configuration for enabling output of thumbnail images for respective output devices;

FIG. 37 illustrates an example of layers and packets in a case where the number of decomposition level is 2 (the number of resolution level is 3) and shows a general example of layer configuration for enabling output of thumbnail images for respective transmission path capacities;

FIG. 43 shows an example of thumbnail information set by the image compressing apparatus shown in FIG. 41;

FIG. 44 shows an original image handled by an image processing apparatus or image decompressing apparatus according to the fifth embodiment of the present invention;

FIG. 52 illustrates types of tags and corresponding labels (private tags) according to Exif standard;

FIG. 62 shows examples of contents applicable to information to be embedded to code data or so in the embodiments of the present invention.

DETAILED DESCRIPTION OF THE PREFERRED EMBODIMENTS

A first embodiment of the present invention will now be described with reference to FIGS. 1 through 23.

As the present embodiment employs JPEG 2000 algorithm, an outline of the JPEG 2000 algorithm will now be described first.

Figure 1:
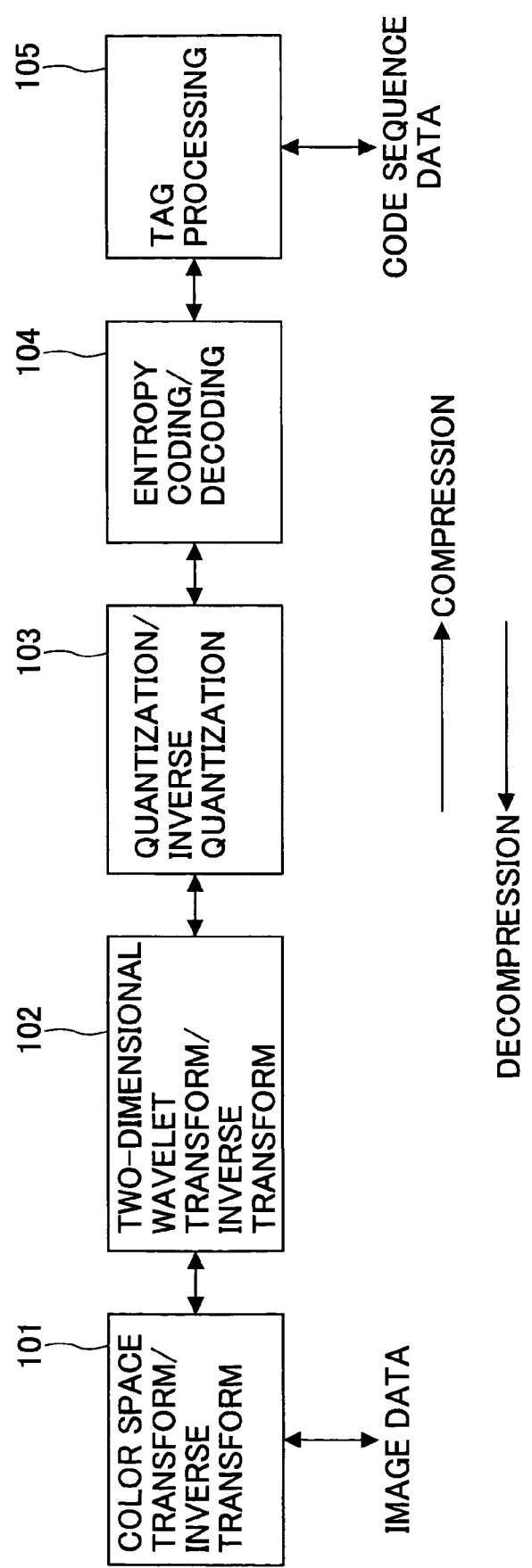
FIG. 1 shows a functional block diagram of a system executing an algorithm which is a base of JPEG 2000 applicable in the present invention.

FIG. 1 shows a functional block diagram of a system which executes a hierarchical coding algorithm which is a base of the JPEG 2000 scheme. This system includes functional blocks, i.e., a color space transform/inverse transform part 101, a two-dimensional wavelet transform/inverse transform part 102, a quantization/inverse quantization part 103, an entropy coding/decoding part 104, and a tag processing part 105.

This system largely differs from a conventional JPEG algorithm in that a transform method applied is different. According to the conventional JPEG, discrete cosine transform (DCT) is applied, while, according to the hierarchical coding algorithm in the JPEG 2000, discrete wavelet transform (DWT) is applied. DWT is superior to DCT as DWT may provide a high image quality for a high-compression zone.

This is a significant reason why the JPEG 2000 has been applied as an algorithm which follows the conventional JPEG.

Another difference therebetween is that, according to the hierarchical coding algorithm, the tag processing part 105 is provided for the end of the process for forming code. The tag processing part 105 creates code sequence data from compressed data in image compression process, while the same part 105 interprets the code sequence data as needed for the purpose of decompression in a decompression process. In use of the code sequence data, the JPEG 2000 can provide various useful functions. For example, compression/decompression operation for a still image can be terminated at an arbitrary position of the hierarchy (decomposition level) obtained in octave dividing in a block basis DWT process (described later with reference to FIGS. 3A through 3D). Furthermore, it becomes possible to extract a low-resolution image (reduced image) from a single image file, or to extract a part of the image (tile image).

In many cases, the color space transform/inverse transform part 101 is inserted at a portion for inputting/outputting an original image. For example, this part performs transform from a RGB color expression system using respective components of R(red)/G(green)/B(blue) in primary color system or a YMC color expression system using respective components of Y(yellow)/M(magenta)/C(cyan) in complementary color system into a YUC or YCrCr color expression system, or vice versa.

Figure 2:
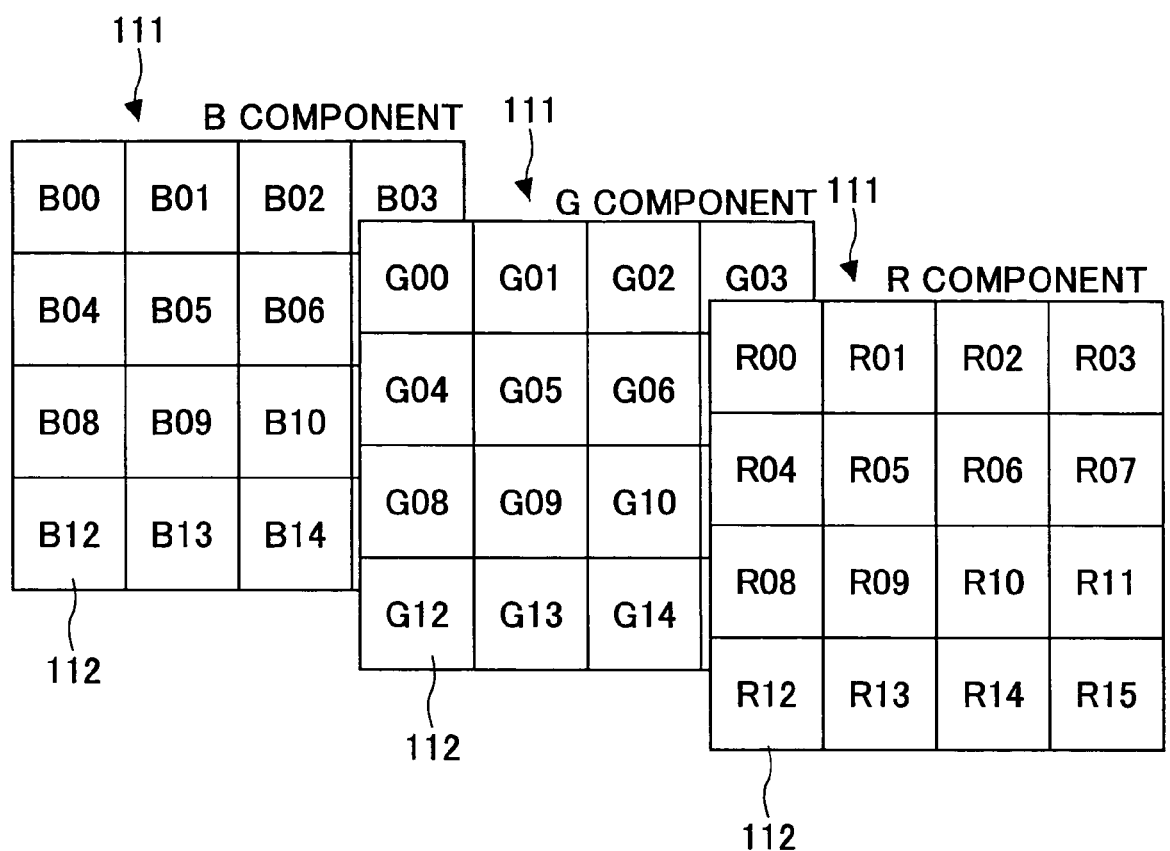
FIG. 2 illustrates rectangular areas divided for respective components of an original image.

JPEG 2000 algorithm will now be described in detail. A color image is, in general, divided into rectangular areas for each color component 111 (RGB primary color system in this example), as shown in FIG. 2. The thus-divided rectangular areas are called, in general, blocks or tiles. According to JPEG 2000, they are called 'tiles', in general, and, thus, such rectangular divided areas will be called as tiles, hereinafter. In the example of FIG. 2, each color component 111 is divided into total sixteen (4×4) tiles 112. Each of these tiles 112 (R00, R01, . . . , R15; G00, G01, . . . , G15; and B00, B01, . . . , B15) is regarded as a basic unit on which an image data compression/decompression process is performed. Accordingly, the image data compression/decompression process is performed, independently, for each color component, or for each tile.

In the image data coding process, each tile 112 of each color component 111 is input to the color space transform/ inverse transform part 101 shown in FIG. 1, and, after undergoing color space transform processing there, undergoes two-dimensional wavelet transform (forward transform) in the two-dimensional wavelet transform/inverse transform part 102. Thus, the image data is divided spatially into frequency bands.

Figure 3A:
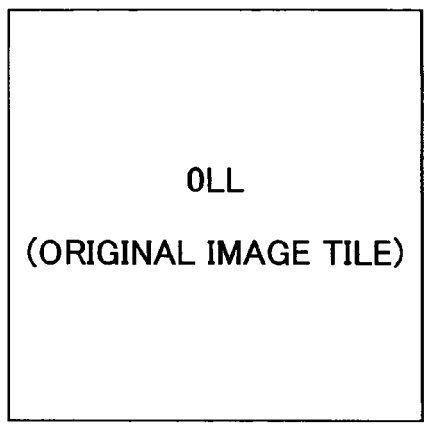
FIGS. 3A through 3D illustrate subbands in respective decomposition levels in case the number of decomposition levels is 3.
Figure 3B:
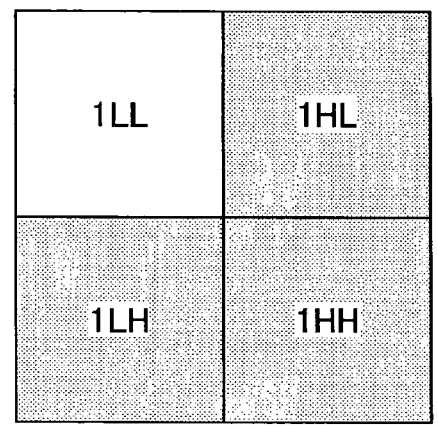
Figure 3C:
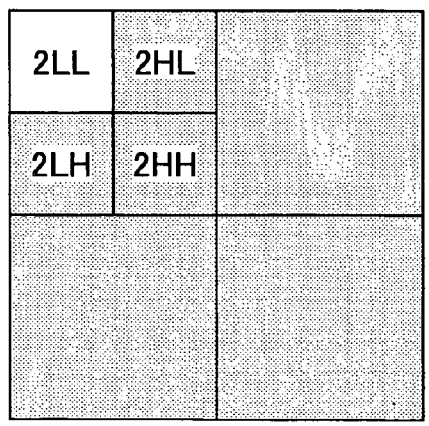
Figure 3D:
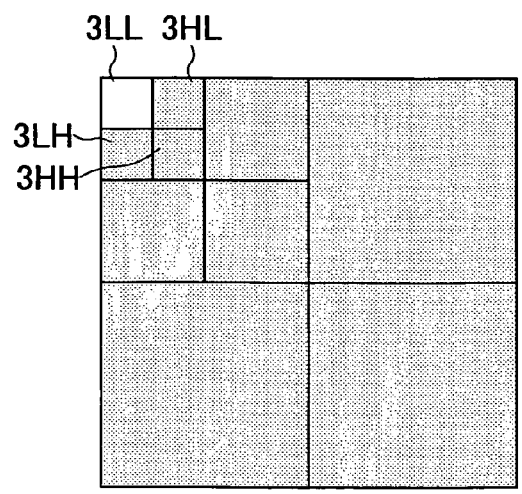

FIGS. 3A through 3D show subbands in respective decomposition levels in case where the number of decomposition levels is 3. In other words, a tile original image (0LL) obtained from dividing of an original image into tiles as mentioned above (decomposition level: 0, shown in FIG. 3A) undergoes two-dimensional wavelet transform. Thereby, it is divided into subbands (1LL, 1HL, 1LH and 1HH) in the decomposition level 1, as shown in FIG. 3B. After that, the low-frequency component 1LL in this level further undergoes two-dimensional wavelet transform. Thereby, it is further divided into subbands (2LL, 2HL, 2LH and 2HH) in the decomposition level 2, as shown in FIG. 3C. After that, the low-frequency component 2LL in this level further undergoes two-dimensional wavelet transform. Thereby, it is further divided into subbands (3LL, 3HL, 3LH and 3HH) in the decomposition level 3, as shown in FIG. 3D. In FIGS. 3A through 3D, the subbands which should undergo a coding process in each decomposition level are filled with halftone dots. For example, in the decomposition level 3 shown in FIG. 3D, the subbands filled with halftone dots, i.e., 3HL, 3HH, 2HL, 2LH, 2HH, 1HL, 1LH and 1HH undergo a coding process, while the subband 3LL is not coded.

Then, after that, a bit to be coded in the image data is determined in sequence according to a predetermined coding order, and for the thus-determined image data bit, a context is created in use of peripheral bits in the quantization/inverse quantization part 103.

Figure 4:
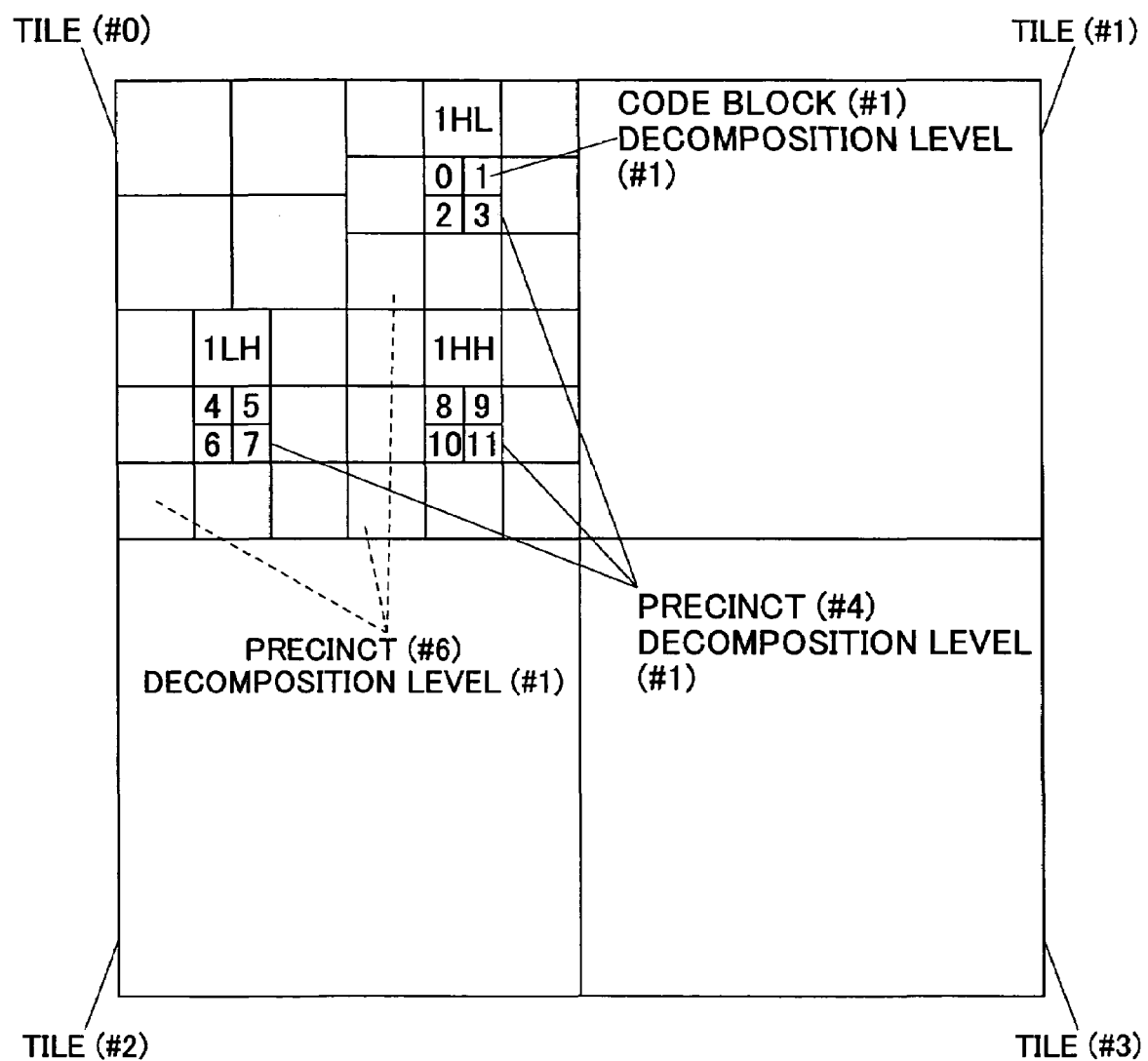
FIG. 4 illustrates precincts.

The wavelet coefficients thus having undergone the quantization processing are divided into, for each subband, un-overlapping rectangles called 'precincts'. This concept is introduced for the purpose of effectively using a limited memory capacity in an implementation process. As shown in FIG. 4, each precinct includes three rectangular areas coincident spatially. Further, each of the respective precincts is divided into un-overlapping rectangular 'code blocks'. The code block is regarded as a basic unit for a coding process. The coefficient values after undergoing the wavelet transform may be quantized and coded as they are. However, in order to improve the coding efficiency, according to JPEG 2000, the coefficient values are decomposed in terms of 'bit plane' units, and, thus, a priority can be given to 'bit planes' for each pixel or each code block.

FIGS. 5A through 5G illustrate a process of giving a priority for a bit plane. As shown, in this example, an original image (32×32 pixels) are divided into four tiles, each tile having 16×16 pixels. Then, the sizes of a precinct and a code block in the decomposition level 1 are 8×8 pixels and 4×4 pixels, respectively. The numbers of the precincts and code blocks are determined according to the raster order, and, in this example, the precinct numbers of 0 through 3, and code block numbers of 0 through 3 are assigned. The pixel expansion over the own tile area applies a mirroring method, the wavelet transform is performed with a use of a lossless (5, 3) filter, and thus, wavelet coefficient values in the decomposition level 1are obtained.

FIGS. 5A through 5G also illustrate a concept of typical 'layer' configuration for the tile 0/precinct 3/code block 3. The code block having undergone the transform is then divided into subbands 1LL, 1HL, 1LH and 1HH, and wavelet coefficient values are given to each subband.

Figure 5A:
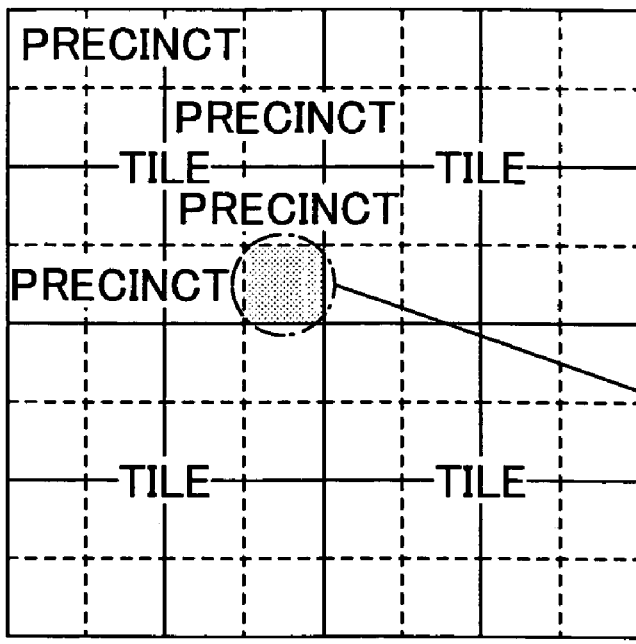
Figure 5B:
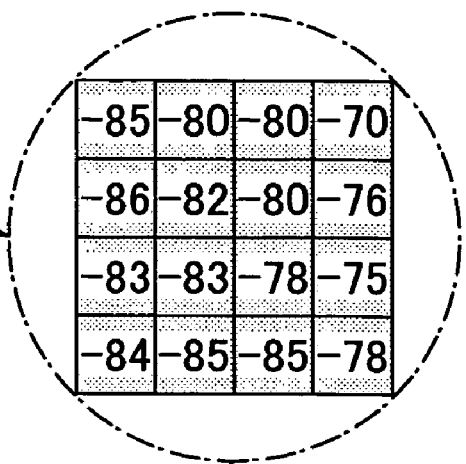
Figure 5C:
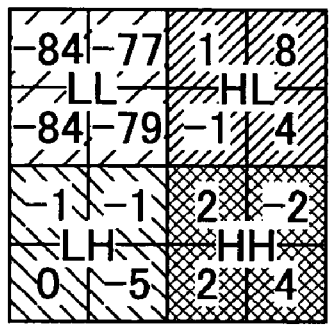

The configuration of the layer is easily understood by a horizontal (bit plane direction) view of the wavelet coefficient values. Each layer is made of an arbitrary number of bit planes. In this example, as shown in FIGS. 5D through 5G, the layers 0, 1, 2 and 3are made of one bit plane, three bit planes, one bit planes and three bit planes, respectively. The layer having bit planes closer to the LSB (least significant bit) tends to be quantized earlier. Contrary, the layer closer to the MSB (most significant bit) tends to be left un-quantized to the last. A method of discarding layers closer to the LSB is called truncation, and, by applying this scheme, it becomes possible to finely control the quantization rate. FIG. 5B shows pixel values for tile 0/precinct 3/code block 3, while FIG. 5C shows wavelet coefficient values for decomposition level 1/tile 0/precinct 3/code block 3 accordingly.

The entropy coding/decoding part 104 shown in FIG. 1 performs a coding process for the tiles 112 of each color component 111 according to the contexts and target bits obtained by a probability estimation method. Thereby, for all the color components 111 of the original image, coding process is completed for tile 112 units. Finally, the tag processing part 105 combines all the code data into a single code sequence data, and adds necessary tags thereto.

On the other hand, in a code data decompression stage, contrary to the above-described image data coding stage, image data is generated from the code sequence data for each tile 112 of each component 111. In this case, the tag processing part 105 first interprets the tags added to the code sequence data input externally. After that, the code sequence data is decomposed into respective tiles 112 of respective components 111 according to the interpretation result, and a decoding or decompression process is performed on the code sequence data for the respective tiles 112 of the respective components 111. In this time, the position of a target bit to be decoded is determined based in the order of the tag information included in the code sequence data, and, also, the contexts are generated by the quantization/inverse quantization part 103 from the peripheral bits (already decoded) of the determined position of the target bit. The entropy coding/decoding part 104 uses the thus-obtained contexts and code sequence data in the probability estimation method so as to decode the code data and obtain the target bit value. The thus-obtained bit value is regarded as the value at the relevant target bit position. The thus-decoded data is one spatially divided for the respective frequency bands. Accordingly, by performing a two-dimensional wavelet inverse transform process thereon with the two-dimensional wavelet transform/inverse transform part 102, the respective tiles of respective components are reproduced. The thus-restored data is transformed into the original color expression system by the color space transform/inverse transform part 101.

Figure 6:
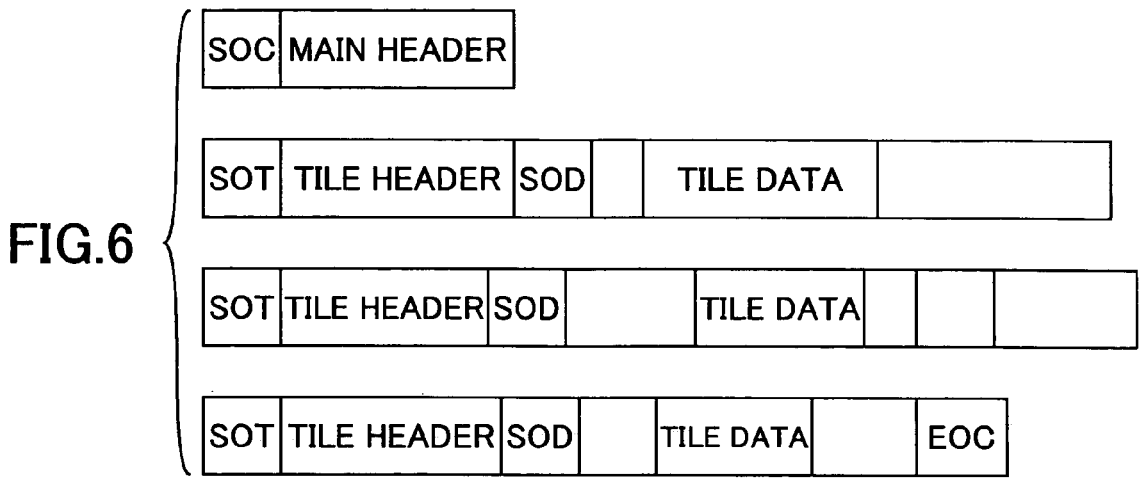
FIG. 6 illustrates a code format according to JPEG 2000.

Next, a code format according to JPEG 2000 will now be described. FIG. 6 illustrates an outline of the code format according to JPEG 2000. This format begins from an SOC (start of code stream) marker which indicates the beginning of code data, followed by a main header having coding parameters, quantization parameters or so described therein, and, after that, the actual code data follows thereto. The actual code data begins from an SOT (start of tile-part) marker, and includes a tile header, an SOD (start of data) marker, and tile data (code itself). After the code data corresponding to the entire image, an EOC (end of stream) marker is added which indicates the end of the code data.

Figure 7:
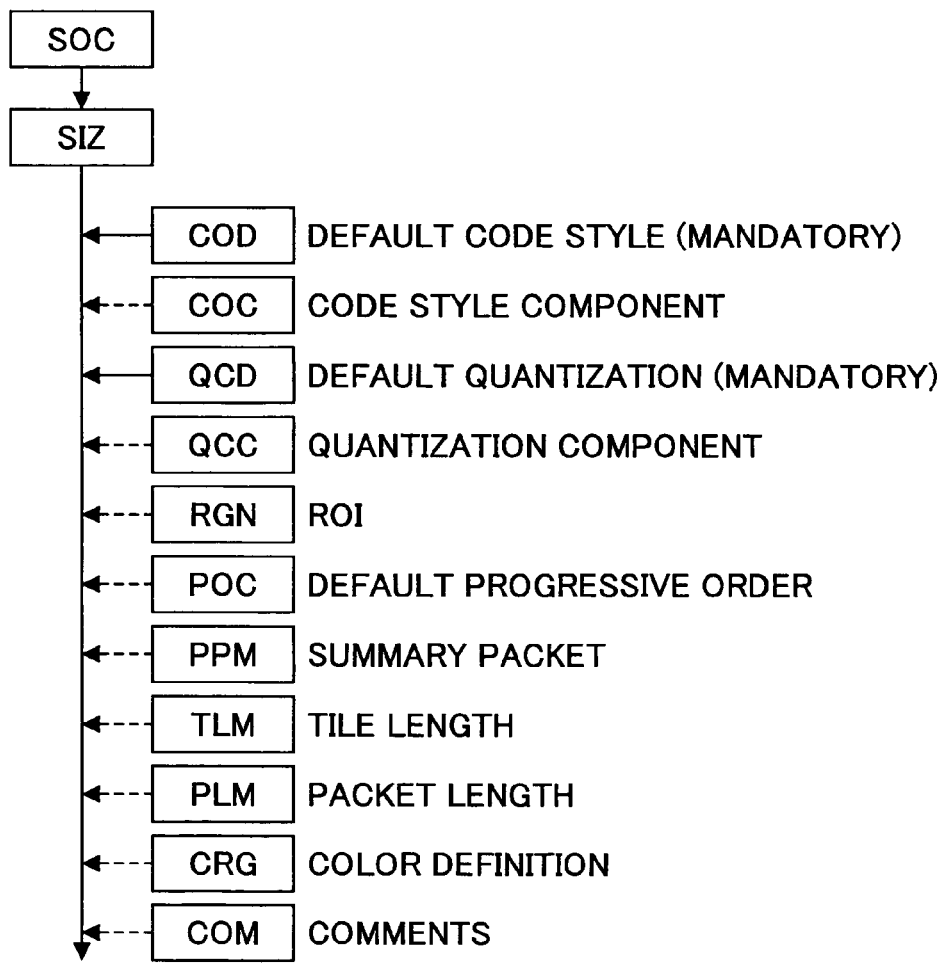
FIG. 7 shows a configuration of a main header thereof.

FIG. 7 shows an example of a configuration of the above-mentioned main header. In this example, the main header includes mandatory marker segments made of a COD and a QCD, and optional marker segments made of a COC, a QCC, a RGN, a POC, a PPM, a TLM, a PLM, a CRG and a COM.

FIGS. 8A and 8B show an example of a configuration of the above-mentioned tile header. FIG. 8A shows a marker segment sequence added at the top of the tile header, and, in the marker segment sequence, marker segments of a COD, a COC, a QCD, a QCC, a RGN, a POC, a PPT, a PLT, and a COM (all optional) can be used. On the other hand, FIG. 8B shows a marker segment sequence added at the top of each tile partial sequence in case the tile is divided into the respective partial segments, and, in this marker segment sequence, marker segments of a POC, a PPT, a PLT and a COM (all optional) can be used.

The markers and marker segments used in JPEG 2000 will now be described. The marker is made of two bytes (the top byte is 0xff, and the following byte is in a range between 0x01 and 0xfe). The markers and marker segments are classified into the following six types.

① frame delimiting information (delimiting);

② information concerning the position and size of image (fixed information);

③ information concerning coding function (functional);

④ information for error protection (in bit stream);

⑤ pointer of bit stream (pointer); and

⑥ supplemental information (informational).

Thereamong, the markers of ①, ⑤ and are used in the embodiment of the present invention, and will be descried in detail as follows:

First, the delimiting marker and marker segment are mandatory ones, and include SOC, SOT, SOD and EOC. The code starting marker SOC is added at the top of the tile code sequence. FIG. 9 shows a configuration of the SOT marker segment. This marker segment includes an Lsot describing the size of the marker segment, an Isot describing the tile number (the number assigned in the raster order starting from 0), Psot describing the tile length, TPsot describing the tile partial number, and TNsot describing the number of tile parts. Thereamong, the part of Psot filled with halftone dots in FIG. 9 may be used for defining the position at which a terminating code in case where additional information according to the present invention is embedded as will be described later.

The code end marker EOC is added at the end of the code sequence. FIG. 10 shows a configuration of the EOC marker segment. A tail area of the EOC marker may also be utilized for embedding the additional information.

The bit stream pointer (pointer) marker segment will now be described. This marker type includes TLM, PLM, PLT, PPM, and PPT markers. The TLM marker is added to the main header, used for describing the main header tile part length (the length between the SOT marker and the tile end), and FIG. 11 shows a configuration thereof. This marker includes as the contents thereof, Ltlm describing the size of the marker segment, Ztlm describing the identification number of the TLM marker, Stlm describing the length of the Ttlm and Ptlm, Ttlm(i) describing the tile number of the i-th tile part, and Ptlm(i) describing the length (the number in bytes) in the i-th tile part between the SOT marker and the tile part end. Thereamong, the portions of Ttlm(i) and Ptlm(i) filled with halftone dots in FIG. 11 may be utilized for defining the position of giving a terminating code in case where the additional information is embedded.

The PLM marker is added to the main header, used for describing a packet length list for the tile part (main header packet length), and FIG. 12 shows a configuration thereof. As shown, this marker segment includes Lplm describing the length of the marker segment, Zplm describing the identification number of the PLM marker, Nplm(i) describing the number in bytes in the i-th tile part, and Iplm(ij) describing the length of the j-th packet in the i-th tile part. The portion of Iplm (ij) filled with halftone dots in FIG. 12 may be utilized for defining the position of giving a terminating code in case where the additional information is embedded.

Figures 13, 14:
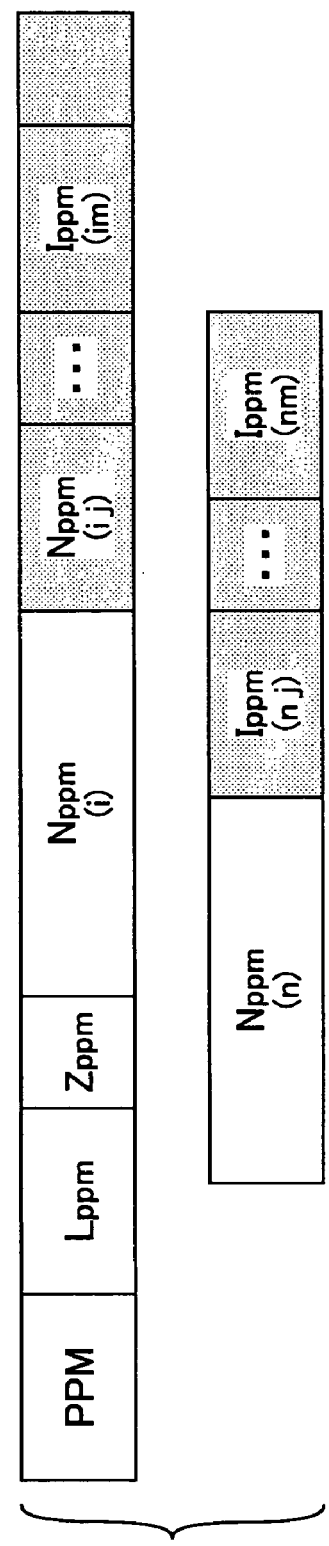
FIG. 13 illustrates a configuration of a PLT marker segment.
FIG. 14 illustrates a configuration of a PPM marker segment.

The PLT marker is added to the main header, is used for describing a packet length list for the tile part (tile header packet length), and FIG. 13 shows a configuration thereof. This marker segment includes Lplt describing the length of the marker segment, Zplt describing the identification number of the PLT marker, and Iplt(i) describing the i-th packet length. Thereamong, the portion of Iplt(i) filled with halftone dots in FIG. 13 may be utilized for defining the position giving a terminating code in case where the additional information is embedded.

The PPM marker is added to the main header, is used for describing collectively the packet headers of all the tiles (collection of main header packet headers), and FIG. 14 shows a configuration thereof. As shown, the relevant marker segment includes Lppm describing the size of the marker segment, Zppm describing the identification number of the PPM marker, Nppm(i) describing the number in bytes of Ippm in the i-th tile part, and Ippm(j) describing the j-th packet header I the i-th tile part. Thereamong, the portions of Ippm(ij) filled with halftone dots in FIG. 14 may be utilized for defining the position giving a terminating code in case where the additional information is embedded.

Figure 15:
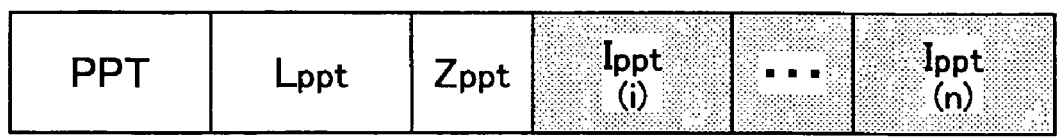
FIG. 15 illustrates a configuration of a PPT marker segment.

The PPT marker is added to the tile header, is used for collectively describing the packet headers in the tile part (collection of tile header packet headers), and FIG. 15 shows a configuration of this marker and relevant marker segment. The marker segment includes Lppt describing the size of the marker segment, Zppt describing the identification number of the PPT marker, and Ippt(i) describing the i-th packet header of the tile part. Thereamong, the portion of Ippt(i) filled with halftone dots in FIG. 15 may be utilized for defining the position giving a terminating code in case where the additional information is embedded.

Figure 16:
FIG. 16 illustrates a configuration of a COM marker segment.

The COM marker is added to the main header or tile header, is used for adding information such as comments, and FIG. 16 shows a configuration of the market and marker segment thereof. This marker segment includes Lcom describing the marker segment, Rcom of a value described, and Ccom(i) of comment data. Thereamoung, the portion of Ccom(i) may be utilized for defining the position giving a terminating code in case where the additional information is embedded.

Figure 17:
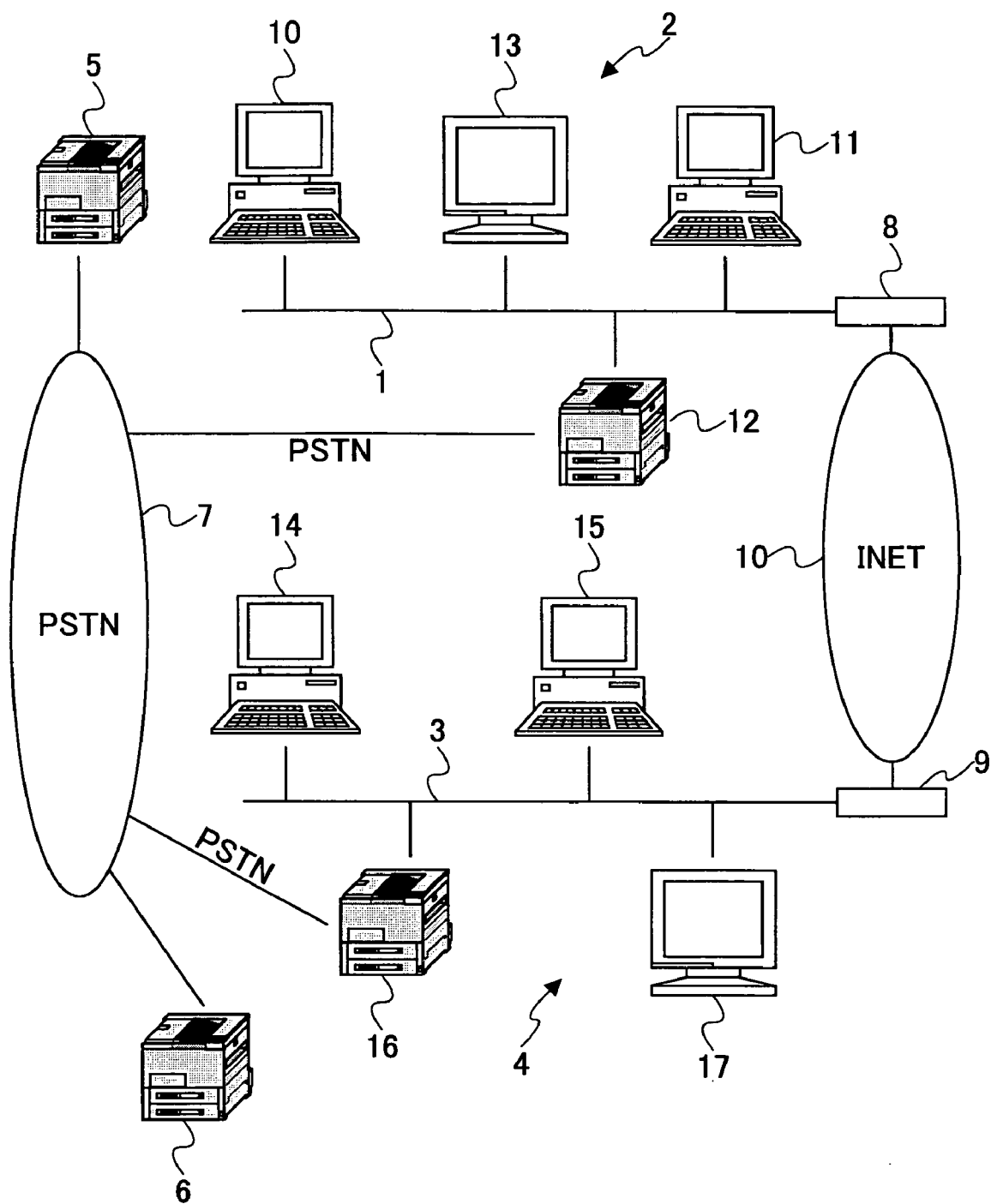
FIG. 17 illustrates a system configuration including composite machines.

An image processing apparatus according to the first embodiment of the present invention will now be described. The image processing apparatus has functions of an image reading apparatus and an image forming apparatus, and, also, has a function of internet facsimile machine. Thus, the image processing apparatus acts as a composite machine (MFP). FIG. 17 shows an expected system of using the present invention in which such image processing apparatuses (MFP) according to the first embodiment of the present invention are used as image servers under a management control of a mail server in the Internet environment.

FIG. 17 illustrates a principle of the entire system. This system includes a domain 2 in which a local area network (LAN) 1 connects respective machines, and a domain 4 in which a LAN 3 connects respective machines. This system includes G3 facsimile machines 5 and 6 which use a public telephone circuit network 7 as transmission paths. The respective domains 2 and 4 are connected to a service provider of the Internet 10 via routers 8 and 9 via private circuits.

Further, in the domain 2, personal computers 10 and 11 acting as client terminals connected to the LAN 1, and a mail server 13 for providing electronic mail service to a composite machine 12 having a function of an internet facsimile machine which is adapted to the Internet. For these terminals 10 through 13, unique host addresses are set which each includes a combination of a network address of the domain 2 and a respective one of unique addresses, while, for a user which uses this domain 2, a user address is set which includes a combination of a unique address and a host address of any of these personal computers 10 and 11.

Similarly, in the domain 4, personal computers 14 and 15 acting as client terminals are connected to the LAN 3, and a mail server 17 for providing electronic mail service to a composite machine 15 having a function of an internet facsimile machine which is adapted to the Internet. For these terminals 14 through 16, unique host addresses are set which each includes a combination of the network address of the domain 4 and a respective one of unique addresses, while, for a user which uses this domain 4, a user address is set which includes a combination of a unique address and the host address of any of these personal computers 14 and 15.

The composite machines 12 and 16 have transmission functions of connecting with the LANs 1 and 3, and sending/receiving image data in a form of electronic mails, and other transmission functions of connecting with the public telephone circuit network 7, and performing image data transmission according to a group-3 transmission procedure with a use of the public telephone circuit network 7 as transmission paths, respectively.

A combination between a transmission protocol up to a transportation layer called TCP/IP and a communication protocol of an upper layer (so-called a protocol suit) is applied for data transmission between terminals connected to the LANs 1 and 3, and data transmission via the Internet 10 basically. For example, a communication protocol called SMTP (simple mail transfer protocol) is applied as a communication protocol of the upper layer for data transmission of electronic mails.

According to the first embodiment, an electronic mail is once stored in the mail server 13 or 17, and after that, is dispatched to a destination. Such a transmission style is called 'storing-type dispatch style'. At this time, when the destination address of the electronic mail includes the network address set in the domain 2 or 4, this electronic mail is stored in the relevant main server 13 or 17. When the destination address of the electronic mail includes a value other than that of the network addresses of the respective domains 2 and 4, the electronic mail is sent out to the Internet 10 via the router 8 or 9, and, after that, via the data transfer function of the Internet 10, the electronic mail is transmitted to a domain or a host corresponding to the relevant destination address.

Figure 18:
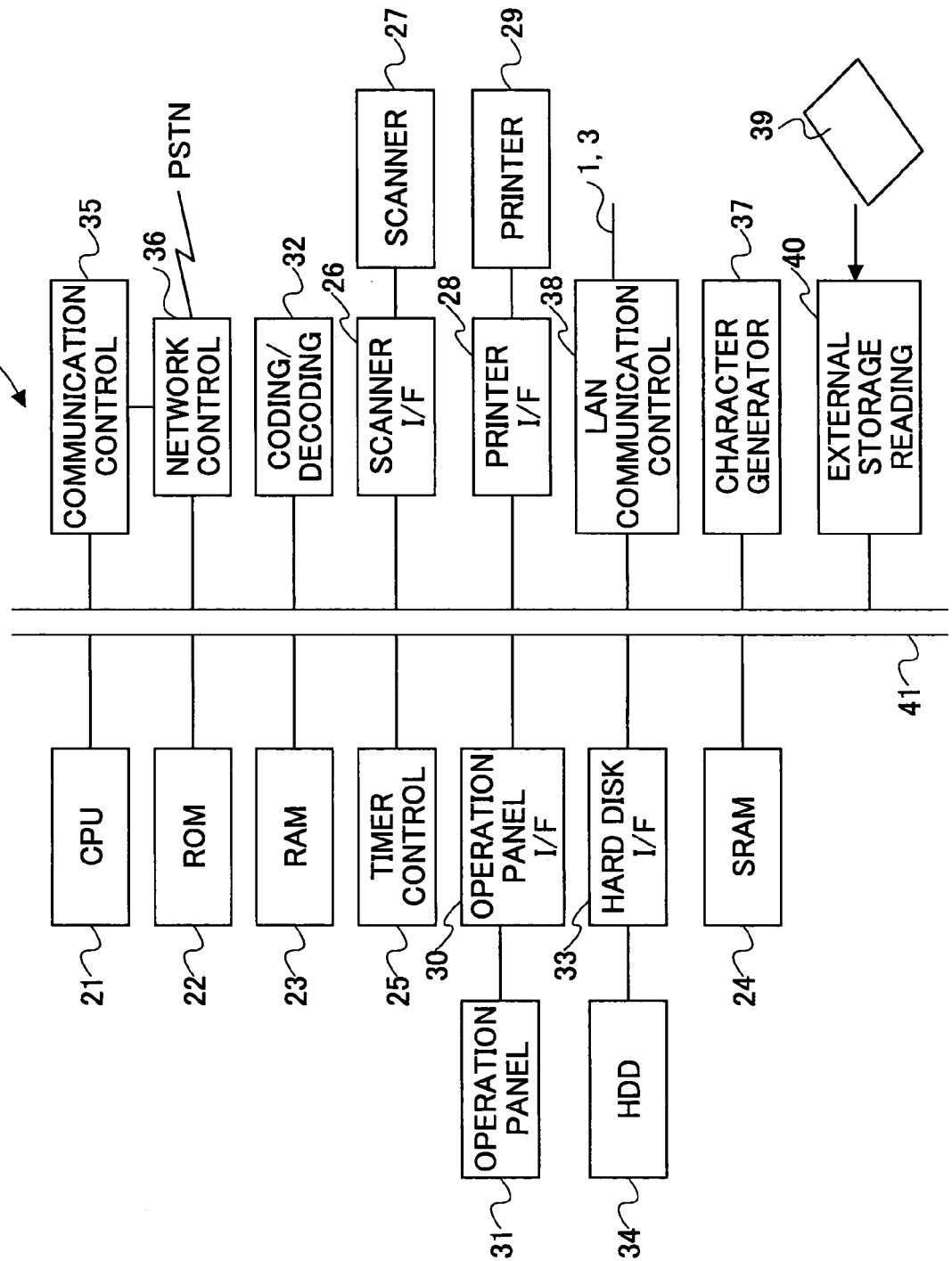
FIG. 18 illustrates a hardware configuration of the composite machine.

Each of the composite machines 12 and 16 which are used as image servers under management control of the mail servers 13 and 17 has a configuration as shown in FIG. 18, according to the first embodiment of the present invention.

A system control part including a CPU 21, a ROM 22 and a RAM 23 and thus having a form of a microcomputer, performs various control operations such as controlling respective parts of the composite machine 12 or 16, facsimile transmission control procedure and so forth. The ROM 22 stores control processing programs which the CPU 21 performs and various sorts of data as needed when the CPU 21 executes the control processing programs. The RAM 23 provides a work area of the CPU 21. An SRAM 24 holds information in case the power supply is interrupted. A timer control part 25 controls timing of various operations of the CPU 21 according to the current time.

A scanner interface 26 is used for providing an interface with a scanner 27 which has a photoelectric device which reads an original image with a predetermined resolution. A printer interface 28 provides an interface with a printer 29 which outputs and records an image with a predetermined resolution. An operation panel interface 30 provides an interface with an operation panel 31 having various sorts of keys for an operator to input instructions and data, and a display device.

An encoder/decoder 32 encodes and compresses an image signal, and also, decodes and decompresses once coded and compressed image information to the original image signal. This encoder/decoder 32 employs an algorithm such as that of JPEG 2000 described above with reference to FIG. 1.

A hard disk interface 33 provides an interface with a hard disk drive (HDD) 34 acting as an image database storage device for storing image data (code data) in a coded and compressed state.

A communication control part 35 provides a group-3 facsimile modem function, and, has a low-rate modem function for communicating transmission control procedures, and a high-rate modem function for mainly communicating image information. A network control part 36 provides a function for enabling connection of the composite machine 12 or 16 with the public telephone circuit network 7, and has an automatic calling/call acceptance function. Data communications between the communication control part 35 and network control part 36 are, as shown, performed directly.

A character generator 37 holds fonts of letters/characters.

A LAN communication control part 38, which is unique for each of the composite machines 12 and 16, corresponds to the relevant LAN 1 or 3 acting as a physical layer, and performs MIME (multi-purpose internet mail extrusion) transform or so for the purpose of performing TCP/IP protocol or electronic mail communications.

Furthermore, each of the composite machine 12 and 16 according to the first embodiment of the present invention has an insertion slot for a recording medium such as an IC card, and also, has an external recording medium reading part 40, which reads a computer program from the recording medium 39 inserted into the slot, and stores it into the RAM 23 or so.

These respective parts/devices are connected with an internal bus 41, via which data communications thereamong are performed mainly.

Figure 19:
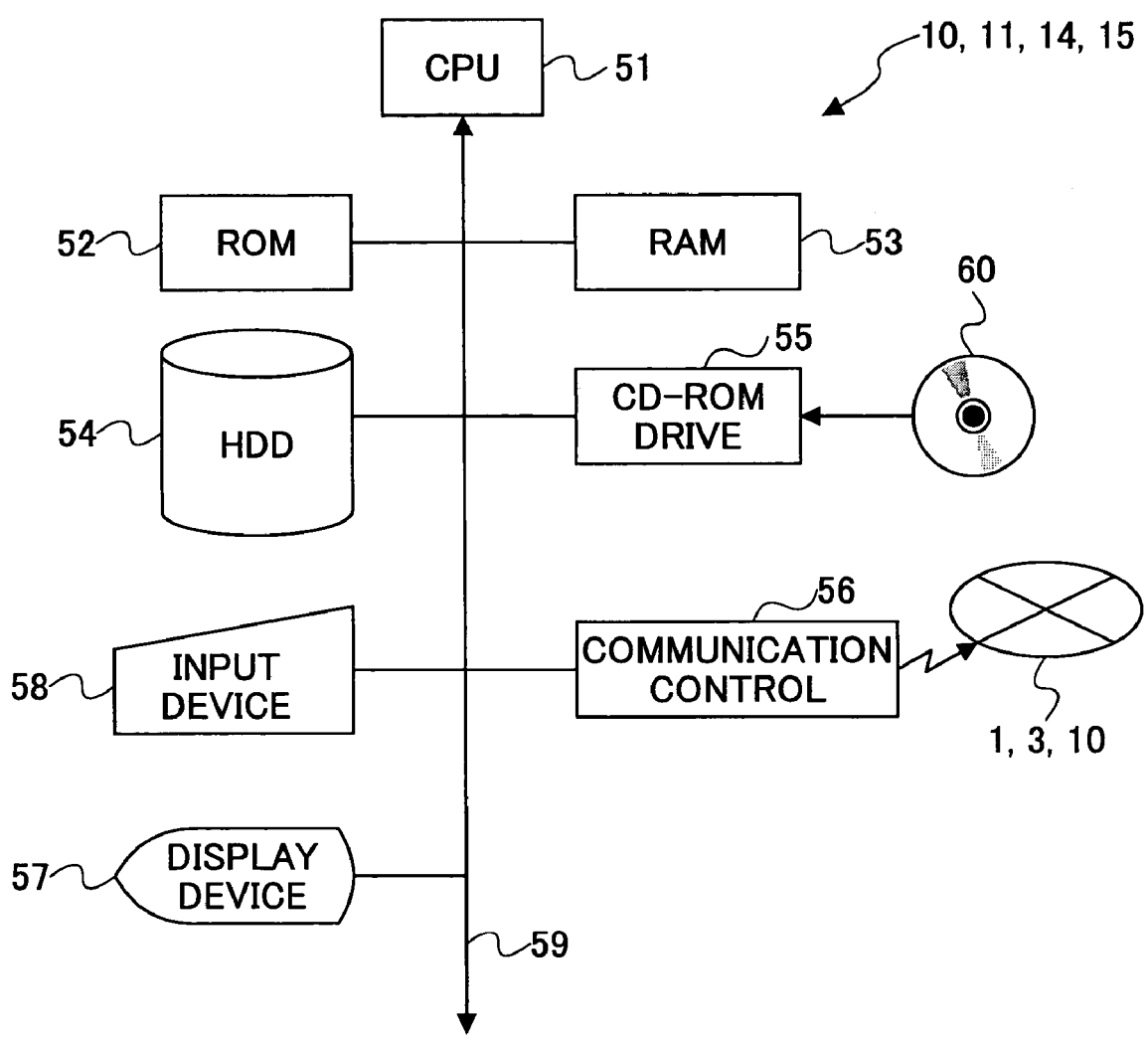
FIG. 19 illustrates a hardware configuration of a personal computer or so.

FIG. 19 shows an outline hardware configuration of each of the personal computers 10, 11, 14 and 15, which may act as an image processing apparatus also according to the first embodiment of the present invention and utilize the composite machine 12 or 16 as an image server. As shown, the personal computer 10, 11, 14 or 15 has a CPU 51 performing information processing, a ROM 52 storing information, a RAM 53 acting as a primary storage, an HDD 54 storing compressed code data downloaded externally from the Internet 10 or the network 1 or 3, a CD-ROM drive 55 for storing information, dispatching information externally, or obtaining information externally, a communication control device 56 for communications with external other computers or so via the networks 1, 3 and 10, an CRT or an LCD 57 providing a display of processing progress or processing result to an operator, and an input device 58 such as a keyboard or a mouse by which an operator inputs instructions or data. A bus controller 59 performs arbitration of data communicating among these respective parts/devices, and thus, the personal computer operates properly.

As the RAM 53 has a function of storing rewriteable various sorts of data, it provides a function as a work area of the CPU 51.

In the person computer 10, 11, 14 or 15, when a user turns on the power supply thereto, the CPU 51 starts a loader program in the ROM 52, reads in a program called an operation system for controlling hardware and software of the computer from the HDD 54, and starts the operation system. The operating system starts various sorts of programs according to instructions of a user, reads information or stores it. Windows (registered trademark), UNIX (registered trademark) or so is well-known as this operating system, for example. Operation programs run on the operating system are called application programs.

Each of the personal computers 10, 11, 14 and 15 stores a code transform processing program in the HDD 54 as an application program. In this view, the HDD 54 functions as a recording medium storing a decoding processing program.

Furthermore, as a common practice, the operation program installed in the HDD 54 of the personal computer 10, 11, 14 or 15 is first recorded in an optical information recording medium such as a CD-ROM or DVD-ROM, or a magnetic information recording medium such as a floppy disk or so, and after that the operation program is installed in the HDD 54 therefrom. Therefore, each of these carriable optical or magnetic information recording mediums such as CD-ROM 60, floppy disk or so may also act as a recording medium storing the decoding processing program. Furthermore, the decoding processing program may be obtained externally via the communication control device 56, for example, and after that, is installed in the HDD 54.

According to the first embodiment of the present invention, in the above-described system configuration, in use of the composite machine 12 as an image server, for example, tamper resistant additional information is embedded into image data stored in the composite machine 12 by which tamper of the image data cannot be performed easily by a user even after the image data is dispatched to the user. In fact, if the user trampers the image data and stores the same again, the tamper resistant additional information is lost or changed due to the tamper operation, and the loss or change of the tamper resistant additional information is then detected by the machine. Thereby, illegal copy or tamper of the image data can be prevented substantially.

First, a principle of such a function of the first embodiment will now be described. According to JPEG 2000 which the first embodiment applies, the predetermined packet length is described in a packet header of a code stream. Then, upon decoding, decoding of code data is performed assuming that the above-mentioned predetermined packet length of the data occurs. However, if a special code such as 0xFFF or so occurs before the above-mentioned predetermined packet length is completed, the device recognizes that the end of packet occurs there, and, thus, the following data is skipped until the above-mentioned predetermined packet length is completed. In other words, the area subsequent to the code 0xFFF is regarded as an 'off-rule zone' for which decoding is not performed according to JPEG 2000 standard rule. Accordingly, such an off-rule zone can be utilized as a space in which the above-mentioned tamper resistant additional information or so (additional information) is embedded as a code.

Figure 20A:
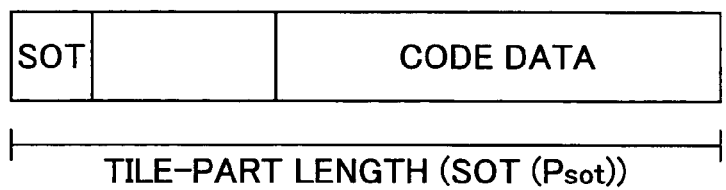
FIGS. 20A and 20B illustrate conditions of a code stream before and after additional information is embedded thereto with a use of the SOT marker.

For example, according to the first embodiment, the above-mentioned SOT marker added at a tile code sequence for starting the tile in the code format is used. As shown in FIG. 20A, according to the JPEG 2000 standard rule, the code data ends at the position of a tile-part length which is defined by Psot of the SOT marker. Then, according to the first embodiment, the value of Psot of the SOT marker is changed to the value of a new tile-part length which includes an area describing the code 0xFFF and the above-mentioned off-rule zone, vas shown in FIG. 20B. As mentioned above, the code 0xFFF is the terminating code by which a drive recognizes that the end of code data occurs there even the tile-part length defined by Psot has not been reached yet. Then, the thus-created off-rule zone after the terminating code 0xFFF is used for embedding the additional information according to the first embodiment of the present invention. As a result, the thus-embedded additional information is not decoded according to the JPEG 2000 standard rule.

Figure 21:
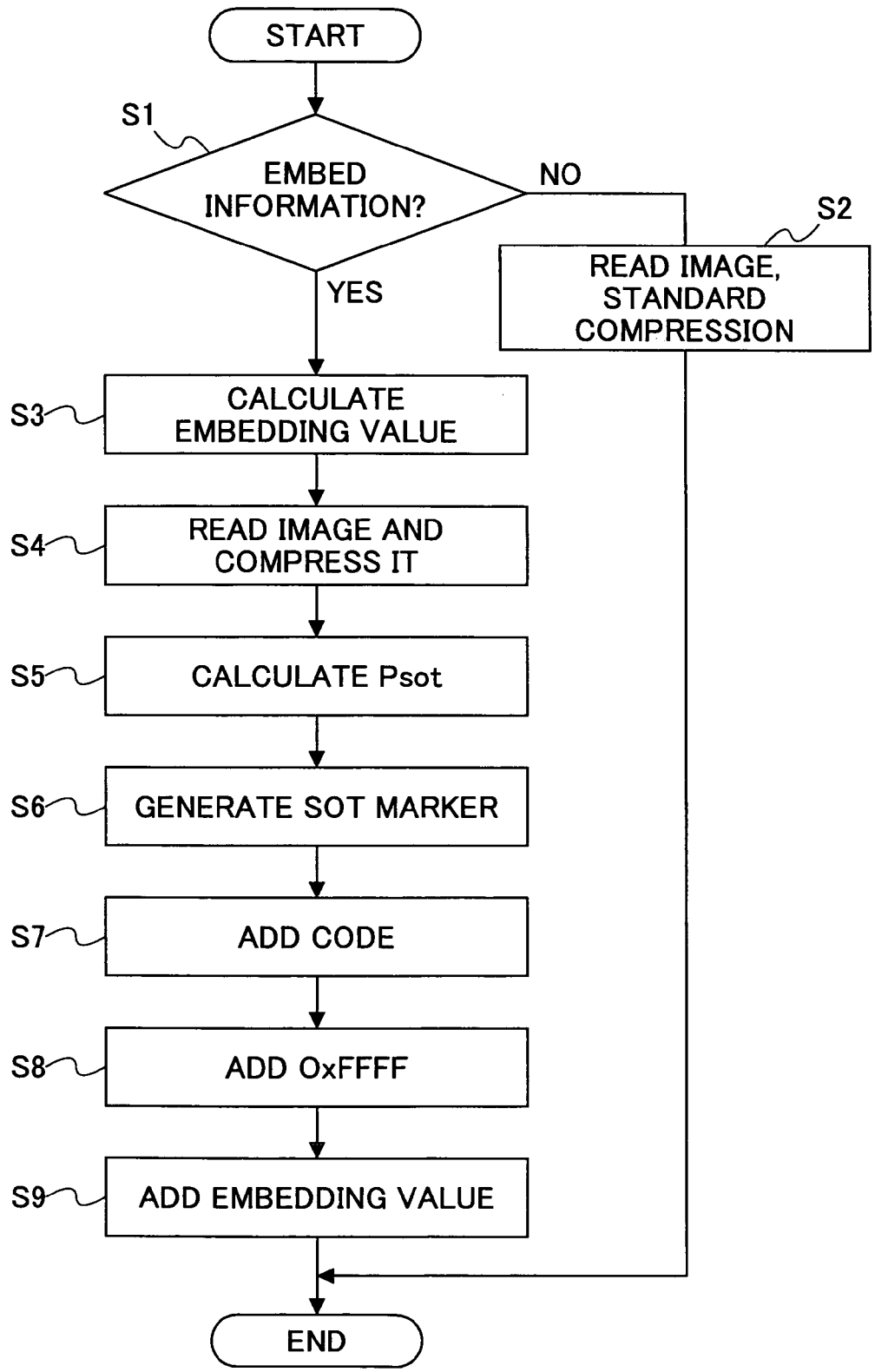
FIG. 21 shows an operating flow chart of an example of additional information embedding processing.

FIG. 21 shows an operation flow performed by the composite machine 12, for example, for embedding the above-mentioned tamper resistant additional information in the above-mentioned off-rule zone for each tile unit (which is treated as a data unit for processing according to JPEG 2000 as mentioned above). First, before actual processing, it is determined whether or not processing of embedding the tamper resistant additional information in Step S1. It is an option for a user to determine whether or not additional information is embedded into relevant image data. Specifically, the user (server manager) can select this option via the operation panel 31 or via the server 13. When the user does not wish embedding of additional data (No in Step S1), the scanner is made to read an original image, and, according to the JPEG 2000 standard rule, the encoder/decoder 32 is made to perform a standard compression processing. In this case, the tile-part header has a configuration such as that shown in FIG. 20A.

On the other hand, when the user wishes to embed the tamper resistant additional information, and inputs a relevant instruction to the composite machine 12 (Yes in Step S1), an embedding value V which acts as the tamper resistant additional information is calculated in Step S3. There, as the SOT marker for tile unit is used according to the embodiment, for example, a calculation formula of tile index Isot is used, and, thus, the embedding value V=Isot is produced.

Then, the scanner 27 is made to read the original image, and, then, the encoder/decoder 32 is made to perform the standard compression processing in Step S4. Then, in Step S5, the length defined by Psot (bytes) of the SOT marker is calculated. In this example, $$Psot=(\text{tile-part length})+2$$

Figure 20B:
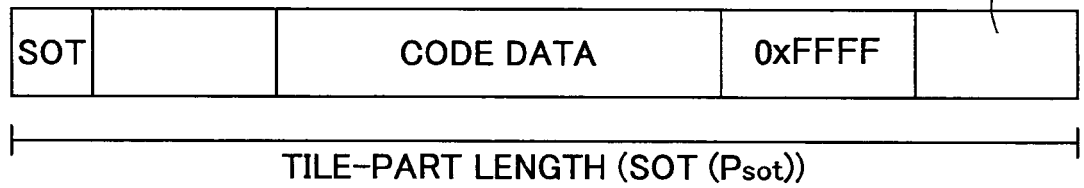

The above-mentioned (tile-part length) includes the length of the compressed code stream and the header length. Thus, 2 bytes are added in this calculation for embedding additional information. Then, in Step S6, the thus-calculated Psot is used and the SOT marker is produced in the code stream. Then, in Step S7, the code stream obtained from the compression processing is added to the existing code stream. Then, after the thus-added code data, 0xFFF is added as the terminating code as shown in FIG. 20B, in Step S8. After that, subsequent to the terminating code 0xFFF, as shown in FIG. 20B, the tamper resistant additional information, i.e., the above-mentioned embedding value V, is embedded as a code for the 2 bytes added as mentioned above to the value defined by Psot, as shown in FIG. 20B. Then, the original image data is stored in the memory as code data in a state in which, during the compression and coding process, in the code stream, the tamper resistant additional information is embedded in the off-rule zone after the terminating code 0xFFF which area is not decoded according to the JPEG 2000 standard rule. In the composite machine 12, by applying the scheme of embedding the tamper resistant additional information, code data is stored while tamper protection is achieved, while the composite machine 12 acts as an image server.

Figure 22:
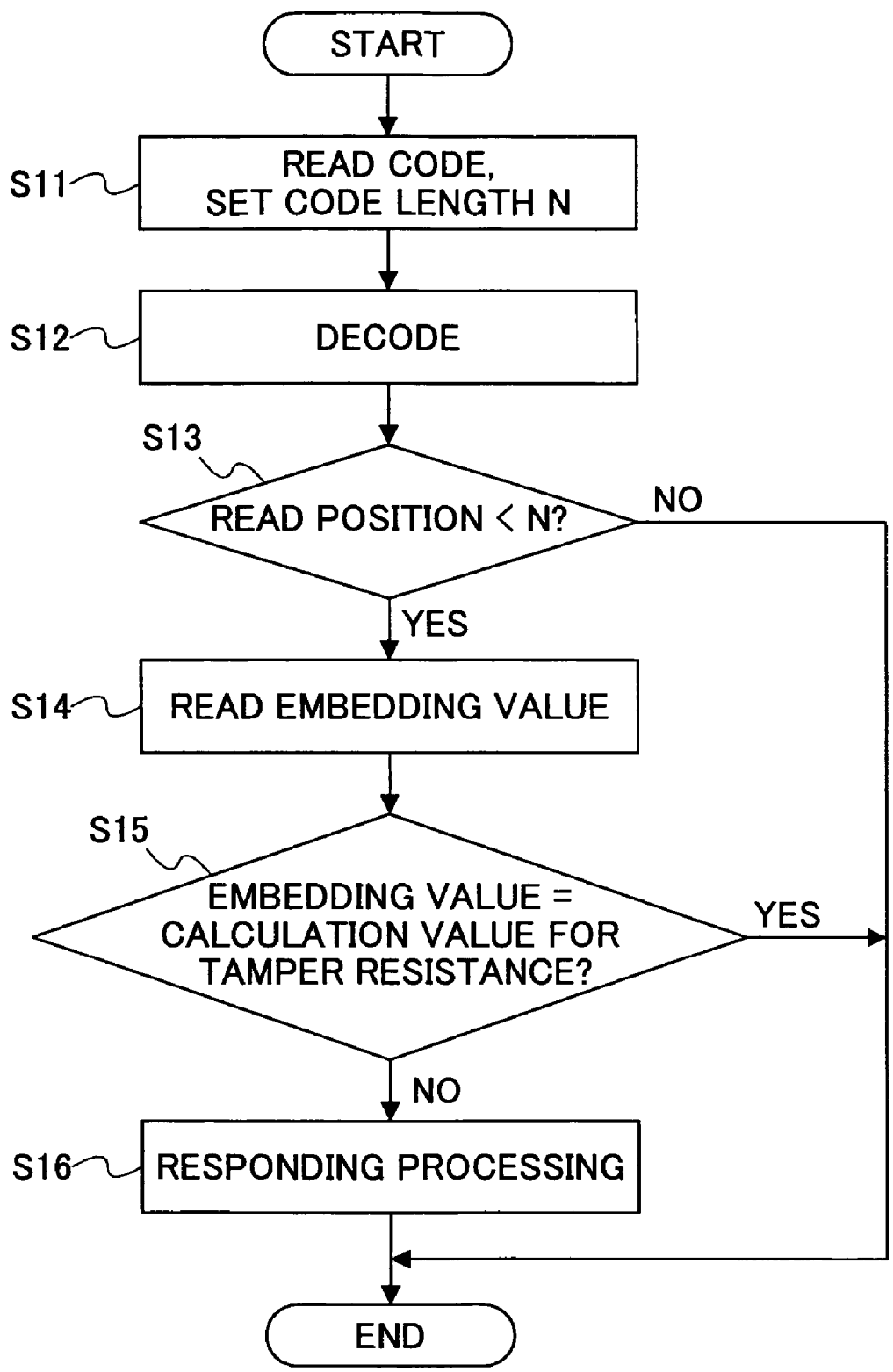
FIG. 22 shows an operating flow chart of an example of additional information decoding processing.

FIG. 22 shows an operation flow of decoding processing for tile units performed by any one of the personal computers 10, 11, 14 and 15 when the personal computer accesses the image data thus stored in the composite machine 12. First, the personal computer reads code data (code stream) corresponding to desired image data, and reads the SOT marker thereof. Thus, the code length N is recognized and is held in Step S11. After that, decoding processing is performed on the code data with the encoder/decoder 32 in Step S12. After the completion of the decoding processing, a comparison is made between the actual code length thus read in and the code length N recognized and held as mentioned above, in Step S13. When both the lengths are equal to one another (No in Step S13), the current processing is finished, and the decoded result is output.

However, when the actual code length read in, at the time of decoding completion is smaller than the code length N held (Yes in Step S13), it is determined that the terminating code 0xFFF is included there, and then, additional information is embedded in the off-rule zone occurring after the terminating code. Then, the tamper resistance additional information embedded in the off-rule zone is read out, in Step S14. Then, a comparison is made between the value of the thus-read additional information (embedding information) and the calculation value for tamper resistance calculated by the above-mentioned calculation formula in Step S15. When both are equal to each other (Yes in Step S15), it is determined that the relevant data was properly provided by the composite machine 12 and thus the data includes no tamper. Then the processing is finished and the decoded result is output. On the other hand, in case some illegal temper is made on the relevant data before it is provided, the value of the read additional information (embedding information) differs from the calculation value for tamper resistance accordingly, and, thus, the tamper is detected as the comparison result indicates disagreement (No in Step S15). In this case, predetermined additional information responding processing corresponding to the relevant application is performed in Step S16.

Some examples of the above-mentioned predetermined additional information responding processing in Step 16 will be described now. For example, in case tamer is detected in Step 15, the decoding operation on the relevant code data is forcibly ended. In other words, in case of tamper is made on data, decoding thereof is feasibly ended, and thus, it is possible to substantially prevent copy or tamper of the relevant image data.

Alternatively, in case tamper is detected in Step S15, an alarm indicating this matter is raised. In this case, the alarm may be one displaying that it is not possible to properly decode the data, or so. Also by such an alarm, it is possible to substantially prevent copy or tamper of the relevant image data.

Alternatively, in case tamper is detected in Step S15, the relevant portion of the code data is made not to be output (not displayed, not printed, or so). In the example of the present embodiment, as the tamper resistant additional information is embedded for each tile, it is possible to make the decoded result of the tile part for which tamper is detected not to be output. As a result, the thus-obtained whole image, which is a collection of the thus-obtained decoded respective tile parts, is made unclear to the extent according to the number of the tampered tile parts detected. Also by such an alarm, it is possible to substantially prevent copy or tamper of the relevant image data.

In fact, in case the above-mentioned code data is illegally copied with a use of a personal computer or so which is configured according to the present embodiment but only according to the JPEG 2000 standard rule, the addition information embedded in the off-rule zone cannot be decoded, and, thus, cannot be copied. After that, the server which originally provides the relevant image can detect the illegal copy by determining whether or not the code data properly includes the additional information originally embedded in the off-rule zones, in the same manner as that in the above-mentioned tamper detection.

In the present embodiment, the SOT marker for tile beginning added to the top of each tile code sequence is utilized for inserting the terminating code 0xFFFF for creating the off-rule zone in which the additional information is embedded. However, any other way may also be applied (Same in each of the following embodiments). For example, the terminating code 0xFFFF may be provided in the main header zone in the code stream. For this purpose, the terminating code 0xFFFF may be provided at a position before the position of the end of the code length defined by the PLM marker describing the main header packet length, the TLM marker describing the main header tile part length, the PPM marker describing collectively the main header packet headers, or the COM marker for the comments, mentioned above in the description for the code format. Alternatively, the terminating code 0xFFFF may be provided in the actual code data in the code stream. For this purpose, the terminating code 0xFFFF may be provided at a position before the position of the code length defined by the PLT marker describing the tile header packet length, the PPT marker describing collectively the tile header packet headers, or the COM marker for the comments, mentioned above in the description for the code format.

Further alliteratively, without using the terminating code 0xFFFF, it is also possible to embed the code of the additional information with a use of a zone subsequent to the EOC marker indicating the code end at the end of the code stream as the off-rule zone. FIG. 23A illustrates a typical example of a code stream according to JPEG 2000 standard rule, while FIG. 23B illustrates an example of the code stream in which the additional information is embedded in use of a zone subsequent to the EOC marker as the off-rule zone.

Furthermore, although not shown as a figure, it is also possible to embed the additional information in a form of a code in the comment space of the COM marker for comments. Furthermore, it is also possible to embed the additional information in the off-rule zone of a marker itself other than the COM marker in a form of a code. For example, the additional information may be embedded in a form of a code in the TLM marker itself which is originally provided to be used for the main header tile part length; or the value Ltlm which indicates the length of the TLM marker may be extended for the length of the additional information; or, the additional information may be embedded in a form of a code subsequent to a marker itself other than the COM marker, or so.

In the present embodiment, management information such as the name of the creator of the data, the date at which the data is updated, the location where the data is stored or so may also be embedded in a code as the additional information, and the description will now be made assuming that the present embodiment is applied to the composite machine 12 or 16. However, the composite machine 12 or 16 according to the present embodiment should not necessarily be connected to the network but may be configured as a sole/independent machine. Furthermore, according to the present embodiment, the additional information made of the management information is embedded with a use of the zone subsequent to the EOC marker indicating the code end at the end of the code stream.

Figure 24:
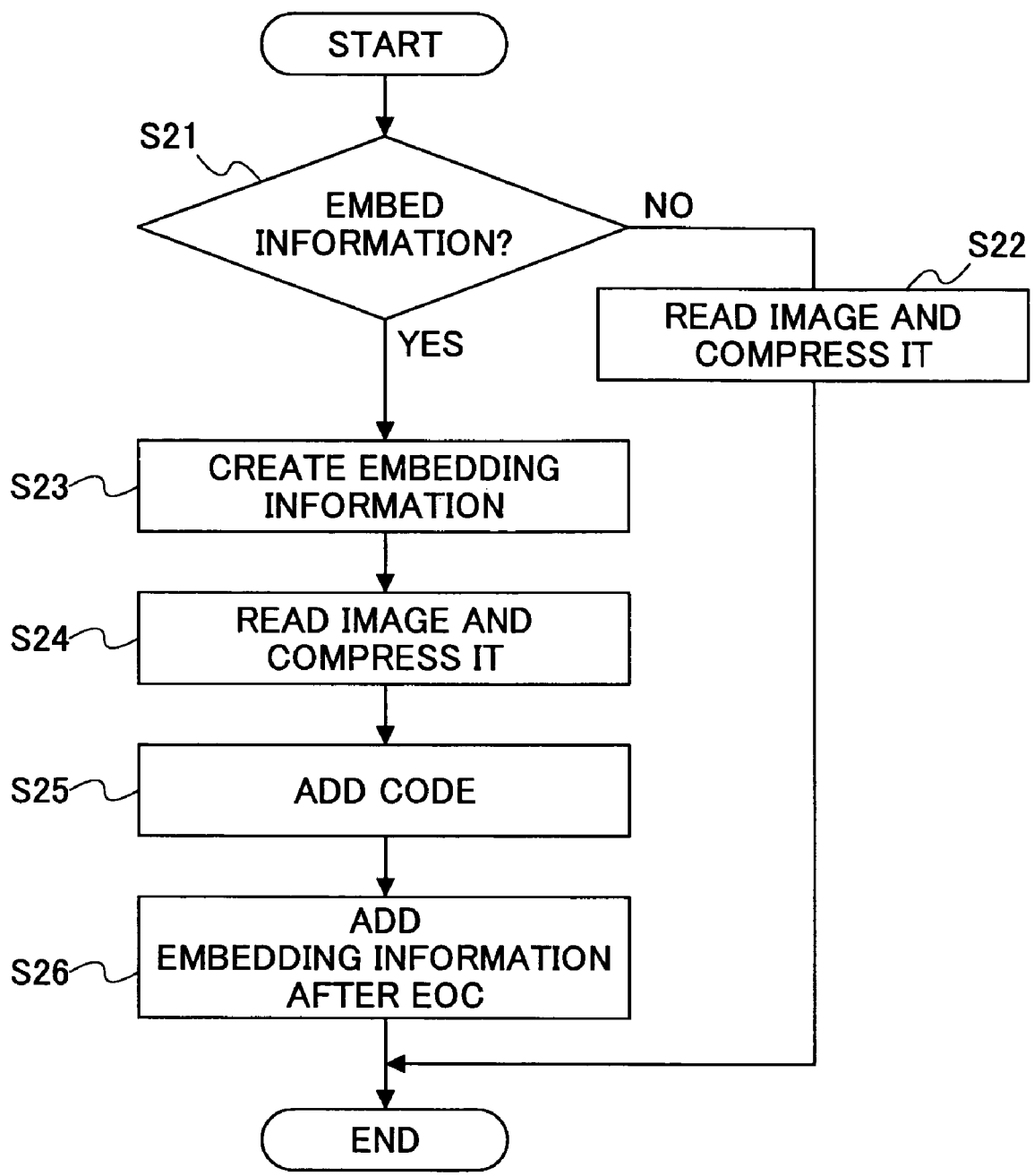
FIG. 24 shows an operating flow chart of an example of additional information embedding processing according to a second embodiment of the present invention.
Figure 25:
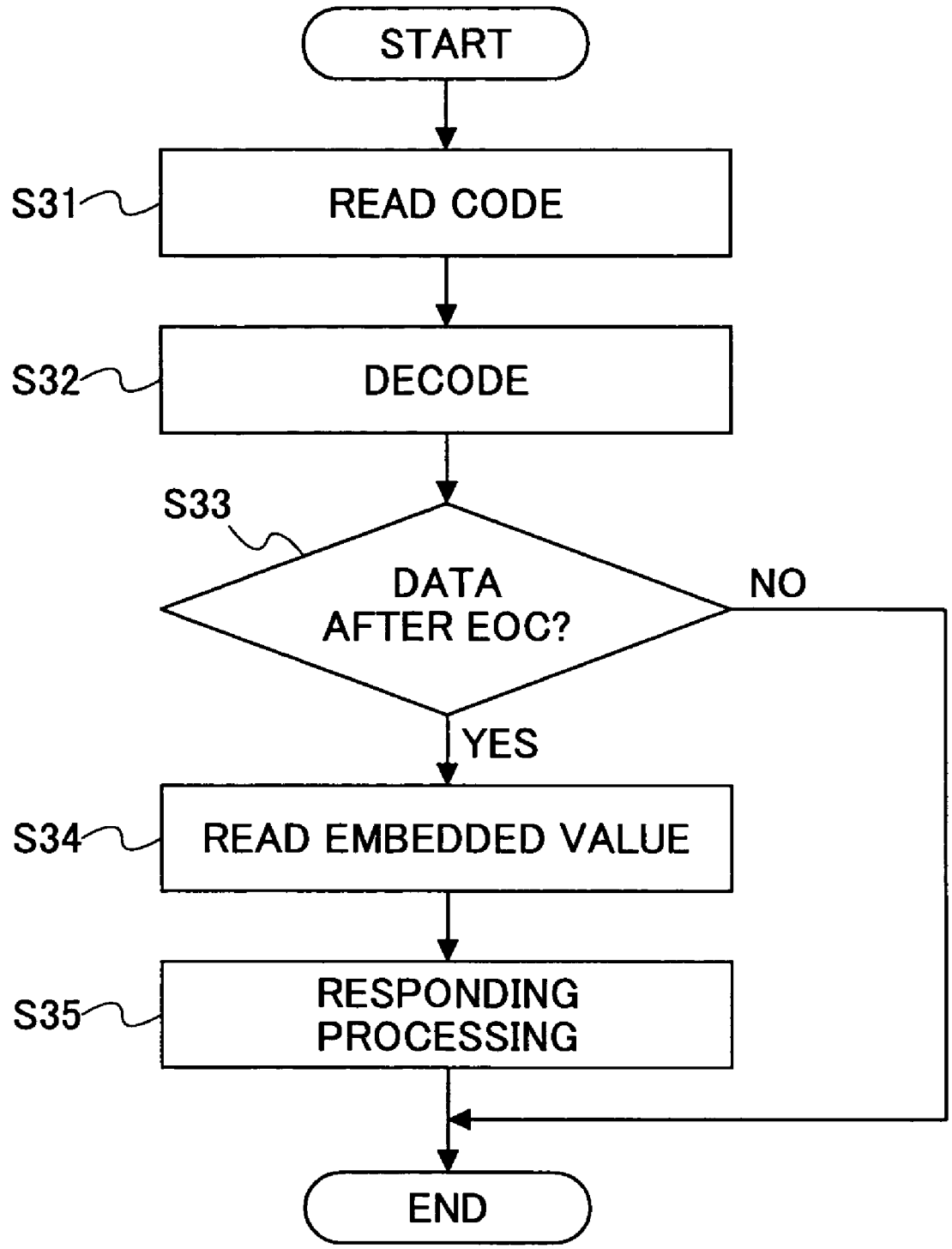
FIG. 25 shows an operating flow chart of an example of additional information decoding processing.

FIG. 24 illustrates an example of processing performed by the composite machine 12, for example, for embedding the additional information made of the management information in the off-rule zone subsequent to the EOC marker in the code stream according to a second embodiment of the present invention. First, in prior to the processing, it is determined whether or not the additional information made of the management information is embedded in Step S21. It is an option of the user to determine whether or not the additional information concerning the relevant image data is embedded to the image data, and the user may input instructions to the composite machine 12 via the operation panel 31 or via the server 13 for this purpose. When no instructions for embedding the additional information is made (No in Step S21), the scanner is made to read the original image, and then, according to the JPEG 2000 standard rule, the coder/decoder 32 is made to perform standard compression processing in Step S22.

On the other hand, when instructions for embedding the additional information made of the management information are given (Yes in Step S21), the composite machine 12 creates the additional information. As the additional information made of the management information, for example, any information which is useful for managing the image data may be applied, i.e., the file name, access right, access date, person who possesses the data, user of the data, a folder in which the relevant file is stored, or so, and thus, the additional information is created in such a way in Step S23.

After that, the scanner 27 is made to read the original image, and the encode/decoder 32 is made to perform standard compression operation in Step S24. The actual data thus obtained is added in a code stream in Step S25, and, after the EOC marker added to the end of the code stream, the additional information made of management information is embedded in a form of a code, as shown in FIG. 23B, in Step S26.

FIG. 24 illustrates an outline of an example of decoding processing performed for decoding the data thus-produced and stored in the composite machine 12 for a use of the above-mentioned management information. First, the code data (code stream) of desired image data is read in Step S31. Then, the encoder/decoder 32 performs decoding of this read data in Step S32. After that, it is determined whether or not code data (additional information) occurs subsequent to the EOC marker at the end of the relevant code stream in Step S33. When the code data occurs there (Yes in Step S33), the embedded code data is read even it occurs in a zone subsequent to the EOC marker in Step S34. Based on the thus-read additional information made of the management information, predetermined additional information. responding processing according to a particular application is executed in Step S35.

Several examples of the processing performed in Step 35 will now be described. For example, with a use of the image data management information of the additional information, a file arrangement operation may be executed. Specifically, with a use of the management information such as the image creator, updated date, storage location or so, a file arrangement operation concerning the image data can be performed. Alternatively, it is possible to make an access control operation for the image data with a use of the image data management information of the additional information. Specifically, with a use of the management information such as the access right, the possessor or so, the access control can be performed for the image data. In any way, as the management information is embedded in the data file of the relevant image data integrally as the additional information, a file management operation with a use of the management information can be easily achieved as long as a composite machine which handles this data file has an encoder/decoder configured to properly interpret the data according to the present embodiment. In case where a composite machine which handles this file data does not have such an encoder/decoder configured to properly interpret the data according to the present embodiment, the additional information made of the management information cannot be used, and thus, in this case, discrimination can be achieved.

In case where the composite machine 12 is used for performing real-time facsimile transmission, it is advantageous when the additional information made of management information embedded in the off-rule zone subsequent to the EOC marker includes information concerning the size of the relevant image. That is, in case of real-time facsimile transmission in which an original image to be transmitted is transmitted at the same time in which it is read in sequence, the size of the image being transmitted cannot be determined until all the image is read in. Accordingly, the maximum size should be set as image size information to be transmitted first. However, after the entire image is completely read in, the size of the image can be precisely recognized by the composite machine 12. After that, the machine embed the image size information thus obtained in the off-rule zone subsequent to the EOC marker as the additional information, which is then made to be transmitted by the composite machine. Thereby, another composite machine which is configured according to the present embodiment and receives the thus-transmitted data reads the data subsequent to the EOC marker, and, thus, can precisely recognize the image size therefrom.

A third embodiment of the present invention will now be described with reference to FIGS. 26 and 27. The third embodiment is same as the above-mentioned first embodiment; except that the contents of the additional information embedded in the off-rule zone of the code sequence is image position information concerning image area classification.

The image position information concerning image area classification is information indicating an image type in which the relevant image data belongs to for each area/portion thereof. The image type means, for example, an edge portion, a character/letter portion, a picture portion, a halftone-dot position, or so, which is determined according to the relevant image feature which the relevant image part (tile part, for example) has. The thus-embedded additional information made of image position information concerning image area clarification may be utilized for decoding the relevant image data. The description will now be made assuming that the present embodiment is applied to the composite machine 12 or 16. However, the composite machine 12 or 16 according to the present embodiment should not necessarily be connected to the network but may be configured as a sole/independent machine. Furthermore, according to the present embodiment, the additional information made of the image position information concerning area clarification is embedded with a use of the zone subsequent to the EOC marker indicating the code end at the end of the code stream.

Figure 26:
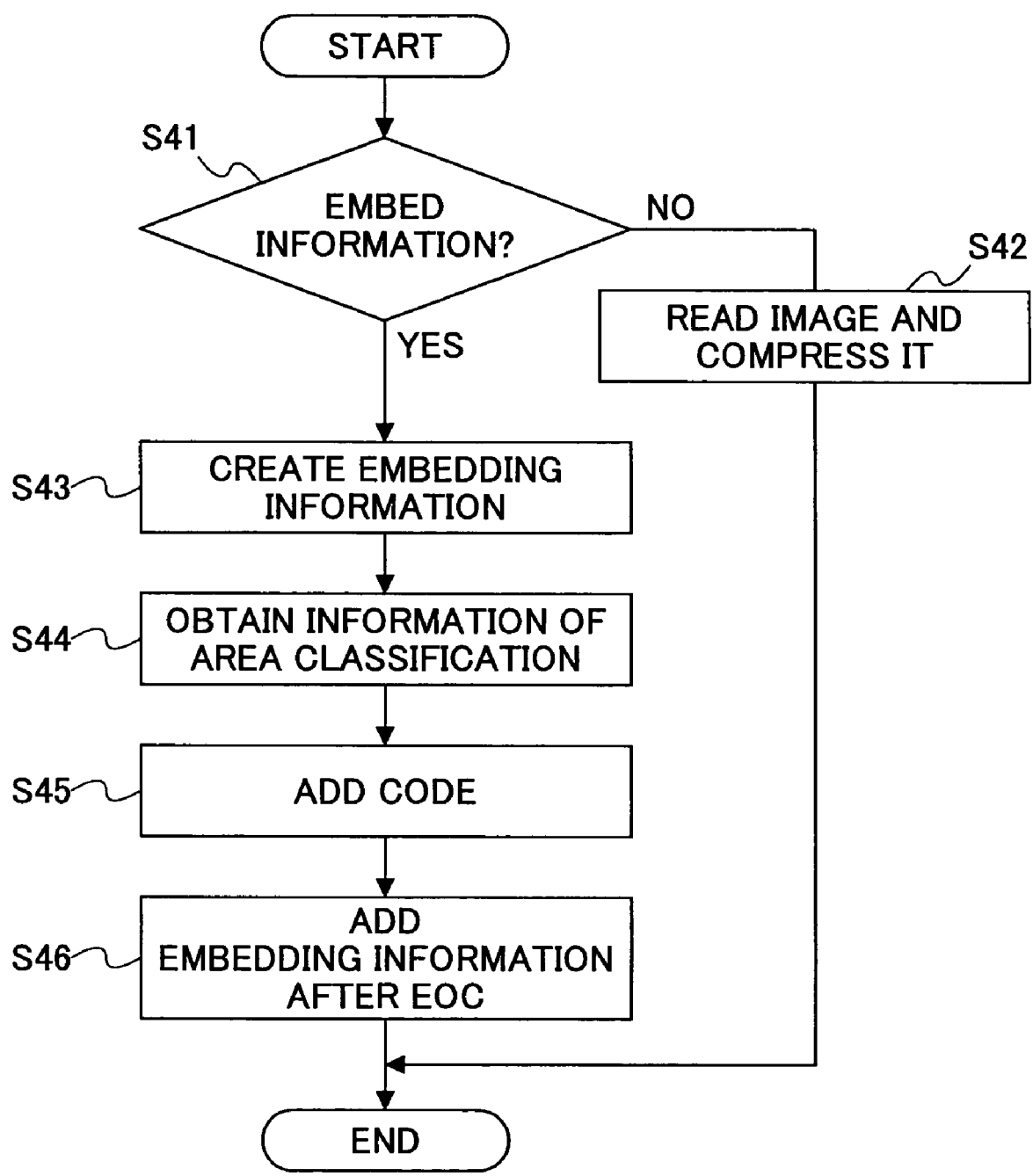
FIG. 26 shows an operating flow chart of an example of additional information embedding processing according to a third embodiment of the present invention.

FIG. 26 illustrates an example of processing performed by the composite machine 12, for example, for embedding the additional information made of the management information in the off-rule zone subsequent to the EOC marker in the code stream according to the third embodiment of the present invention. First, in prior to the processing, it is determined whether or not the additional information made of the management information is embedded in Step S41. It is an option of the user to determine whether or not the additional information concerning the relevant image data is embedded to the image data, and the user may input instructions to the composite machine 12 via the operation panel 31 or via the server 13. When no instructions for embedding the additional information is made (No in Step S41), the scanner is made to read the original image, and then, according to the JPEG 2000 standard rule, the coder/decoder 32 is made to perform standard compression processing in Step S42.

On the other hand, when instructions for embedding the additional information made of the management information are given (Yes in Step S41), the composite machine 12 causes the scanner 27 to read the original image and causes the encoder/decoder 32 to perform compression operation on the thus-read image data according to JPEG 2000 standard rule in Step S43. During this process, by applying the well-known image area classification function such as that disclosed in Japanese laid-open patent application No. H07-203198 described above, or so, the relevant image data is classified into an edge portion, a character/letter portion, a picture portion, a halftone-dot portion or so according to the relevant image features. Thus, the image position information concerning image area classification is obtained in Step S44.

After that, in Step S45, the actual data thus obtained is added in a code stream, and, then, after the EOC marker added to the end of the code stream, the additional information made of the image position information is embedded in a form of a code, as shown in FIG. 23B, in Step S46.

Figure 27:
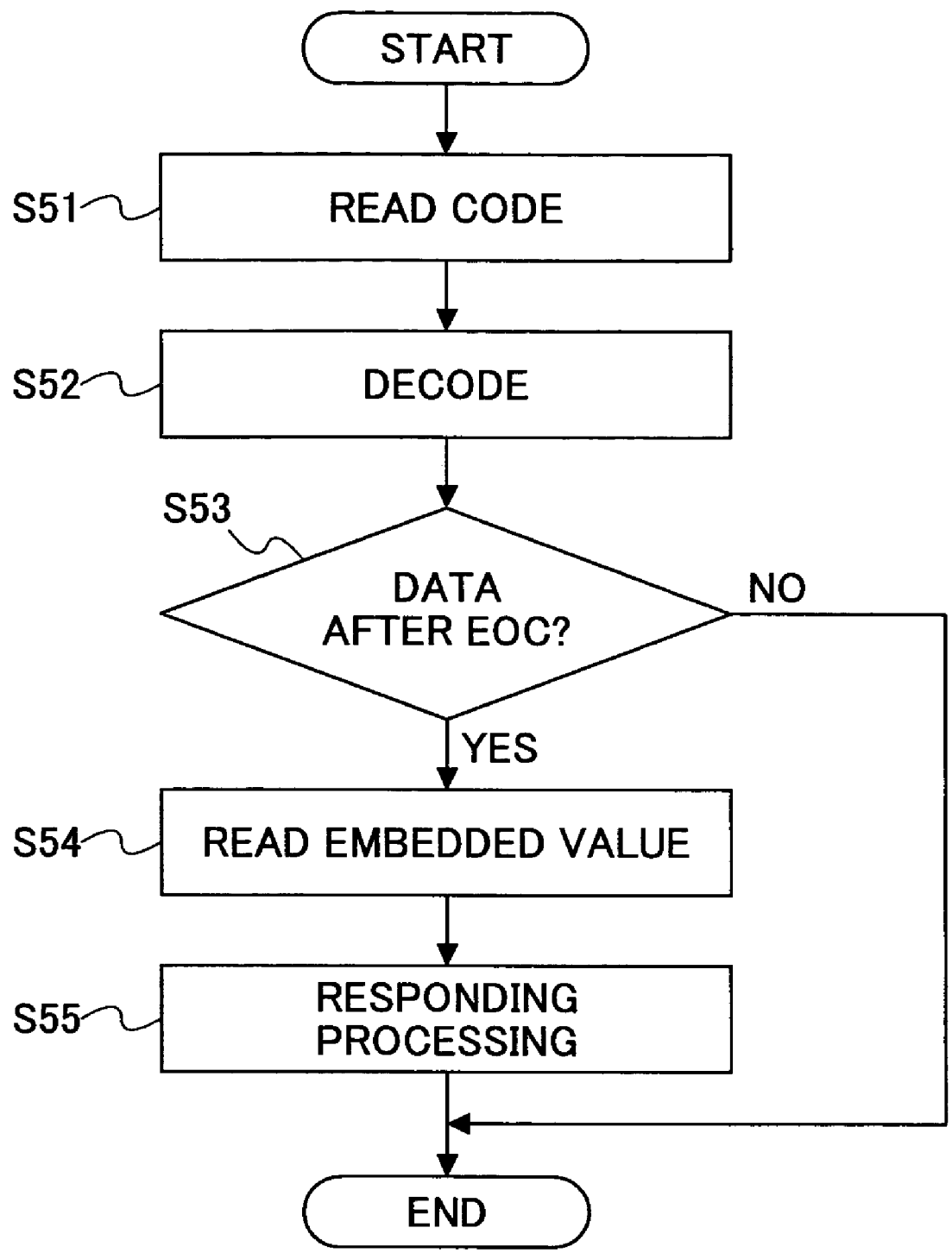
FIG. 27 shows an operating flow chart of an example of additional information decoding processing.

FIG. 27 illustrates an outline of an example of decoding processing performed for decoding the data thus-produced and stored in the composite machine 12 for a use of the above-mentioned image position information concerning image area classification. First, the code data (code stream) of desired image data is read in Step S51. Then, the encoder/decoder 32 performs decoding of this read data in Step S52. After that, it is determined whether or not code data (additional information) occurs subsequent to the EOC marker at the end of the relevant code stream in Step S53. When the code data occurs (Yes in Step S53), the embedded code data is read even it occurs in a zone subsequent to the EOC marker in Step S54. Based on the thus-read additional information made of the image position information concerning image area classification, predetermined additional information responding processing according to a particular application is executed in Step S55. For example, image processing such as filtering processing or so is performed on the code data during the decoding processing in appropriate manners adapted to the respective image areas/portions (for the respective classified image areas/portions).

Thus, in case the additional image is the above-mentioned image position information concerning image area classification which is made according to a relevant image feature such as that of an edge portion, a character/letter portion, a picture portion, a halftone-dot portion, or so, by using the relevant image position information, the composite machine can properly determine, without examining the compressed and coded image data itself, a position of the edge portion or so in the image according to the image position information. Thereby, not only in a case where the composite machine 12 or 16 itself performs printing out of the image data but also in a case where the same image data is sent to another personal computer which then performs printing out of the same, the relevant machine can properly determine the edge position or so. Accordingly, the machine can perform proper manner of image processing for the respective position of the image, and as a result, it can reproduce (print out or display) the image which has no degradation of image edge sharpness or so.

Especially, different from the case of the above-mentioned Japanese laid-open patent application No. H07-203198, the image position information concerning image area classification of the relevant image is embedded in the image data file integrally as the additional information. Accordingly, as long as the composite machine which handles the image code data has an encoder/decoder configured according to the present embodiment, the proper image processing can be achieved in use of the image position information concerning image area classification. In case where the composite machine which handles this file data does not have such an encoder/decoder configured according to the present embodiment, the additional information made of the image position information concerning image area classification cannot be used, and thus, in this case, discrimination can be achieved.

A fourth embodiment of the present invention will now be described with reference to FIGS. 28 and 29. The fourth embodiment is same as the above-mentioned first embodiment; except that the contents of the additional information embedded in the off-rule zone of the code sequence is image data which has an image quality different from the that of the original image data. Thereby, a payment system can be achieved. As in the first embodiment, image data having a different image quality is embedded as the additional information in the off-rule zone subsequent to the terminating code 0xFFFF provided at a position defined by the SOT marker.

Figure 28:
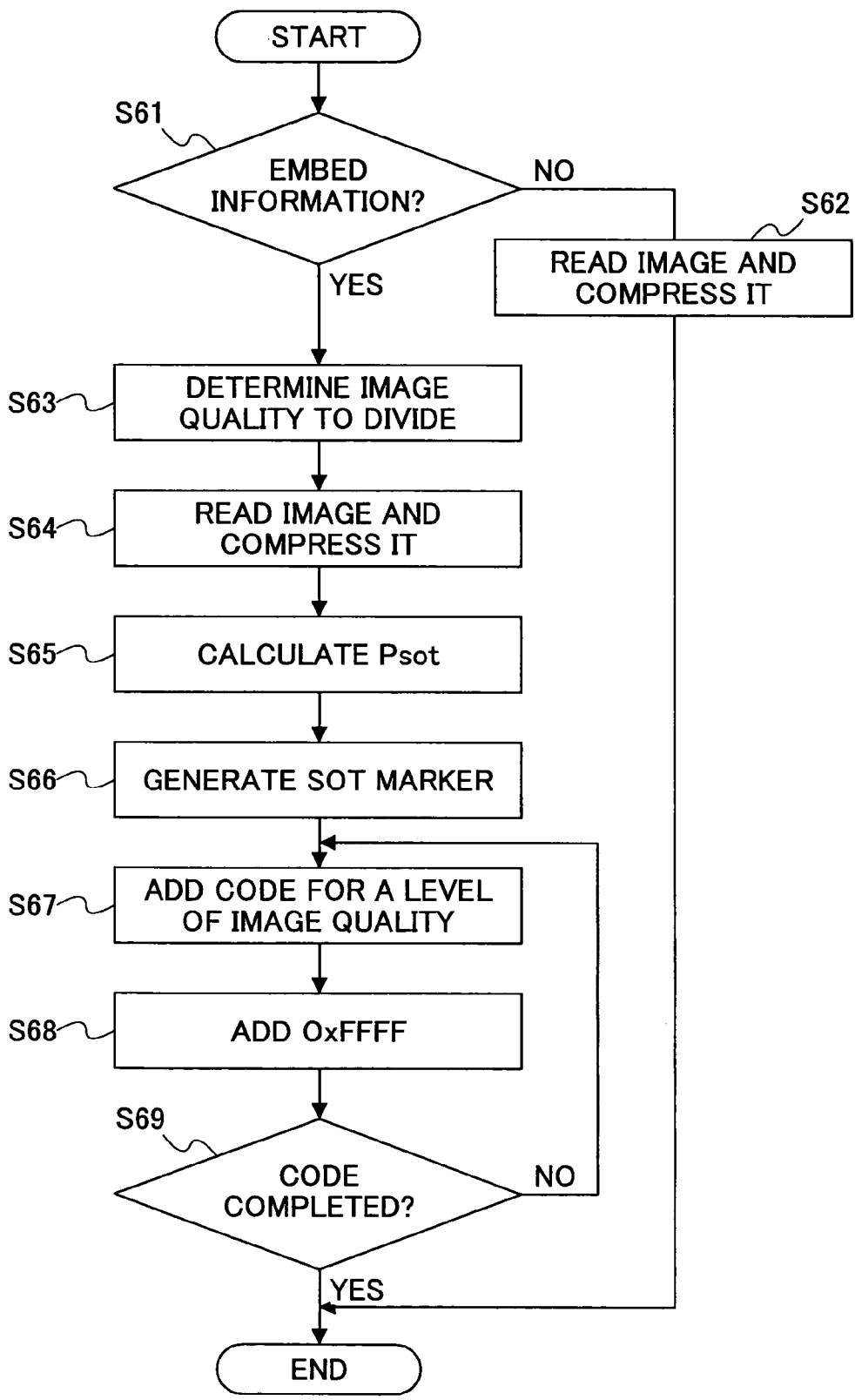
FIG. 28 shows an operating flow chart of an example of additional information embedding processing according to a fourth embodiment of the present invention.

FIG. 28 shows an example of an operation flow chart of an outline of processing performed by the composite machine 12, for example, for embedding, for each tile unit (which is one of a unit for data processing according to JPEG 2000 as mentioned above), image data having a different image quality. First, in prior to the processing, it is determined whether or not the additional information is embedded in Step S61. It is an option of the user whether or not the additional information concerning the relevant image data is embedded to the image data, and the user may input instructions to the composite machine 12 via the operation panel 31 or via the server 13. When no instructions for embedding the additional information is made (No in Step S61), the scanner is made to read the original image, and then, according to the JPEG 2000 standard rule, the coder/decoder 32 is made to perform standard compression processing in Step S62. In this case, each tile part of a code stream is produced as shown in FIG. 20A.

On the other hand, when instructions for embedding the additional information made of the management information are given (Yes in Step S61), the composite machine 12 determines image qualities of image data to be embedded in the off-rule zones of the code data defined by the terminating code 0xFFFF in Step S63. As described above with reference to FIGS. 5A through 5G, according to JPEG 2000, the image data is encoded while the image is divided into layers by which the image is divided according to image quality at several levels. By utilizing the borders thereof, the image data can be divided into plurality of sets of image data having different image qualities. At this time, the dividing borders applied should not be necessarily limited to the layer borders. Then, some of the thus-divided plurality of sets of image data having different image qualities may be removed from the original image data, and then, will be embedded in the off-rule zones as the additional information as will be described below.

After the determination of the image quality in Step S63, the machine 12 causes the scanner 27 to read the original image and causes the encoder/decoder 32 to perform compression operation on the thus-read image data according to JPEG 2000 standard rule in Step S64. After that the value of Psot which is the length of the relevant tile of the SOT marker is calculated in Step S65. In this example,

*Psot*=(tile-part length (compressed code stream length+header length)+2×(the number of the terminating codes 0x*FFFF* to be embedded)

The thus-calculated value of Psot is used to produce the SOT marker in the code stream (in Step S66), and the compressed first-level (highest) image-quality actual code data is added in the code stream in Step S67. Then, subsequent to the thus-added code data, the terminating code 0xFFFF is added in Step S68. Then, subsequent to the terminating code 0xFFFF, the second-level (second highest) image-quality actual code data is added in the same code stream in Step S67, as shown in FIG. 20B. Then, subsequent to the thus-added code data, the terminating code 0xFFFF is added again in Step S68. Steps S67 and S68 are repeated until the embedding of the various image-quality levels of image data is completed for the image qualities determined in Step S63.

Figure 29:
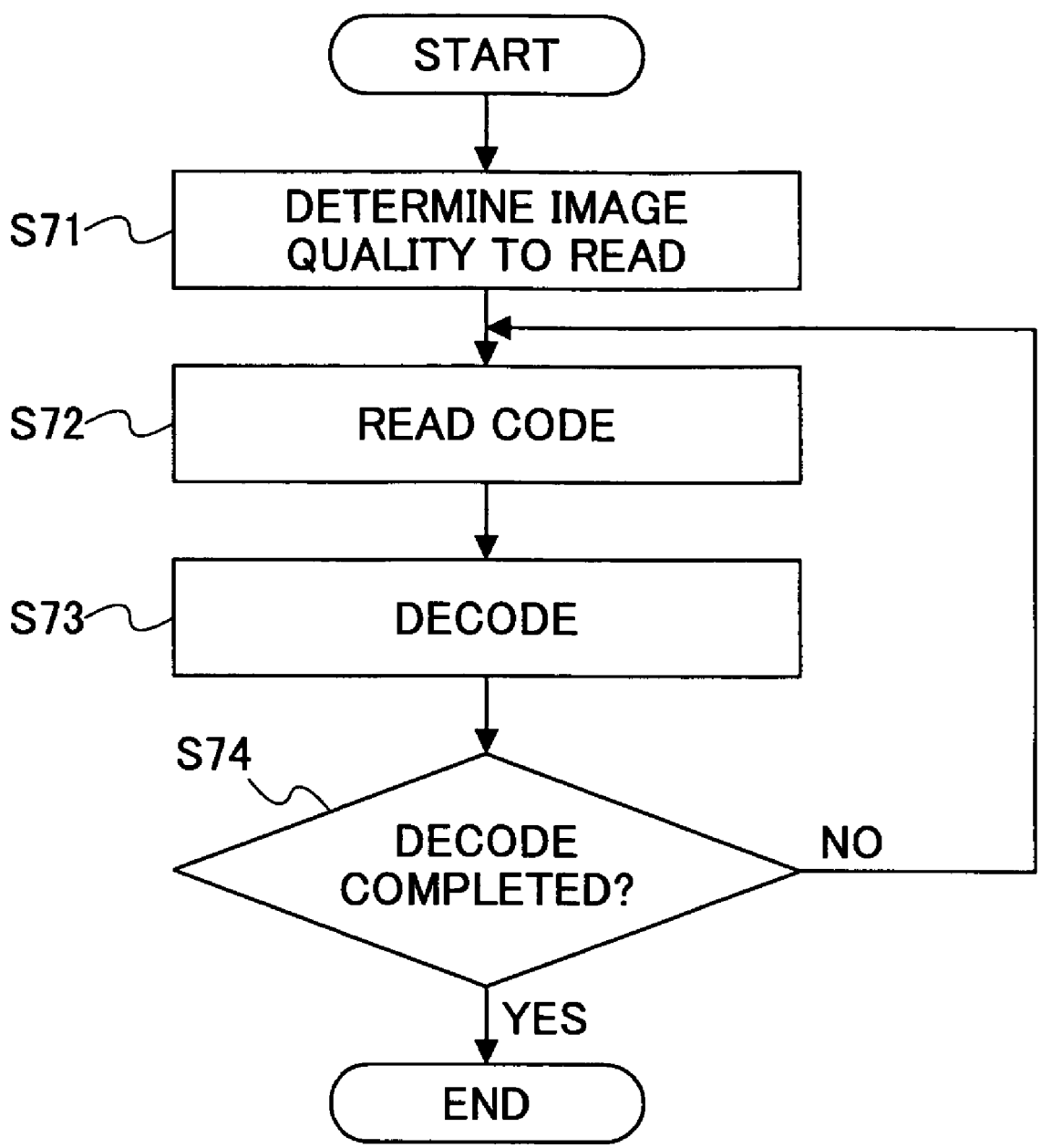
FIG. 29 shows an operating flow chart of an example of additional information decoding processing.

FIG. 29 illustrates an outline of an example of decoding processing performed for decoding the data thus-produced and stored in the composite machine 12, for a use of the above-mentioned image data having different image qualities. First, according to given payment condition information, the composite machine 12 determines the image qualities of image data to be read out, in Step S71. Then, the code data (code stream) of the relevant image data is read for a tile part and, from the SOT marker information thereof, the machine recognizes the code length N in Step S72. Then, for the thus-read code data for the tile part, the encoder/decoder 32 performs decoding processing in Step S73. Then, the machine 12 compares the thus read code length at the time of the completion of the relevant tile part code data with the code length N which is previously recognized, in Step S74. Thereby, it is determined whether or not the sets of image data thus decoded already become in agreement with those corresponding to the image qualities determined previously in Step S71. When the determination result indicates agreement (No in Step S74), the machine reads the subsequent image quality level of image data occurring subsequent to the terminating code 0xFFFF (Step S72), and decodes the same (Step S73). Steps S72 and S73 are repeated until the image qualities of the decoded sets of image data having different image qualities become in agreement with the predetermined image qualities to be provided according to the payment condition (Yes in Step S74).

Thus, by embedding sets of image data having different image qualities as the additional information, as long as an application (program) which can decode the additional information is applied, a payment system can be achieved. Specifically, for example, according to given payment condition information, i.e., how much a user paid, predetermined sets of image data having different image qualities are decoded, while remaining sets of image data are left un-decoded. As a result, with the thus-decoded predetermined sets of image data, the user can obtain the original image but within a predetermined precision (resolution) which is controlled according to the particular payment condition. Thus, a payment system can be easily achieved for the image server.

Fifth through sixteenth embodiments of the present invention will now be described.

Hereinafter, description will be made assuming that coded data (referred to as compressed code data, hereinafter) processed in each embodiment of the present invention is coded data of a still image according to JPEG 2000 (ISO/IEC FCD 15444-1) or coded data of a motion picture according to Motion-JPEG 2000 (ISO/IEC FCD 15444-3). Motion-JPEG 2000 is directed to a motion picture in which a plurality of consecutive still images are used as frames, and coded data of each frame is according to JPEG 2000, while a file format thereof is slightly different from JPEG 2000.

JPEG 2000 is an image compression/decompression scheme following JPEG and becomes an international standard in 2001. The algorithm thereof is, for example, described in detail in 'Next Generation Image Coding Scheme JPEG 2000' (written by Yasuyuki Nomizu, Triceps, Co., Ltd.), for example. The algorithm of JPEG 2000 will now be described in a range needed for describing the embodiments.

Figure 30:
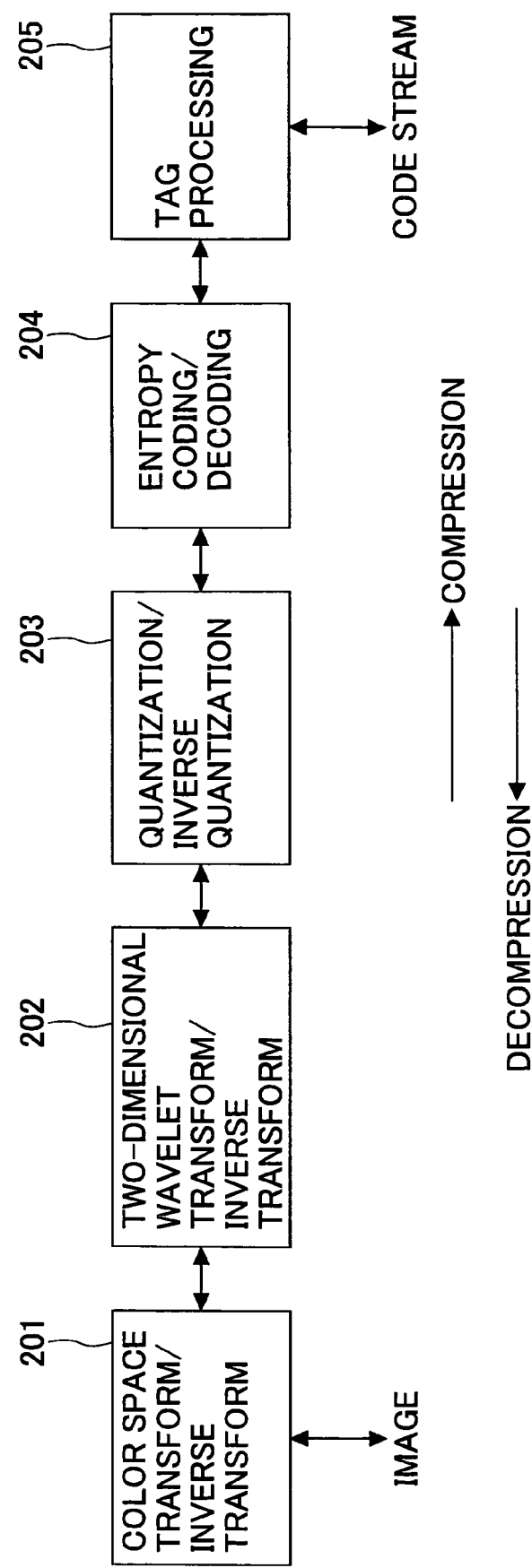
FIG. 30 illustrates a block diagram illustrating hierarchical coding/decoding algorithm which is a base of JPEG 2000.

FIG. 30 shows a block diagram illustrating hierarchical coding/decoding algorithm which is a foundation of JPEG 2000, which also describes image processing apparatuses according to the fifth through sixteenth embodiments.

The hierarchical coding/decoding algorithm which is a foundation of JPEG 2000 includes a two-dimensional wavelet transform/inverse transform part 202, a quantization/inverse quantization part 203, an entropy coding/decoding part 204 and a tag processing part 205. Thereamong, the tag processing part 205 is relevant to the embodiments of the present invention, and acts as a thumbnail information setting part or thumbnail information adding part, which will be described later. The two-dimensional wavelet transform/inverse transform part 202, quantization/inverse quantization part 203 and entropy coding/decoding part 204 are provided to supply image data to, or to process image data supplied from a color space transform/inverse transform part 201. Furthermore, these two-dimensional wavelet transform/inverse transform part 202, quantization/inverse quantization part 203 and entropy coding/decoding part 204 are provided to supply image data to, or to process image data supplied from the tag processing part 205. These processing parts may have different configurations between the respective forward direction and reverse direction processes, or, the processing performed by the respective processing parts may be performed for each color component.

Figure 31:
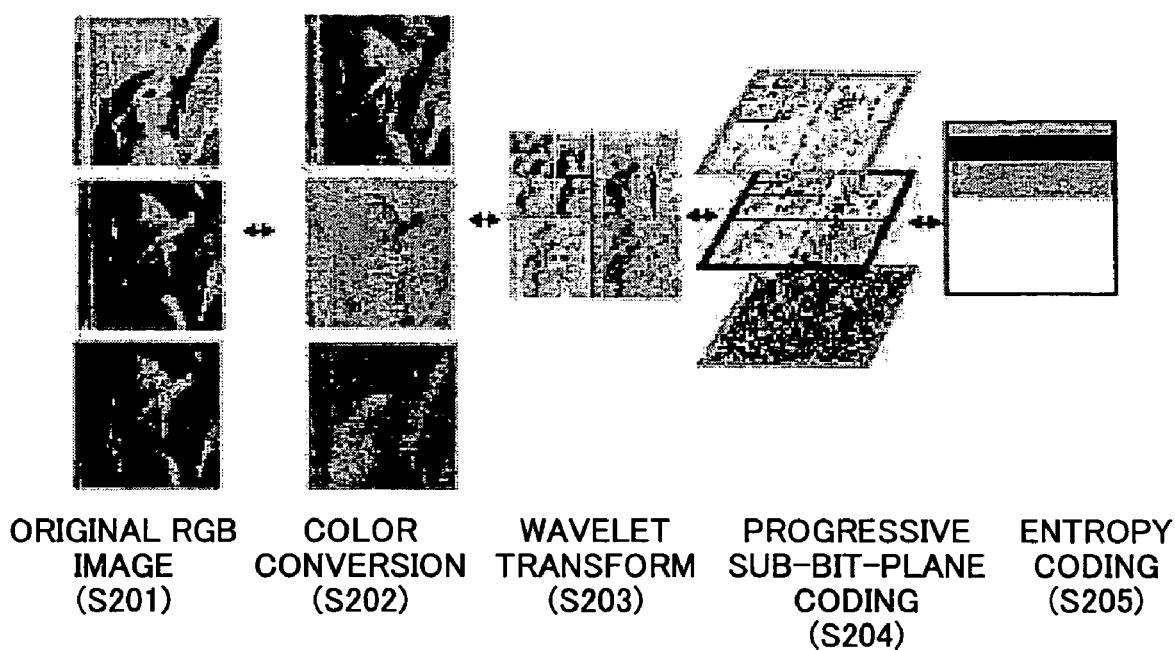
FIG. 31 illustrates a simplified flow chart illustrating JPEG 2000 algorithm.
Figure 32A:
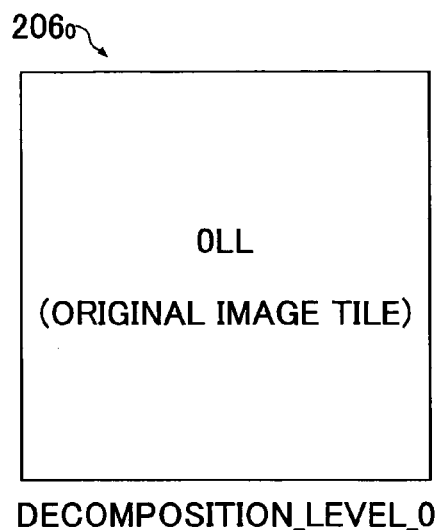
FIGS. 32A through 32D illustrate subbands in respective decomposition levels in case the number of decomposition levels is 3.
Figure 32B:
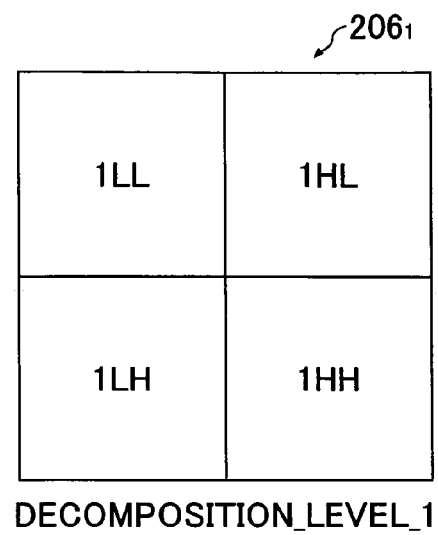
Figure 32C:
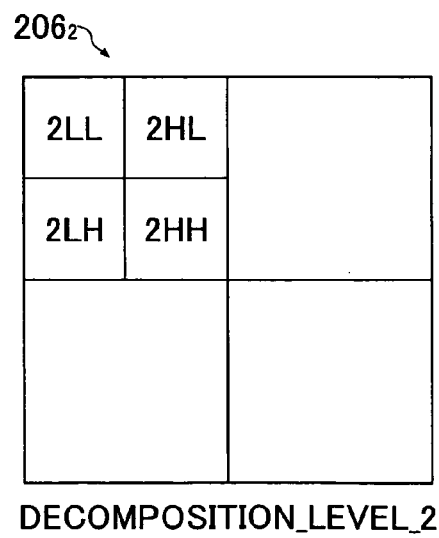
Figure 32D:
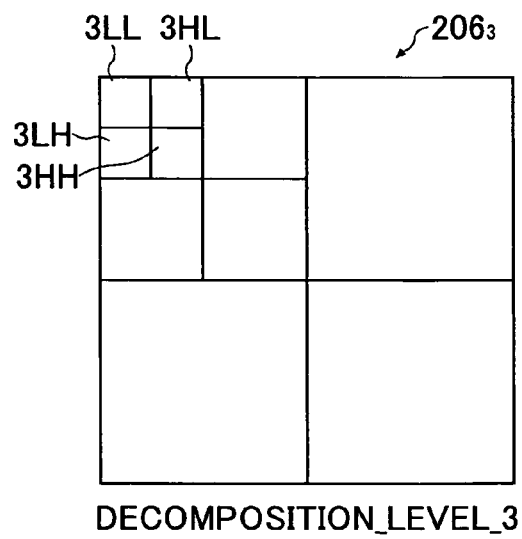

FIG. 31 shows a flow diagram illustrating the algorithm of JPEG 2000.

An outline of compression/decompression process according to JPEG 2000 shown in FIG. 30 includes, in a compression stage, a step S203 of obtaining wavelet coefficients through wavelet transform performed on each component having undergone color space transform in step S201 and S202, a step S204 of progressive sub-bit plane coding, and a step S205 of entropy coding. On the other hand, in a decompression stage, the process includes the step S203 of inverse wavelet transform performed on wavelet coefficients having undergone entropy decoding and inverse quantization in the steps S204 and S205, and the step S202 of inverse color space transform so that RGB pixel values of original image are restored in the step S201.

A feature of JPEG 2000 algorithm will now be described in detail.

One of points by which JPEG 2000 algorithm is distinguished from the conventional JPEG algorithm is in a transform method. In fact, according to the conventional JPEG, discrete cosine transform (DCT) is applied while JPEG 2000 applies discrete wavelet transform (DWT) for hierarchical compression/decompression algorithm. DWT is advantageous in comparison to DCT in that higher image quality can be obtained for a high-compression range, and it's a reason by which JPEG 2000 is adopted to follow the conventional JPEG, as mentioned above. Another point of distinguishing JPEG 2000 from the conventional JPEG is that, according to JPEG 2000, the functional block 205 of tag processing is performed at the last stage for forming a code stream as shown in FIG. 30. Thereby, compressed data is provided in a form of code stream in the compression stage, while necessary interpretation of code stream is performed in the decompression stage also by the tab processing. By applying this concept of code stream, various functions can be executed according to JPEG 2000. In fact, JPEG 2000 has many features further than providing a superior image quality for high compression rate (low bit rate).

One thereof is enablement of entire code size adjustment without performing re-compression, by applying a post quantization process including a step of code reduction in coded data (truncation). The code reduction can be performed for various units, i.e., for a unit of an area such as a tile, a precinct, or so, a unit of component, a unit of decomposition level (or resolution level), a unit of bit plane, a unit of sub-bit plane, a unit of packet, or a unit of layer in case of applying a multi-layer configuration.

For example, FIGS. 32A through 32D show subbands for respective decomposition levels in case where the number of decompression levels is 3. Compression/decompression process of a still image can be terminated at an arbitrary level according to a level in an octave dividing process in DWT in a block basis. Relation between the decomposition level and resolution level is as follows: That is, for each sub-band, the resolution level is 0 in the subband 3LL, the resolution level is 1 in the subbands 3HL, 3LH and 3HH, the resolution level is 2 in the subbands 2HL, 2LH and 2HH, and the resolution level is 3 in the subbands 1HL, 1LH and 1HH. As to the concept of 'decomposition', JPEG 2000 Part I, FDIS (Final Draft International Standard) defines as follows:

'Decomposition level:
A collection of wavelet subbands where each coefficient has the same spatial impact or span with respect to the source component samples. These include the HL, LH, and HH subbands of the same two-dimensional subband decomposition. For the last decomposition level the LL subband is also included.'

Another one of the above-mentioned various features are that re-configuration of layers of coded data can be achieved even in a coded state. Another one is that it is possible to re-configure coded data having one progression order into coded data in another progression order in the coded state. Another one is that coded data in a multi-layer state can be divided into a plurality of sets of coded data for layer units in the coded state.

The algorithm of JPEG 2000 will now be described in further detail.

In many cases, the color space transform part 201 is provided at an original image input/output stage, as shown in FIG. 30. For example, thereby, transform of RGB color expression system applying respective components of R(red)/G(green)/B(blue) in primary color system or YMC color expression system applying respective components of Y(yellow)/M(magenta)/C(cyan) in complementary color system into a YUV or YCbCr color expression system is performed there.

Figure 33:
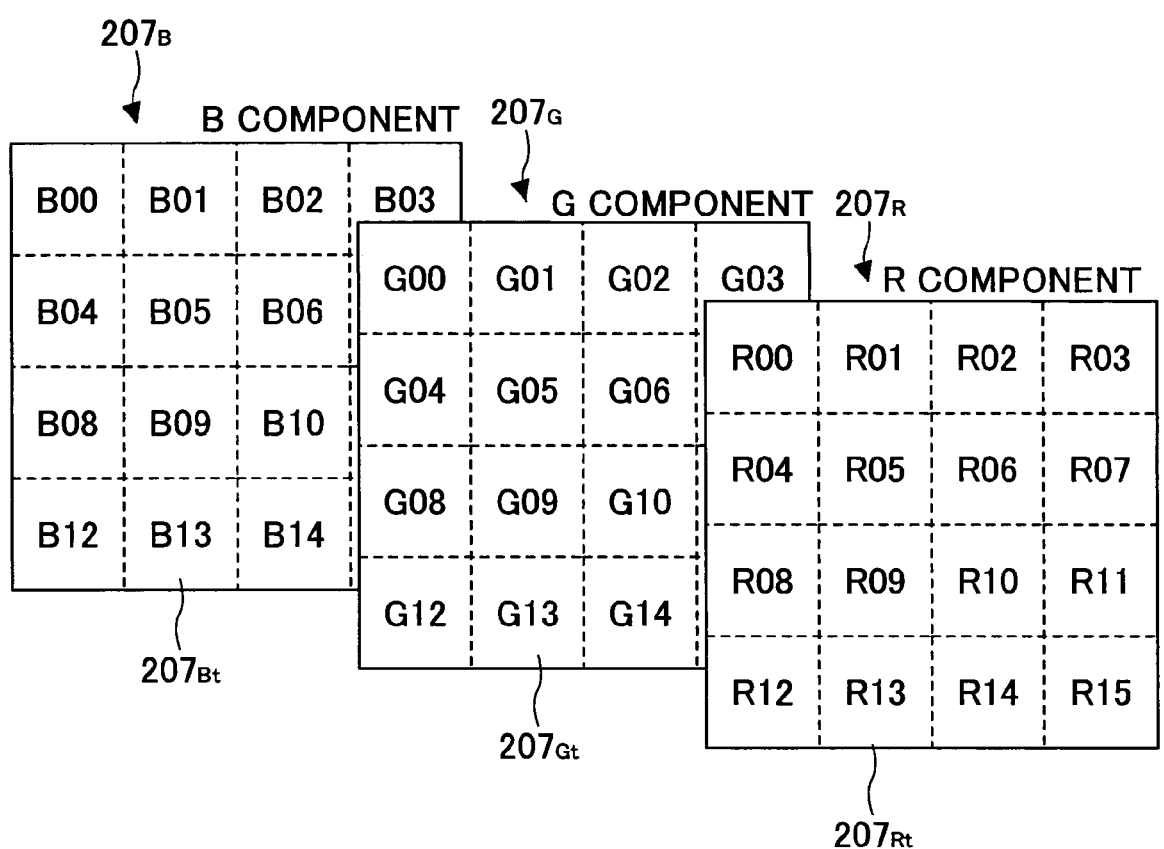
FIG. 33 illustrates an example of respective components of a color image each of which is divided into tiles.

FIG. 33 illustrates the respective components of color image, each of which is divided into tiles.

As shown, in general, each of the components $207_R$, $207_G$, $207_B$ of original image (in this example, in the RGB primary color system) is divided into rectangular areas (tiles) $207_{Rt}$, $207_{Gt}$, $207_{Bt}$. The particular tiles R00, R01, ..., R15/G00, G01, ..., G15/B00, B01, ..., B15 are treated as basic units in case of performing a compression/decompression process. Thus, image data (in case of processing a moving picture, image data of each frame) to be compressed is divided into un-overlapping rectangular areas called tiles for each component, and, processing is made for each tile as a unit for each component. In other words, compression/decompression operation is performed for each component, and for each tile independently. However, it is also possible that the tile size is determined as same as the image size, in other words, no tile division is performed in this case.

Thus, in a coding stage, data of each tile of each component is input to the color space transform part 201 as shown in FIG. 30 for the purpose of improving the compression rate, and, then, after it undergoes color space transform into YCbCr data from RGB data or YMC data, two-dimensional wavelet transform (forward transform) is performed on each tile image for each component after having undergone the color space transform, in the two-dimensional wavelet transform part 202. Thus, spatial dividing is performed for frequency bands. The color space transform may be omitted.

With reference to FIGS. 32A through 32D, processing performed by the two-dimensional wavelet transform part 202 will now be described for a case where the number of decomposition levels is 3. First, the two-dimensional wavelet transform part 202 performs two-dimensional wavelet transform onto a tile original image (0LL) (decomposition level: 0 ($206_0$) shown in FIG. 32A) obtained from the above-mentioned tile dividing operation performed on an original image, and thus, it is divided into subbands 1LL, 1HL, 1LH and 1HH shown in FIG. 32B (decomposition level 1 ($206_1$)). Thus, the tile original image ($206_0$) is divided into the subbands of decomposition level 1 ($206_1$). After that, the two-dimensional wavelet transform part 202 performs two-dimensional wavelet transform onto the low-frequency component 1LL which thus is then divided into subbands 2LL, 2HL, 2LH and 2HH shown in FIG. 32C (decomposition level 2 ($206_2$)). Similarly, in sequence, also for the low-frequency component 2LL, two-dimensional wavelet transform is performed and thus, it is then divided into subbands 3LL, 3HL, 3LH and 3HH shown in FIG. 32D (decomposition level 3 ($206_3$)). It is noted that, in case where the number of decomposition levels is 3 for example, the subbands 3LL, 3LH, 3HH, 2HL, 2LH, 2HH, 1HL, 1LH, 1HH are to be coded, while the subband 3LL is left un-coded.

Then, a bit to be coded is determined according to a predetermined coding order, and the quantization part 203 shown in FIG. 30 creates a context from the target bit and peripheral bits. In other words, the wavelet coefficients obtained from the above-mentioned recursive dividing (octave dividing) performed onto the low-frequency component (LL subband coefficients) undergo quantization with the quantization/inverse quantization part 203 for each subband. According to JPEG 2000, either lossless compression or lossy compression may be applied. In case of lossless compression, the quantization step width is always 1, and thus no quantization is performed in this stage. Each of the wavelet coefficients thus having undergone the quantization process increases in the number of bits such that the 8-bit original image is changed into 12-bit image data, for example.

Then, the entropy coding part 204 performs coding for each tile of each component with a use of probability extinction technique from the contexts and target pixels. Thus, for all the components of original image, coding is performed for tile units. A coding method called EBCOT (embedded block coding with optimized truncation) including block dividing, coefficient modeling and two-value arithmetic coding is applied for the respective subband coefficients having undergone the quantization, and thus, the bit planes of the respective subband coefficients after undergoing the quantization are coded for each block called code block in the order from the upper bit plane to the lower bit plane.

Finally, the tag processing part 205 performs a code forming process. In the code forming process, the tag processing part 205 combines all the coded data provided by the entropy coding part 204 into a single code stream, and also, adds tags thereto. First, the tag processing part 205 generates packets by collecting the code blocks of codes produced by the entropy coding part 204, arranges the thus-generated packets in the progression order and add necessary tags thereto. Thereby, coded data in a predetermined format is produced. According to JPEG 2000, total 5 types of progression orders are defined in combination of resolution level, precinct (position), layer, and component (color component).

Details of entropy coding performed by the entropy coding part 204 and tag processing performed by the tag processing part 205 will now be described in examples.

The wavelet coefficients having undergone quantization are divided into un-overlapping rectangular called precincts for each particular subband. This concept is introduced for the purpose of effectively utilizing a memory in an implementation stage. Furthermore, each particular precinct is divided into un-overlapping rectangular 'code blocks'.

The respective concepts of precinct, code block, packet and layer will now be described briefly. The relation in size therebetween is as follows: image≧tile≧subband≧precinct≧code block.

The precincts are rectangular areas in subbands, and a set of precincts include three areas of HL, LH and HH subbands located at a spatially coincide position. However, in the LL subband, a single area is regarded as a single precinct. It is also possible that the precinct has a size same as that of the subband. Furthermore, rectangular areas divided from each subband are called code blocks. A packet includes a collection of codes extracted from all the code blocks included in the precinct as a part (for example, codes of three bit planes starting from the most significant bit plane are extracted). A packet having no codes is also allowed. Code data is produced by producing packets by collecting codes of the code blocks, and arranging them in the predetermined progression order. As will be described later, a portion subsequent to an SOD concerning each tile shown in FIG. 38 includes a collection of packets. By collecting the packets of all the precincts (i.e., all the code blocks, or all the subbands), a part of the codes of the entire image (for example, the codes of the three bit planes, i.e., the most significant bit plane through the third bit plane), and, the thus-obtained collection of packets is called a layer (however, as will be described later, it is not necessary that each layer includes the packets for all the precincts). Thus, as the number of layers decoded in a decompression stage becomes larger, the image quality of the image thus-reproduced becomes higher. In other words, the layer may be said as being a unit of image quality. By collecting all the layers, the bit planes of codes for the entire area of the image are obtained.

Figure 34:
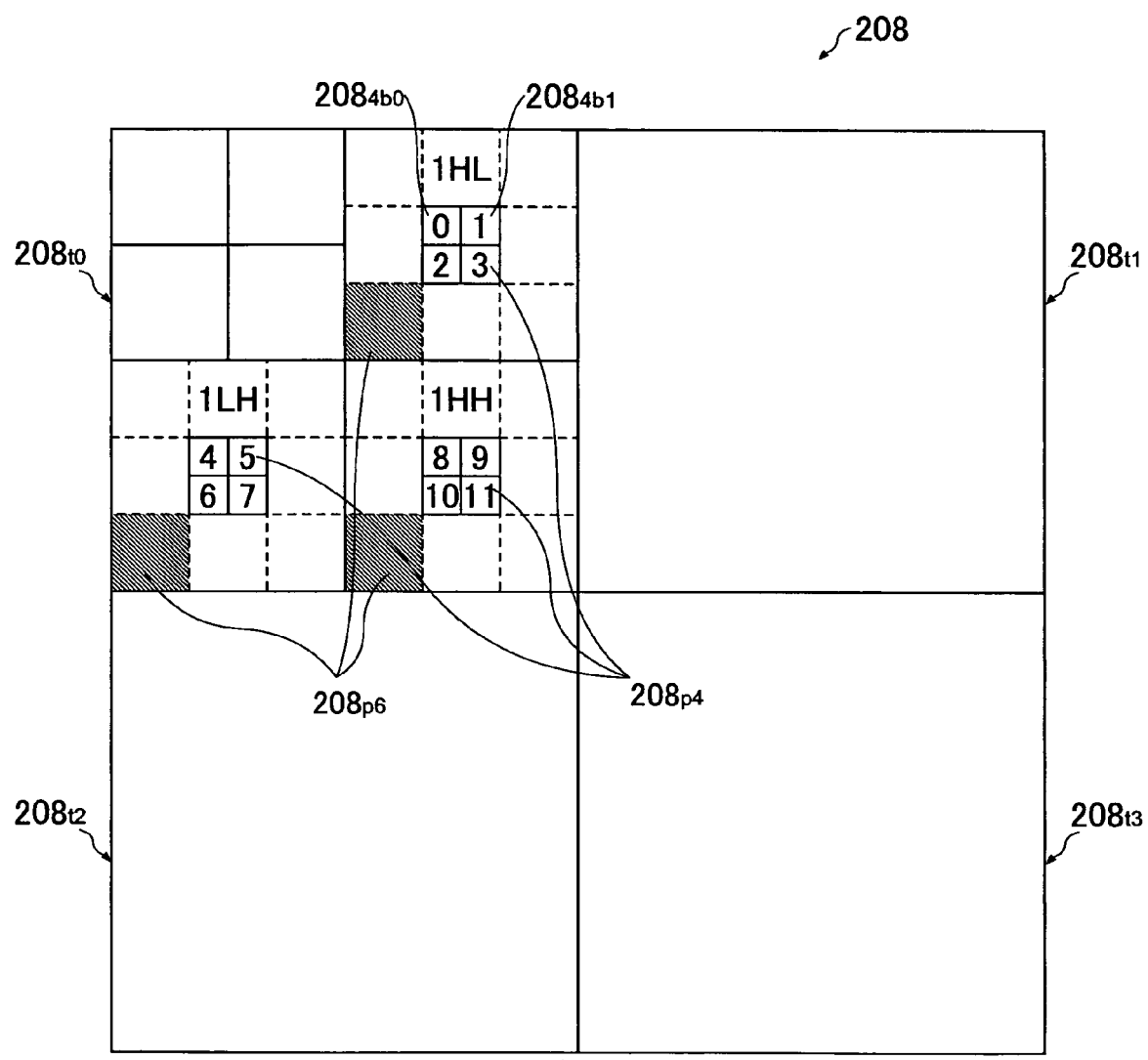
FIG. 34 illustrates a relation between precincts and code blocks.
Figure 35:
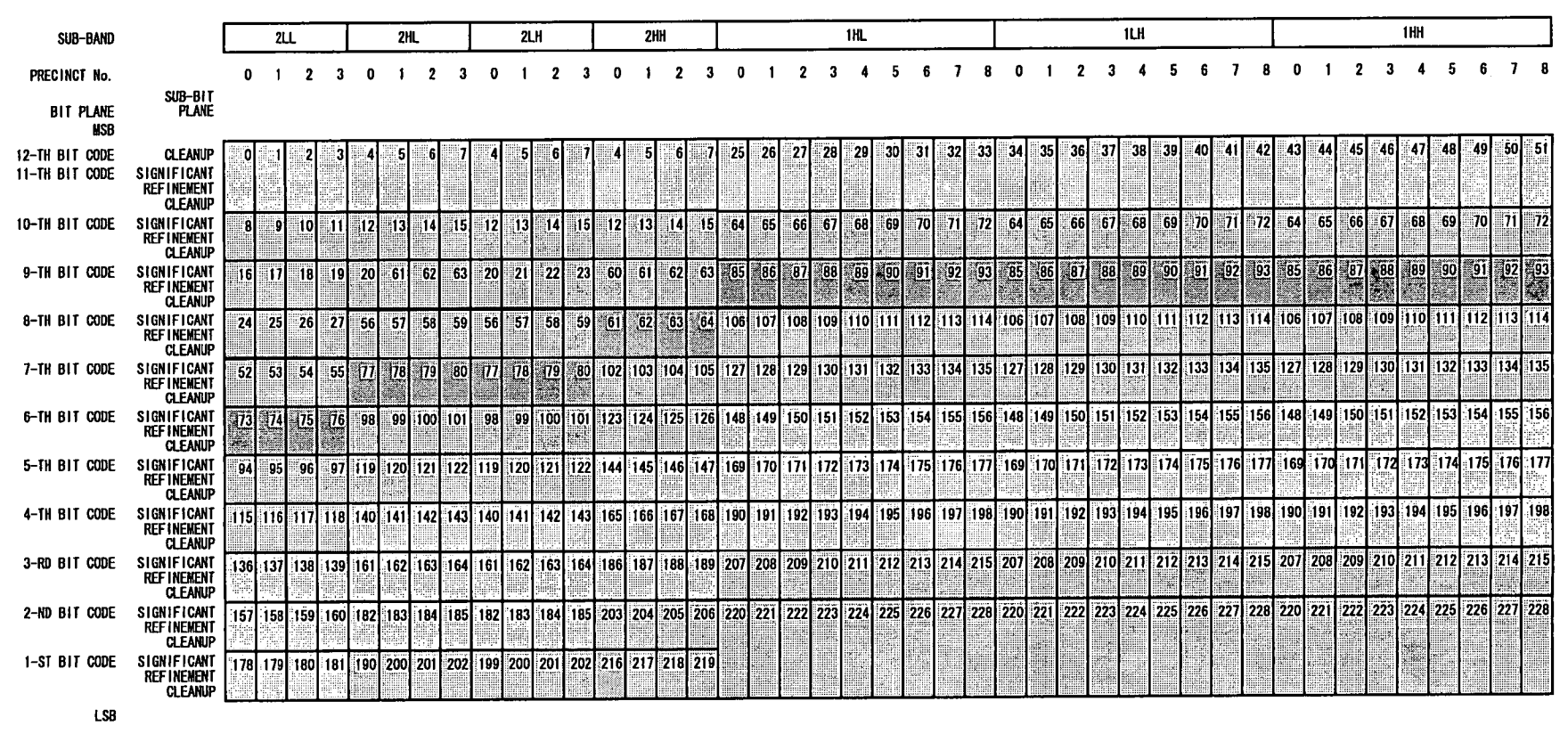
Figure 36:
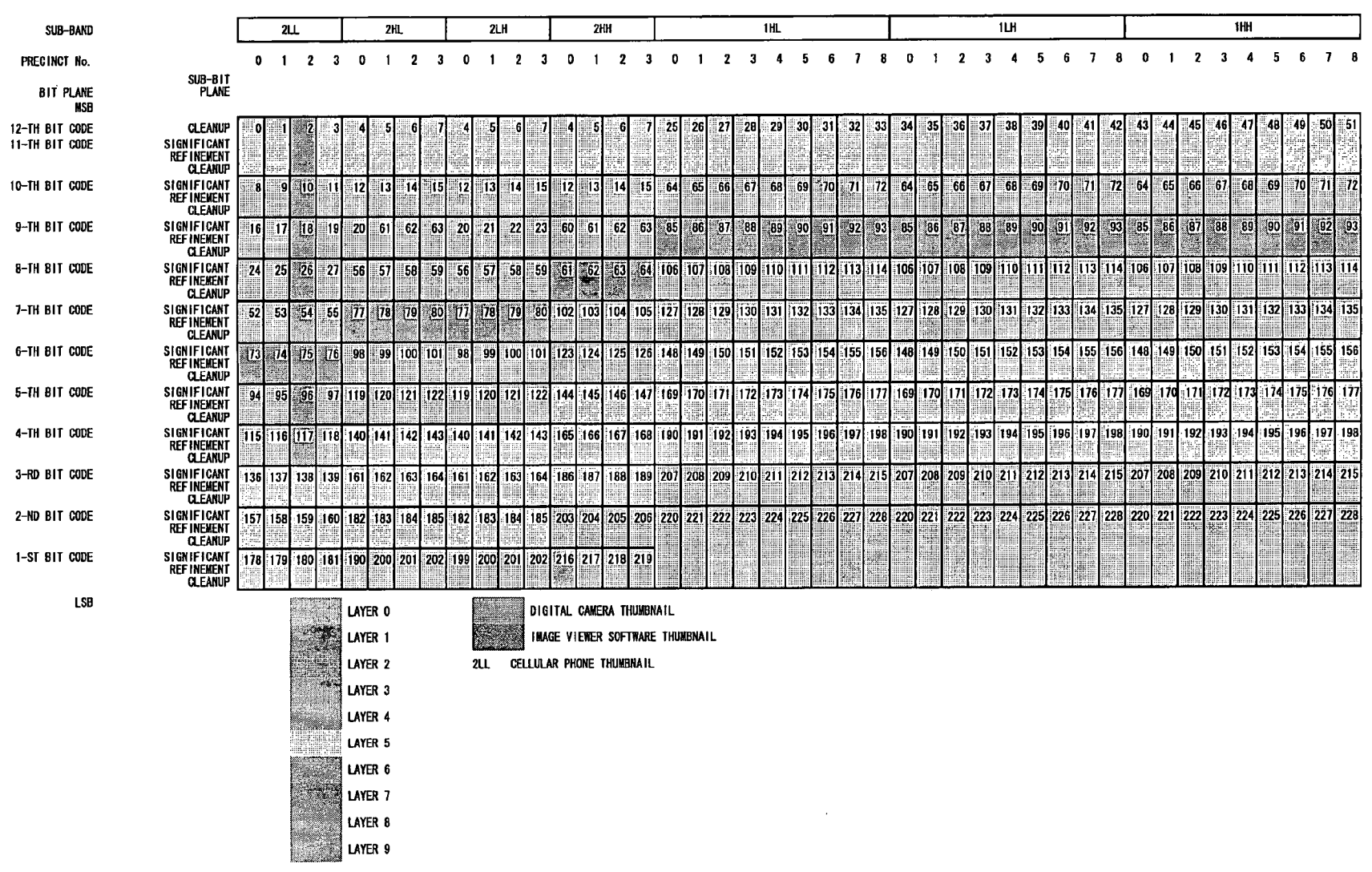
Figure 37:
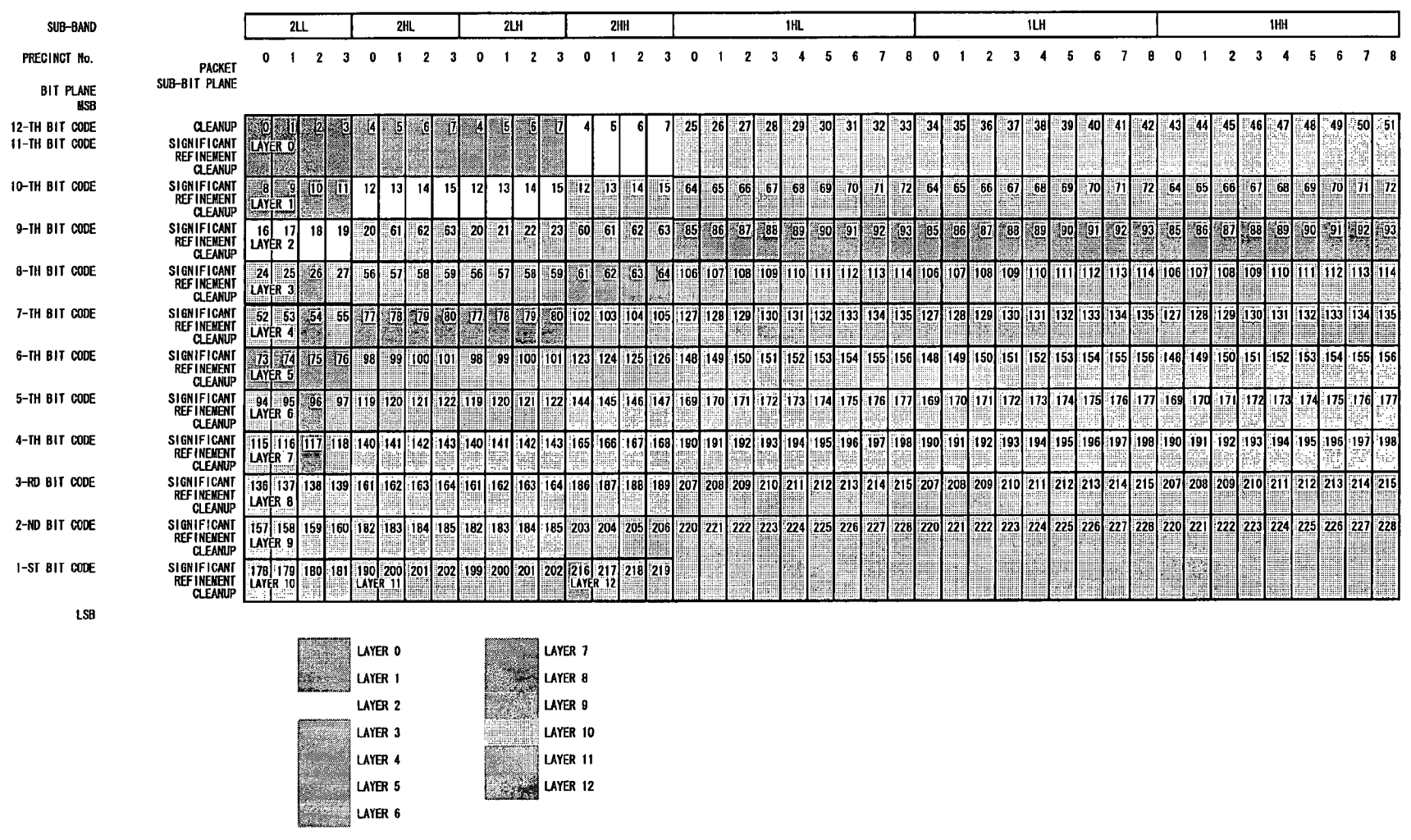

FIG. 34 illustrates a relation between the precincts and code blocks described above. FIGS. 35 through 37 illustrate examples of packets and layers in case the number of decomposition levels is 2 (the number of resolution levels is 3). FIG. 35 illustrates an example of general layer configuration; FIG. 36 illustrates an example of a configuration by which thumbnail output can be made for each of a plurality of devices; and FIG. 37 illustrates an example of a configuration by which thumbnail output can be made for each of a plurality of transmission path capacities.

The wavelet coefficients after undergoing quantization is divided into precincts for each subband, where each precinct (for example, a precinct $208_{p4}$) includes three rectangular areas of spatially coincide position as shown in FIG. 34. It is same also for the precinct $208_{p6}$. That is, the three areas $208_{p4}$ or $208_{p6}$ each corresponding to a spatially same position in the image, are regarded as a single precinct. It is noted that the original image 208 is divided into four tiles $208_{t0}$, $208_{t1}$, $208_{t2}$ and $208_{t3}$. Furthermore, each particular precinct is divided into un-overlapping rectangles 'code blocks' (code blocks $208_{4b0}$, $208_{4b1}$, ...). The code blocks are treated as basic units for undergoing entropy coding in the entropy coding part 204.

In order to improve the coding efficiency, as will be described with reference to FIGS. 35 through 37, the coefficient values are decomposed for bit plane units, a predetermined order is given to the bit planes for each pixel or each code block, and, therefrom, a layer may be produced from one or a plurality of bit planes. That is, a layer is produced from bit planes of coefficient values, based on its significance, and coding is performed for each of thus-produced layers. In some case, only the most significant layer (MSB) and the layer subsequent thereto are coded, and the other layers including the least significant layer (LSB) are truncated.

With reference to FIG. 35, the example of configuration of packets and layers (the number of layers is 10) in a case where the number of decomposition levels is 2 (the number of resolution levels is 3) will now be described. Each small vertically longitudinal rectangular shown denotes a packet, and the number shown therein denotes a packet number. Respective layers are indicated as horizontally longitudinal rectangular zones, which are distinguished by altering the shade of halftone dots given thereto. That is, in this example, the codes are divided into:

a layer 0 including the codes of the packets 0-51,
a layer 1 including the codes of the packets 52-72,
a layer 2 including the codes of the packets 73-93,
a layer 3 including the codes of the packets 94-114,
a layer 4 including the codes of the packets 115-135,
a layer 5 including the codes of the packets 136-156,
a layer 6 including the codes of the packets 157-177,
a layer 7 including the codes of the packets 178-198,
a layer 8 including the codes of the packets 199-215, and
a layer 9 including the cods of the remaining packets 216-228, as shown. The correspondence relation between the packets and precincts or so may be altered depending on the progression order, the number of divided layers, or so, and thus, the configuration shown in FIG. 35 is merely an examples With reference to FIG. 36, the example of layer configuration by which a thumbnail is produced for each of a plurality of output devices will now be described. In this example, the layer configuration is same as that described above with reference to FIG. 35. According to the present embodiment of the present invention, in a header of a code stream, thumbnail information including codes indicating the 'packets numbers of 2, 10, 18, 26, 54 and 75' is recorded for the purpose of displaying a thumbnail image for a digital camera. Similarly, thumbnail information including information 'packets numbers of 92 and 117' is recorded in the header of the code stream for the purpose of displaying a thumbnail image for an image viewer. Similarly, thumbnail information including information '2LL ' is recorded in the header of the code stream for the purpose of displaying a thumbnail image for a cellular phone.

With reference to FIG. 37, the example of layer configuration (the number of layers is 13) in a case where the number of decomposition levels is 2 (number of resolution levels is 3) by which thumbnail images can be provided according to respective ones of available transmission path capacities will now be described. In this example, the codes are divided into total 13 layers, i.e.:

a layer 0 including the codes of the packets 0-3 given a common shade with halftone dots,
a layer 1 including the codes of the packets 4-11 given a common shade with halftone dots,
a layer 2 including the codes of the packets 4-7 and 12-19 given a common shade with halftone dots,
a layer 3 including the codes of the packets 12-15 and 20-51 given a common shade with halftone dots,
a layer 4 including the codes of the packets 52-72 given a common shade with halftone dots,
a layer 5 including the codes of the packets 73-93 given a common shade with halftone dots,
a layer 6 including the codes of the packets 94-114 given a common shade with halftone dots,
a layer 7 including the codes of the packets 115-135 given a common shade with halftone dots,
a layer 8 including the codes of the packets 136-156 given a common shade with halftone dots,
a layer 9 including the codes of the packets 157-177 given a common shade with halftone dots,
a layer 10 including the codes of the packets 178-198 given a common shade with halftone dots,
a layer 11 including the codes of the packets 199-215 given a common shade with halftone dots, and
a layer 12 including the codes of the remaining packets 216-228.

In the example of FIG. 37, by collecting appropriate layers thereof, it is possible to produce code data for providing a thumbnail image which has a data size suitable to a particular available transmission path capacity. The correspondence relation between the packets and precincts or so may be altered depending on the progression order, the number of divided layers, or so, and thus, the configuration shown in FIG. 35 is a merely example.

In any of the above-mentioned examples of layer configurations, each layer is produced by dividing the code data into packets, extracting packets therefrom in the order of incrementing in packet number, and, the thus-extracted packets are collected until a predetermined total size is reached thereof. Furthermore, in these examples of layer configurations, one bit is divided into three parts, i.e., Refinement, Significant and Cleanup as sub-bit planes. By thus further dividing into sub-bit planes, it becomes possible to achieve a finer control. Furthermore, by changing the priority order of packets, it becomes possible to achieve, selectively, an order considering the resolution, an order considering the image quality, an order considering the position or so. Each of the examples of layer configurations shown in FIGS. 35-37 corresponds to that of Step 205 shown in FIG. 31.

Figure 38:
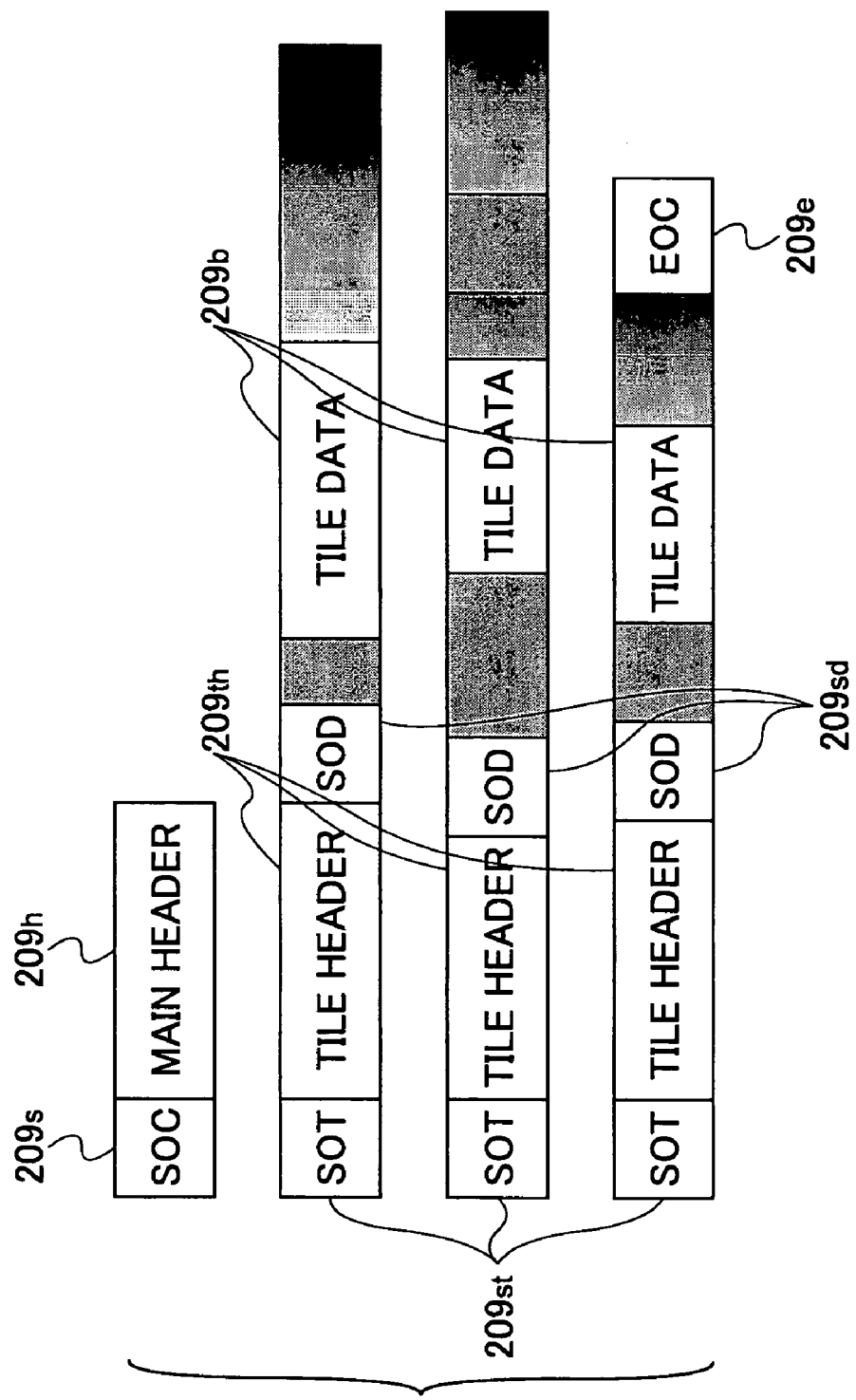
FIG. 38 simply shows a JPEG 2000 coded data format (structure of code stream) generated by a code formation process.

FIG. 38 illustrates the format of coded data (structure of the code stream) produced by the code forming process according to JPEG 2000 briefly. The coded data shown includes, at the top thereof, an SOD marker $209_s$ indicating the beginning of the code stream, followed by a main header $209_h$ describing a coding parameter or a quantization parameter, and, then, is followed by the code data for each tile. The code data for each tile includes, at the top thereof, an SOT marker $209_{st}$, followed by a tile header $209_{th}$, and then, followed by tile data or coded data (bit stream) $209_b$. At the end of the code stream, i.e., subsequent to the last tile data, a tag indicting the end of the stream (EOC tag $209_e$) is added.

Figure 39:
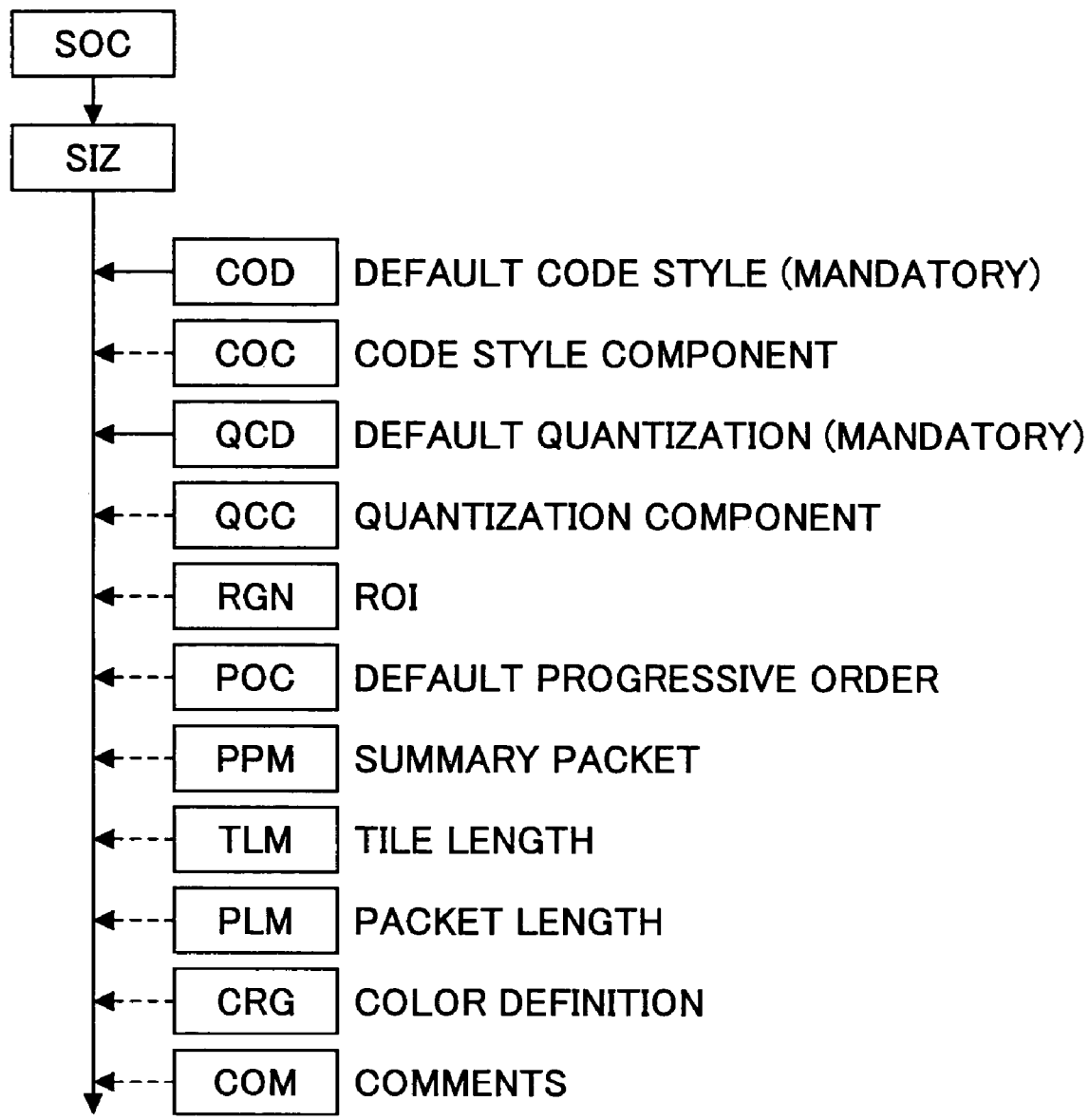
FIG. 39 illustrates a main header shown in FIG. 38.

FIG. 39 illustrates the configuration of the main header shown in FIG. 38.

As shown in FIG. 39, the main header $209_h$ includes information of sizes of an image and tile (SIZ); then, information of default code style (COD; mandatory); information of code style component (COC); information of default quantization (QCD; mandatory); information of quantization component (QCC); information of ROI (RGN); information of default progressive order (PLM); information of collection packet (PPM); information of tile length (TLM); information of packet length (PLM); information of color definition (CRG); and comments (COM). Other than SIZ and marker segments (COD and QCD) indicated as 'mandatory' above, all the marker segments are optional ones.

Figure 40:
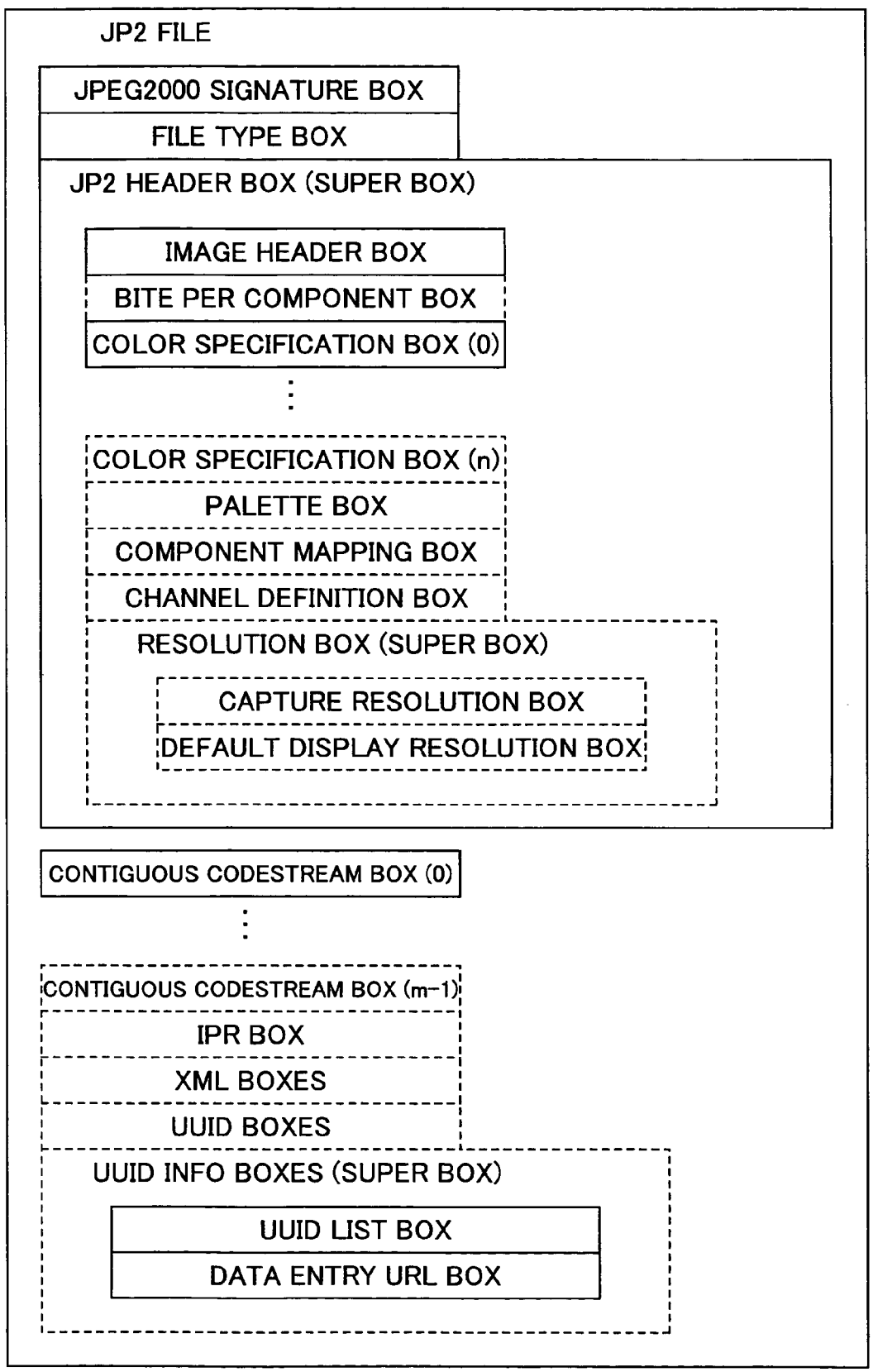
FIG. 40 illustrates a file format according to JPEG 2000 basic scheme.

FIG. 40 illustrates a file format according to a basic scheme of JPEG 2000.

The file format according to the basic scheme of JPEG 2000 is called JP2 file format, includes the JPEG 2000 code format described above with reference to FIG. 39, and is prepared directed to a purpose of including information of image data, meta data, information indicating the features of the image such as the numbers of gradation levels, color space, or so, intellectual property information, and so forth. An information structure of the JP2 file configured to have the JP2 file format includes, as defined by a solid line (mandatory) and an broken line (optional) in FIG. 40, a JPEG 2000 Signature box, a File Type box, a JP2 Header box, and a Contiguous Codestream box. FIG. 40 shows further details.

On the other hand, in a decoding stage, contrary to the above-described coding stage, image data is generated from code streams of respective tiles of respective components. With reference to FIG. 30, in this case, the tag processing part 205 interprets tag information added to the code stream given, decomposes the code stream into those of the respective tiles of the respective components, and then, for the code stream thus obtained for each tile for each component, decoding processing is performed. The bit positions to be decoded are determined according to the order obtained based on the tag information included in the code stream, and also, the inverse quantization part 203 generates the context for each target bit thus determined, from the arrangement of the peripheral bits (already decoded). The entropy decoding part 204 performs decoding in use of the thus-obtained contexts and code stream according to the probability estimation technology so as to obtain the value of the target bit, which is then written at the position of the target bit.

The thus-decoded data is one divided spatially for the respective frequency bands as mentioned above, and, thus, is made to undergo two-dimensional wavelet inverse transform by the two-dimensional inverse wavelet transform part 202. Thereby, each tile of each component of image data is restored. The thus-restored data is transformed into data in the original color expression system by the color space inverse transform part 201.

The fifth embodiment of the present invention will now be described.

Figure 41:
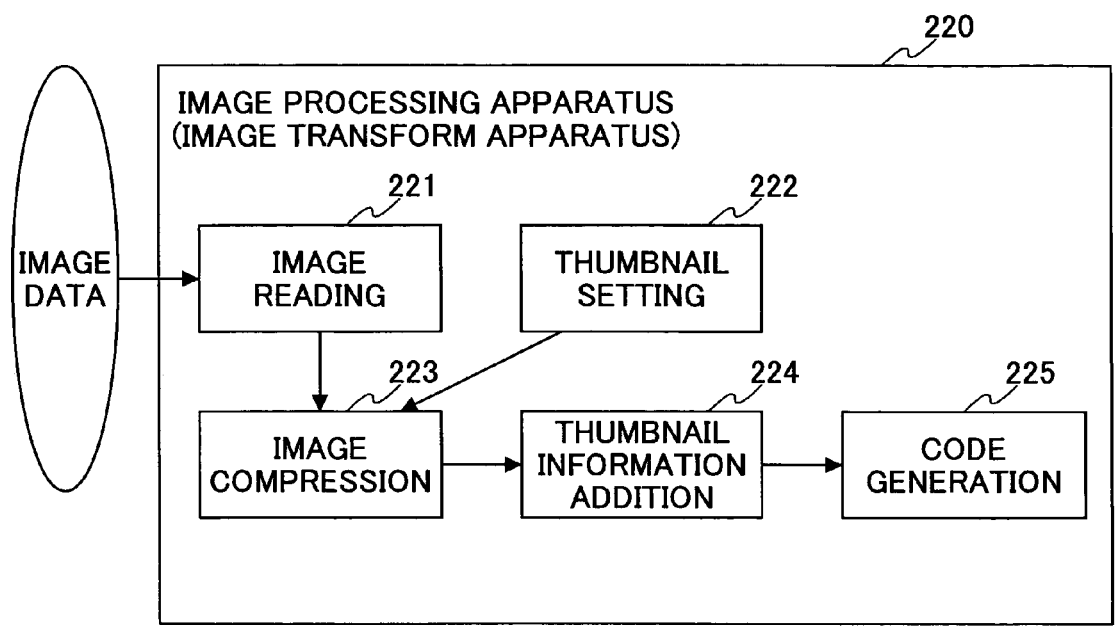
FIG. 41 illustrates a block diagram of an image compressing apparatus according to a fifth embodiment of the present invention.
Figure 42:
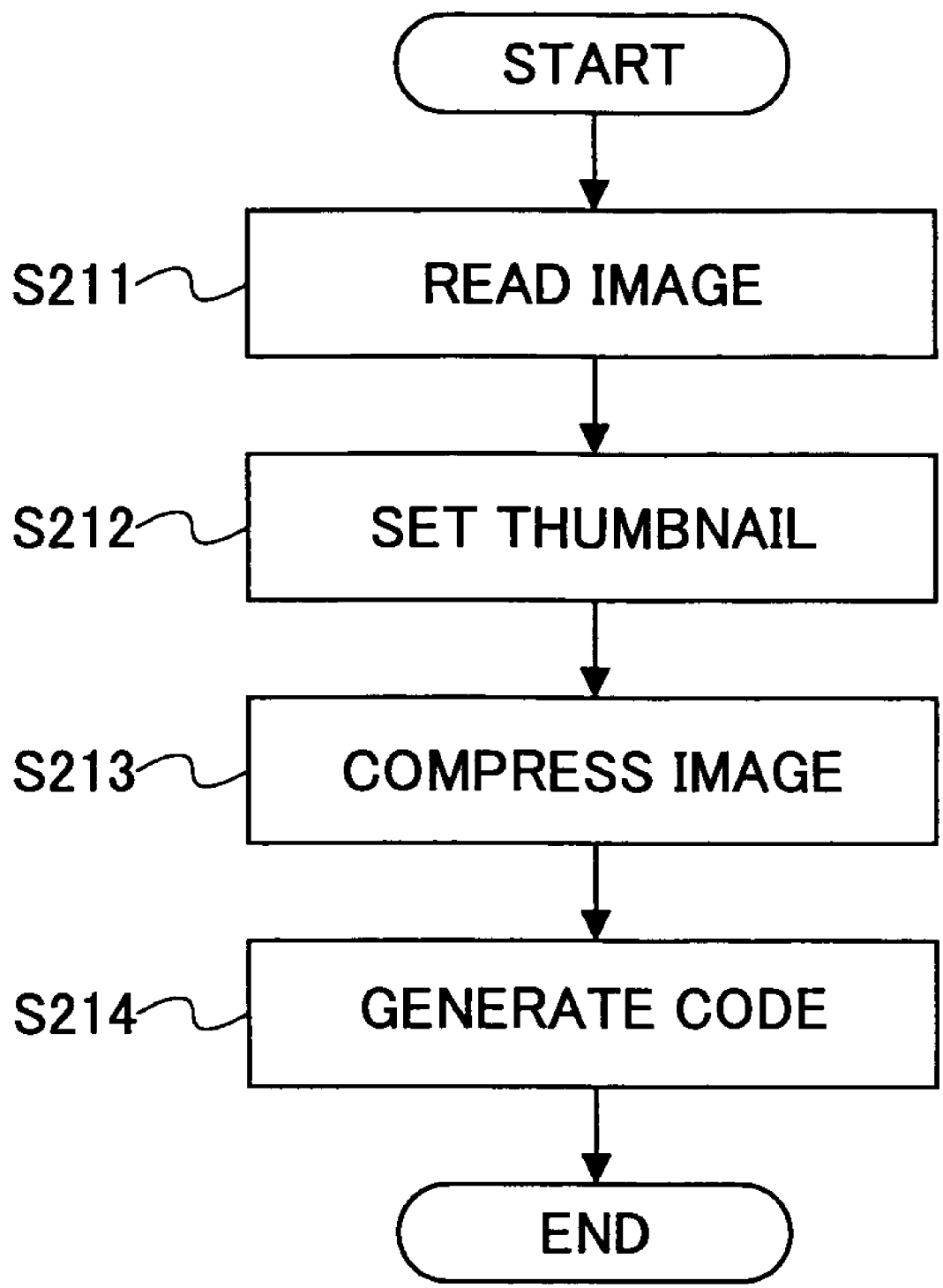
FIG. 42 shows an operation flow chart illustrating operation of the image compressing apparatus shown in FIG. 41.

FIG. 41 illustrates a functional block diagram of an example of an image compressing apparatus according to the fifth embodiment of the present invention. FIG. 42 shows an operation flow chart illustrating an image compressing method executed in the apparatus shown in FIG. 41.

The image compressing apparatus in the embodiment is an apparatus for generating compressed code data of an image, and includes a thumbnail information setting part and a thumbnail information adding part. The image compressing apparatus can handle not only a non-compressed image data but also compressed image data, and can transform it into image data by which thumbnail generation can be easily achieved. In this view, the image compressing apparatus in the embodiment may also be referred to as an image transform apparatus. As shown in FIG. 41, the image compressing apparatus in the embodiment (image transform apparatus) 220 includes an image reading part 221, the thumbnail information setting part 222, an image compressing part 223, the thumbnail information adding part 224, and a code generating part 225.

The thumbnail information setting part 222 sets one or a plurality of forms of thumbnail information. The thumbnail information adding part 224 adds the thus-set forms of (may be one or some of the set forms of) thumbnail information to the header part of code data during a code data forming process. The thumbnail information is such as that described above with reference to FIG. 36 indicating the specific number of layers, for example.

With reference to FIG. 42, the image compressing apparatus 220 first reads image data with the image reading part 221 in Step S211, and sets thumbnail information with the thumbnail information setting part 222 in Step S212. It is also possible that the thumbnail information setting part 222 previously sets the thumbnail information. Then, the image compressing part 223 compresses the image in Step S213. Then, the thumbnail information adding part 224 adds the thumbnail information set in Step S212 to the compressed image data, and then, the code generating part 225 generates code data therefrom in Step S214. It is noted that, in this example, the code generating part 225 generates codes after the thumbnail information adding part adds the thumbnail information to the compressed data. However, it is also possible that the thumbnail information is added during generation of the codes by the code generating part 225.

An example of a location where the thumbnail information is recorded in the code data is the COM marker shown in FIG. 39, the file format XML boxes shown in FIG. 40, the file format UUID boxes shown in FIG. 40 or so. Any other part may also be applied as the location of recording the thumbnail information. An example of an XML description adding the thumbnail information '3LL ', for example, is shown below:

```
<?xml version="1.0" encoding="Shift-JIS"?>
<!DOCTYPE html
    PUBLIC "-//W3C//DTD XHTML 1.0 Strict//EN"
    "http://www.w3.org/TR/xhtml1/DTD/xhtml1-strict.dtd">
<html xmlns="http://www.w3.org/1999/xhtml" xml:lang="ja"
lang="ja">
    <head>
        <title>THUMBNAIL</title>
    </head>
    <body>
        <p>3LL </p>
    </body>
</html>
```

FIG. 43 shows one example of the thumbnail information previously set in the image compressing apparatus 220. The image compressing apparatus 220 may preferably apply any one of image resolution information; image positional information; image component information; image quality information, and image subband information, as the thumbnail information, as shown. It is also possible that a combination of some thereof may be applied as the thumbnail information depending on particular occasion.

As the image resolution information, information of decomposition level of the image may be applied. As the positional information, any one or some of information of tiles, information of precincts, information of code blocks, information of pixels may be applied. As the image quality information, information of layers and/or information of bit planes may be applied.

FIG. 43 illustrates an example of a correspondence table 230 for thumbnails 232 corresponding to respective display devices (processing rate of bps). For example, for a digital camera, a central tile and/or a layer 3 may be set. Similarly, for an image viewer software, a decomposition level 3 and/or layer 5 may be set. For a cellular phone, a decomposition level 5 may be set. For a digital video camera, a frame number 2N+1 and/or decomposition level 3may be set. For TV broadcast, one or some of all the frames, tiles 6, 7, 10 and 11, and decomposition level 3 may be set. For high-vision broadcast, all the frames and/or decompression level 3 may be set.

The combinations mentioned above are merely an example, and any other combination may also be applied. For example, the contents of the thumbnail information to be set may be determined according to a progress in data processing rate of the display device (or a printing device, or a transmission device) applied.

The compressed code data thus produced by the image compressing apparatus shown in FIG. 41 may be provided to an image processing apparatus which is provided for extracting the thumbnail information added as mentioned above in the compressed code data. The image processing apparatus also according to the fifth embodiment of the present invention for this purpose may include a part extracting a specific part of the given code data based on the thumbnail information recorded in the header part as mentioned above. This extracting part may have a function of not only decompressing the thumbnail based on the thumbnail information but also decompressing the original image or another reduced image or magnified image so as to output it, and has a function of interpreting the above-mentioned header part of the code stream. In case the thumbnail information is recorded in the header part in a plurality of forms, a device may also be provided for a user to select one thereamong.

Alternatively, the compressed code data produced by the image compressing apparatus 220 may be provided to an image decompressing apparatus which is provided for outputting a thumbnail image, and, thereby, the thumbnail may be output according to the thumbnail information. The image decompressing apparatus also according to the fifth embodiment of the present invention may have functions of, based on the thumbnail information recorded in the header part of the give compressed code data, decompressing only the thumbnail portion from the given code data so as to output it. This part may have a function of interpreting the above-mentioned header part. In case the thumbnail information is recorded in the header part in a plurality of forms, a device may also be provided for a user to select one thereamong.

FIGS. 44 and 45A through 45D illustrate results of output given by the above-mentioned image processing apparatus or image decompressing apparatus according to the fifth embodiment of the present invention. FIG. 44 shows an example of the original image. FIGS. 45A through 45D show results of compressing process executed by the image compressing apparatus according to the fifth embodiment on the original image, and output by the image processing apparatus or image decompressing apparatus according to the fifth embodiment.

Figure 45A:
FIGS. 45A through 45D illustrate output results of compression by the image compressing apparatus and processing of the image processing apparatus or image decompressing apparatus according to the fifth embodiment of the present invention.
Figure 45B:
Figure 45C:
Figure 45D:

Assuming that a low resolution image is specified with respect to the original image shown 240 in FIG. 44 as a desired thumbnail image, the image 241 shown in FIG. 45A is output accordingly. Similarly, assuming that one component is specified as a desired thumbnail image, the image 242 shown in FIG. 45B is output accordingly. Assuming that the layer 0 is specified as a desired thumbnail image, the image 243 shown in FIG. 45C is output accordingly. Assuming that the central tile is specified as a desired thumbnail image, the image 244 shown in FIG. 45D is output accordingly.

Thus, according to the fifth embodiment of the present invention, it is possible to produce compressed image data from which a thumbnail of image data can be output at high speed, without increasing the data size of the compressed image data. This is because, the thumbnail information added to the header according to the fifth embodiment is not substantial code data of the thumbnail image itself but merely information which gives instructions for the apparatus which handles the given code stream to determine which portion of the given code stream of the whole image data is to be used to generates the above-mentioned thumbnail image. Such information merely giving the instructions for determination of the specific part of the given coded data to be used may be included in the header part of the code stream without substantially increasing the data size of the entire code stream. Furthermore, by recording a plurality of forms of such thumbnail information in the header information, it is possible to generate compressed code data by which a plurality of forms of thumbnail images (for example, those for digital camera, viewer software, cellular phone or so, as described above with reference to FIG. 36) are output therefrom. Thus, the image processing apparatus or image decompressing apparatus according to the fifth embodiment can output a desired thumbnail image at high speed without substantially increasing the data size of the given compressed code data. These apparatuses may be applied as an image dispatching system of dispatching images via the network.

The firth embodiment of the present invention is not limited to the forms of image compressing apparatus, image processing apparatus and image decompressing apparatus described above. As having been described with reference to the operation flow chart, the present embodiment may also be achieved by forms of image compressing method, image processing method and image decompressing method, or, in a form of a program (computer program mounting processing contents of the relevant steps) causing a computer to function as these apparatuses or respective parts of these apparatuses. Furthermore, the fifth embodiment may be achieved in a form of a computer-readable information recording medium in which the above-mentioned program is recorded. Furthermore, it is possible to built a system which operates, thanks to the functions of the above-mentioned program or the same stored in the above-mentioned recording medium, to execute the same functions and provide same advantages. These program or recording medium may also be used in a system which will be described with reference to FIG. 46 which will be described later.

The recording medium storing the program and/or data for achieving the image compression, image processing or image decompression according to the fifth embodiment of the present invention will now be described in detail. Specifically, a CD-ROM, magneto-optical disk, DVD-ROM, FD, flush memory, or any other various types of ROM or RAM, or the like may be applied for the purpose. Then, a program for achieving one or some of the above-mentioned functions of the image compression, processing or decompression according to the fifth embodiment of the present invention with a computer may be recorded, and may be circulated in the market. Thereby, these functions may be easily achieved in any place. In fact, by loading the above-mentioned recording medium into an information processing apparatus such as a computer (general-purpose one or in a form of one mounted in any other specialized apparatus), which then reads the program therefrom, and thus, the information processing apparatus is made to operate according to the fifth embodiment. Attentively, the once read out program is stored in an internal storage of the information processing apparatus, and is read out as needed therefrom, and is executed so that the functions of the present invention can be executed accordingly at any time.

Figure 46:
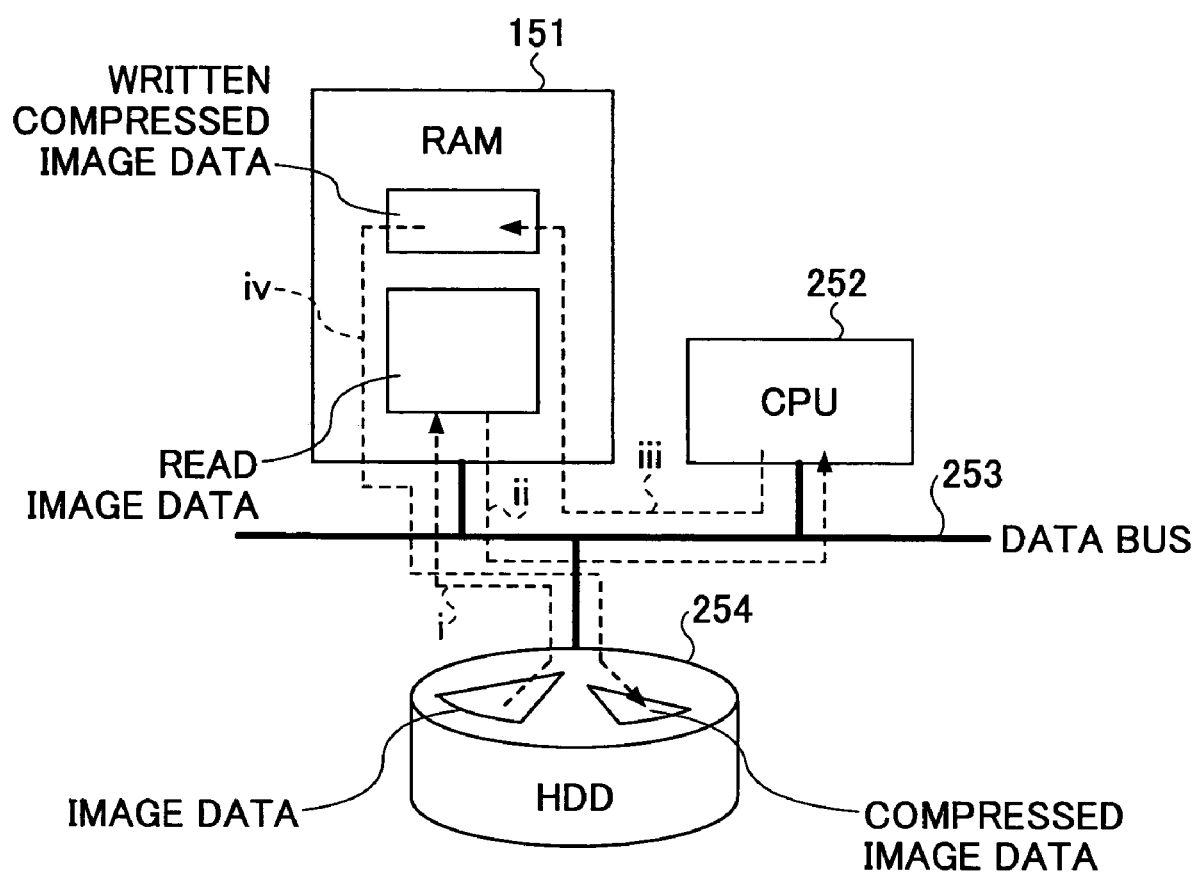
FIG. 46 illustrates an example of configuration of the image compressing apparatus according to the fifth embodiment of the present invention.

FIG. 46 shows a configuration according to a variant of the above-mentioned fifth embodiment of the present invention.

An image compressing apparatus according to the variant of the fifth embodiment according to the present invention includes, as shown, a data bus 253, a RAM 251, a CPU 252 and a HDD 254 connected via the data bus 253. Thereby, from image data of original image, compressed image data is generated having thumbnail information added thereto, which compressed image data is then stored in the HDD 254.

In Step 'i', the image data of original image (or once compressed image data) is read out of the HDD 254 according to an instruction of the CPU 252, the thus-read-out data being then written into the RAM 251. Then, the CPU 252 reads the image data from the RAM 261, so as to obtain wavelet coefficients therefrom, and after that, according to the thumbnail information adding processing described above in the description of the fifth embodiment of the present invention, produces compressed image data thus having the thumbnail information added thereto, in Step 'ii'. The CPU 252 writes the thus-produced compressed image data into another area of the RAM 251 in Step 'iii'. Then, according to an instruction of the CPU 251, the compressed image data is written into the HDD 254 in Step 'iv'. An image processing apparatus or an image decompressing apparatus, same as the above-mentioned one, or another one but having the same configuration, then can output a relevant thumbnail image according to the thumbnail information added to the header part of the compressed image data when receiving the compressed image data from the above-mentioned image compressing apparatus, and displays, prints out or transmits the same. The image compressing apparatus described above with reference to FIG. 46 may also act as the above-mentioned image processing apparatus or image decompressing apparatus. Alternatively the image processing apparatus or image decompressing apparatus may be different from the image compressing apparatus shown in FIG. 46 but may have the same configuration, as mentioned above.

Sixth through sixteenth embodiments of the present invention will now be described.

Figure 47:
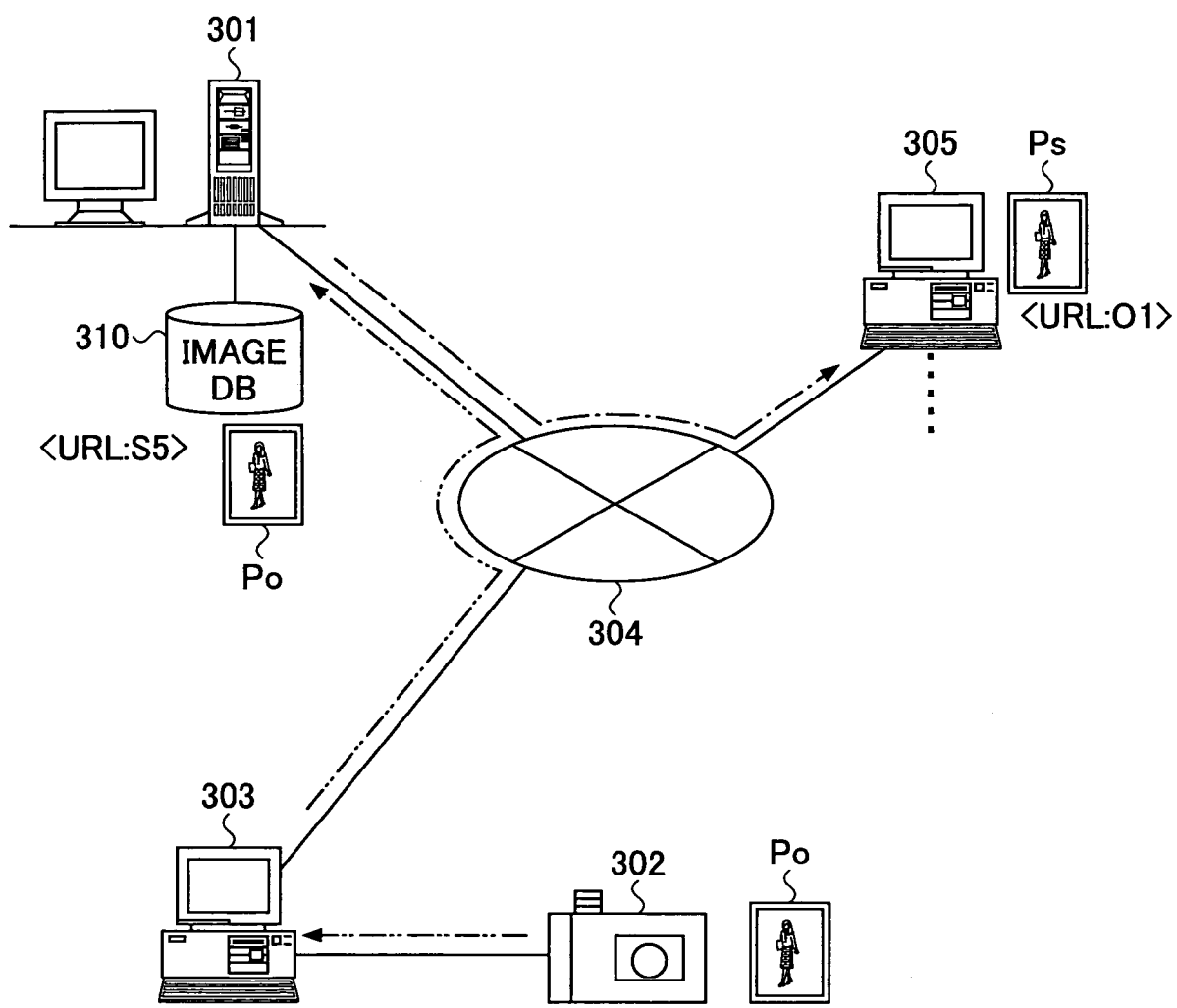
FIG. 47 illustrates an example of a configuration of an image compressing apparatus according to a sixth embodiment of the present invention.

FIG. 47 shows a configuration of an example of an image compressing apparatus according to a sixth embodiment of the present invention.

Description will now be made assuming that this image compressing apparatus in the sixth embodiment is provided in a server apparatus 301, which is connected with a communication network 304 such as the Internet, an intranet, an extranet or so, with which a personal computer (simply referred to as a PC) 303 connected by an image inputting apparatus (digital camera in this example) 302 is also connected. The image compressing apparatus according to the sixth embodiment of the present invention may also be applied to the image inputting apparatus, the PC 3 or 5, or any other apparatus, as can be seen from the following description.

The image compressing apparatus according to the sixth embodiment of the present invention generates compressed code data from a given image. As will be described, in order to generate compressed code data from which a thumbnail image can be decompressed at high speed, it is preferable that the compressed code data of image is generated according to JPEG 2000. The image compressing apparatus according to the embodiment, for example, is achieved in the server apparatus 301 in which a predetermined operation device is provided for executing a program.

The server apparatus 301 is a server computer which is provided and having a function of accessing an image database (DB) 310, and includes a database management server for managing the image DB 310 and a network connection server. Furthermore, other than the digital camera, any other various types of devices having a function of inputting images may be applied as the image inputting apparatus 302.

A source from which an image is input/a destination to which an image is output with respect to the image compressing apparatus according to the embodiment is assumed as being an internet-reachable location, i.e., a storage location which can be reached by means of an information transmission function based on the Internet, for example. Information of this storage location preferably includes an IP (internet protocol) address and/or URL (uniform resource locator). Description will now be made assuming that the information of the storage location includes an URL or so, for example.

The image compressing apparatus provided in the server apparatus 301 may have one of various types of configurations depending on a particular use thereof, and, has a function of, upon re-compressing an original image (since the original image is generally in state as being already compressed, the term 're-compression' is used for an operation of compressing such once-compressed image data again), the storage location (URL, IP address or so) of the original image may be recorded in a header of the thus-generated image file, or the storage location of the thus-generated child image file may be recorded in a header of the original parent image file. With a use thereof, a history of the image file can be obtained therefrom. This scheme may also be applied in a case where the image file is divided (into layers, or so, as mentioned in the description of the fifth embodiment) upon the re-compression operation or so (will be described later with reference to FIG. 48).

As the original file is stored in an internet-reachable location, it is possible to easily reach the original image from information added to the re-compressed (child) image file. In other words, since the URL or so of the original parent image file is written in the header of the re-compressed child image file, it is possible that, even a copy is taken (as a child file) from the original parent image file such as a photograph, a video or so in any location, this original image file can be reached from the child copy file.

According to the sixth embodiment of the present invention, as shown in FIG. 47, the image compressing apparatus 301 includes an image inputting part 311, an image compressing part 312 and a storage location information adding part 313. The image inputting part 311 inputs, for example, an image to be compressed. In this example, as the digital camera 302 is connected to the PC 303 (or, in case the digital camera 302 has a communication function, it directly sends out the data), a photograph image Po (already compressed) taken thereby is registered in the image DB of the server apparatus 301. The image compressing part 312 then compresses (re-compresses) the to-be-compressed image Po input by the image inputting part 311. Then, the storage location information adding part 313 adds the URL (expressed as <URL: O1> in the figure) at which the to-be-compressed image Po is stored, to the header part of code data Ps upon generating the code data from the to-be-compresses image Po.

According to a first variant of the sixth embodiment of the present invention, in addition to the above-described image inputting part 311, image compressing part 312 and storage location information adding part 313 in the sixth embodiment, a compressed image outputting part 314, a second storage location information adding part 315 and a to-be-compressed image outputting part 316 are provided in the apparatus 301. The storage location information adding part 313 adds the URL (expressed as <URL: O1> in the figure) at which the to-be-compressed image Po is stored, to the header part of code data Ps of the compressed image generated by the image compressing part 312 upon generating the code data Ps from the to-be-compresses image Po, as in the sixth embodiment. The compressed image outputting part 314 outputs the compressed image Ps to a predetermined output destination PC 305. The second storage location information adding part 315 adds the URL (expressed by <URL: S5> in the figure), to which the compressed image Ps is thus output, to the header part of the to-be-compressed image Po. The to-be-compressed image outputting part 316 outputs the to-be-compressed image Po, to which the information is thus added by the second storage location information adding part 315, to the input source from which the original image is first input by the image inputting part 311. In this example, the above-mentioned input source is the image DB 310, and thus, the to-be-compressed image Po to which the information is added and is returned as mentioned above, is used to over-write the original image Po stored in the image DB 310.

According to a second variant of the sixth embodiment of the present invention, the image inputting part 311, image compressing part 312, compressed-image outputting part 314, second storage location information adding part 315 and to-be-compressed image outputting part 316 are provided in the apparatus 301. Then, the compressed-image outputting part 314 outputs the compressed image Ps to the predetermined output destination PC 305. The second storage location information adding part 315 adds the URL (expressed by <URL: S5> in the figure), to which the compressed image Po is thus output, to the header part of the to-be-compressed image Po as in the above-mentioned first variant. The to-be-compressed image outputting part 316 outputs the to-be-compressed image Po, to which the information is thus added by the second storage location information adding part 315, to the input source from which the original image is first input by the image inputting part 311. Also in this example, the above-mentioned input source is the image DB 310, and thus, the to-be-compressed image Po to which the information is added and returned thereto as mentioned above, is used to overwrite the original image Po stored in the image DB 310, as in the above-mentioned first variant.

Figure 48:
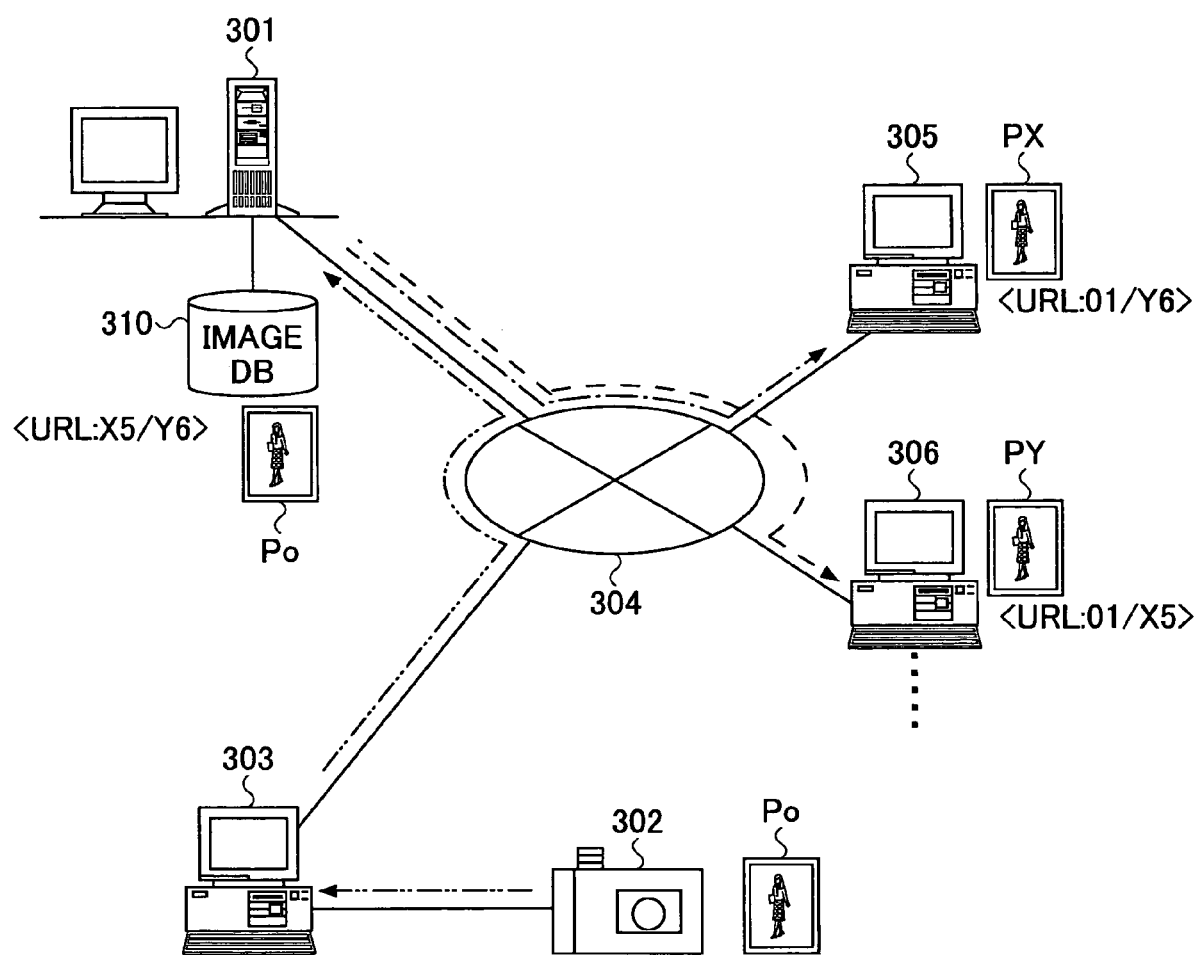
FIG. 48 illustrates an example of a configuration of an image compressing apparatus according to a seventh embodiment of the present invention.

FIG. 48 illustrates an image compressing apparatus according to a seventh embodiment of the present invention. Description will now be made also assuming a network system shown similar to that described above with reference to FIG. 47 is applied. In the seventh embodiment, it is assumed that a plurality of different types of re-compressed images are generated from dividing an original image Po in one of various manners, such as tile dividing, component dividing, layer dividing and so forth, as in the above-mentioned fifth embodiment.

According to the seventh embodiment of the present invention, as shown in FIG. 48, the image compressing apparatus 301 includes an image inputting part 311, an image compressing part 312 and a storage location information adding part 313. The image inputting part 311 inputs, for example, an image to be compressed. Also in this example, as the digital camera 302 is connected to the PC 303 (or, in case the digital camera 302 has a communication function, it directly sends out the data), a photograph image Po (already compressed) taken thereby is registered in the image DB of the server apparatus 301. The image compressing part 312 then compresses (re-compresses) the to-be-compressed image Po input by the image inputting part 311, and thus, in this case, produces a plurality of compressed images Px and Py. Then, the storage location information adding part 313 adds the URL (expressed as <URL: O1> in the figure) at which the to-be-compressed image Po is stored to the header part of each of code data of the compressed images Px and Py upon generating the code data from the to-be-compresses image Po.

According to a first variant of the seventh embodiment of the present invention, in addition to the above-described image inputting part 311, image compressing part 312 and storage location information adding part 313 in the sixth embodiment, a compressed image outputting part 314, a second storage location information adding part 315 and a to-be-compressed image outputting part 316 are provided in the apparatus 301. In this first variant, the storage location information adding part 313 adds the URL (expressed as <URL: O1> in the figure) at which the to-be-compressed image Po is stored to the header part of the code data of each of the compressed images Px and Py generated by the image compressing part 312 upon generation of the code data of the compressed images Px and Py from the to-be-compresses image Po, as in the seventh embodiment. The compressed image outputting part 314 outputs the compressed images Px and Py to predetermined output destinations, i.e., the PCs 5 and 6 (X5 and Y6), respectively. The second storage location information adding part 315 adds the respective URLs (expressed by <URL: X5 and Y6> in the figure), to which the compressed image Po is thus output, to the header part of the to-be-compressed image Po. The to-be-compressed image outputting part 316 outputs the to-be-compressed images Po, to which the information is thus added by the second storage location information adding part 315, to the input source from which the original image is first input by the image inputting part 311. In this example, the above-mentioned input source is the image DB 310, and thus, the to-be-compressed image Po to which the information is added and is retuned as mentioned above is used to overwrite the original image Po in the image DB 310.

According to a second variant of the seventh embodiment of the present invention, the image inputting part 311, image compressing part 312, compressed-image outputting part 314, second storage location information adding part 315 and to-be-compressed image outputting part 316 are provided in the apparatus 301. Then, the compressed-image outputting part 314 outputs the plurality of compressed images Px and Py generated by the image compressing part 312, to the predetermined output destinations PC 305 and PC 306 (X5 and Y6), respectively, as in the first variant. The second storage location information adding part 315 adds the respective URLs (expressed by <URL: X5/Y6> in the figure), to which the compressed images Px and Py are thus output respectively, to the header part of the to-be-compressed image Po as in the above-mentioned first variant. The to-be-compressed image outputting part 316 outputs the to-be-compressed image Po, to which the information is thus added by the second storage location information adding part 315, to the input source from which the original image is first input by the image inputting part 311. Also in this example, the above-mentioned input source is the image DB 310, and thus, the to-be-compressed image Po to which the information is added is used to overwrite the original image Po in the image DB 310, as in the above-mentioned first variant.

According to a third variant of the seventh embodiment of the present invention, the image inputting part 311, image compressing part 312, storage location information adding part 313, and compressed-image outputting part 314 are provided in the apparatus 301. In this third variant, in each of the above-mentioned seventh embodiment and first and second variants thereof, the compressed-image outputting part 314 outputs the plurality of compressed images Px and Py generated by the image compressing part 312, to the predetermined output destinations PC 305 and PC 306 (X5 and Y6), respectively, as in the first variant. Then, in this case, the second storage location information adding part 315 adds the URL (expressed by <URL: Y6> or <URL; X5>, in the figure), to which another compressed image Py or Px is output, to the header part of the compressed image Px or Py, to each other. Thus, the compressed image Px dispatched to the PC 305 has the URL Y6 of the PC 306 added thereto, while the compressed image Py dispatched to the PC 306 has the URL X5 of the PC 305 added thereto.

According to a fourth variant of the seventh embodiment of the present invention, the image inputting part 311, image compressing part 312, compressed-image outputting part 314, second storage location information adding part 315 and to-be-compressed image outputting part 316 are provided in the apparatus 301. In this fourth variant, in each of the above-mentioned first through third variants of the seventh embodiment, the compressed-image outputting part 314 outputs the plurality of compressed images Px and Py generated by the image compressing part 312, to the predetermined output destinations PC 305 and PC 306, respectively. Then, the second storage location information adding part 315 adds the URLs (expressed by <URL: X5/Y6>, in the figure), to which the compressed images Px and Py are output, to the header part of the to-be-compressed image Po.

Thus, according to the sixth and seventh embodiments and variants thereof, during the process of the parent image file Po is modified into the child image files Ps or Px and Py, the respective parent and child image files has location information which indicates the URL or so at which other files are stored. Accordingly, even when these image files having a parent-and-child relation or a brother relation are distributed to various locations, each thereof has information indicating the relation. Accordingly, a user who has one of these files can reach and thus obtain any other file having the predetermined relation, easily.

In the above-mentioned sixth and seventh embodiments and variants thereof, in case of URL is applied to express the storage location, an expression such as 'http://computername.domain/directory/filename' or so may be adopted. 'http' or 'ftp' indicates a protocol used for accessing a file stored in the relevant URL. "computername' indicates the name of the computer, 'domain' indicates the domain (transformable into the IP address by means of a DNS), 'directory' indicates the name of the sub-directory in the file system in the computer, and 'filename' indicates the file name, there.

The IP address denotes an identification number assigned to each computer connected to the IP network such as the Intent, intranet or so. In the scheme of IPv4 which has been wide spread, a numerical value of 32 bits including 4 sets, each including 8 bits, is used for this purpose, and is expressed by an arrangement of 4 decimal numbers each in the range between 0 and 255, such as '210.145.108.18' or so. Alternatively, in the next generation scheme called IPv6, an address of 128 bits is used. As such an IP address made of a simple arrangement of numerals cannot be remembered easily by human beings. Therefore, a name may be assigned for a computer such as a domain name, and, in such a case, a system called DNS is used for mutual transformation between the IP address and the domain name assigned.

According to the above-mentioned sixth or seventh embodiment, or any of the variants thereof, as will be illustrated now, the storage location of the original image file can be written into an image file of re-compressed image, or vice versa.

First, with a use of the digital camera 302, an original image is uploaded into a server connected via the Internet, for example, and the location at which the uploaded data is stored is expressed in a form of URL. In other words, the storage location of the original image file is expressed by URL. Then, according to a request, re-compression (extraction of a specific resolution, extraction of a specific spatial part, extraction of a specific color plane or so) is performed on the original image. At this time, URL of the original file is additionally written into a header part of the thus-generated image file, which is then stored somewhere.

According to the above-described configuration of any one of these embodiments, even in case of generating a thumbnail image from an original image via a compressing operation, re-compressing operation or so, as URL or so of the original image file is additionally written in the header of the thus-generated thumbnail image file, the original image file can be reached easily as needed as mentioned above. In other words, in a case of creating the thumbnail image from the original image, the original image itself may not be stored together with the thus-obtained thumbnail image in many cases. In such a case, after that, the user may wish to obtain the complete image data which originates from the thumbnail image for some reason. However, in some case, it may not be easy to again reach the same original image unless relevant information such as the URL at which the original image, from which the relevant thumbnail image was created, is stored, is specially recorded. However, according to the present invention, even in such a case, the user can easily reach the original image with a use of the URL additionally written into the header of the thumbnail image as mentioned above. When creating such a thumbnail image from an original image, only a part of the information of the original image is used as mentioned above in the description of the fifth embodiment, while the other remaining part of the information of the original image is not used. This may be said, in other words, that 'the remaining information of the original image is lost'. In fact, for example, after the thumbnail image is generated from the original image, the user may forget where the original image is stored. Such a situation may be expressed by 'a partial loss of the information of the original image', or 'the information of the original image is partially lost'.

According to the present invention, with a use of information of storage location such as URL additionally written in the header of a relevant child image file, an original parent image from which the child image is created can be easily reached. In other words, the user can easily obtain the complete image data which includes the information which was once lost upon creating the child image file, with a use of the storage location information added to the header of the child image file. Thereby, when the user wishes to obtain a third image which is larger or finer than a second image which the user has in hand currently, the user can easily reach the original first image from the second image with a use of the location information added to the header of the second image. Then, after reaching the original first image of the second image, the user can use this original first image for creating therefrom the third image which is larger or finer than the second image. Thereby, the user should not always hold the original first image having a large data size and thus can work with the second image of an effectively reduced data size. As a result, the user can improve the efficiency of the work. Then, only in a case where the user wish to use the original first image with the large data size, the user can easily reach it with a use of the location information included in the header of the second image file.

As to the above-mentioned additional writing of the location information to the header of a second image, a header part of an image file generated according to JPEG 2000 may be preferably used. It is also possible to utilize a header part of an image file generated according to the conventional JPEG scheme for the same purpose.

As described above, according to the JPEG 2000 scheme (ISO/IEC FCD 15444-1), while a first original image is stored in a high-definition state, a second image can be created by extracting a part of the first original image, which part is a part of the first original image having a specific resolution, a specific image quality or so. By applying this method, it becomes possible to output (display, print or transmit) a thumbnail image or so as mentioned above.

Hereinafter, description will be made assuming that coded data (referred to as compressed code data, hereinafter) processed in each embodiment of the present invention is coded data of a still image according to JPEG 2000 (ISO/IEC FCD 15444-1) or coded data of a motion picture according to Motion-JPEG 2000 (ISO/IEC FCD 15444-3). Motion-JPEG 2000 is directed to motion picture in which a plurality of consecutive still images are used as frames, and coded data of each frame is according to JPEG 2000, while a file format thereof is slightly different from JPEG 2000.

JPEG 2000 is an image compression/decompression scheme following JPEG and becomes an international standard in 2001. The algorithm thereof is, for example, described in detail in 'Next Generation Image Coding Scheme JPEG 2000' (written by Yasuyuki Nomizu, Triceps, Co., Ltd.), for example. The algorithm of JPEG 2000 will now be described in a range needed for describing the embodiments.

The hierarchical coding/decoding algorithm of JPEG 2000 was already described above with reference to FIGS. 30 through 40, and duplicated description will be omitted.

Figure 49:
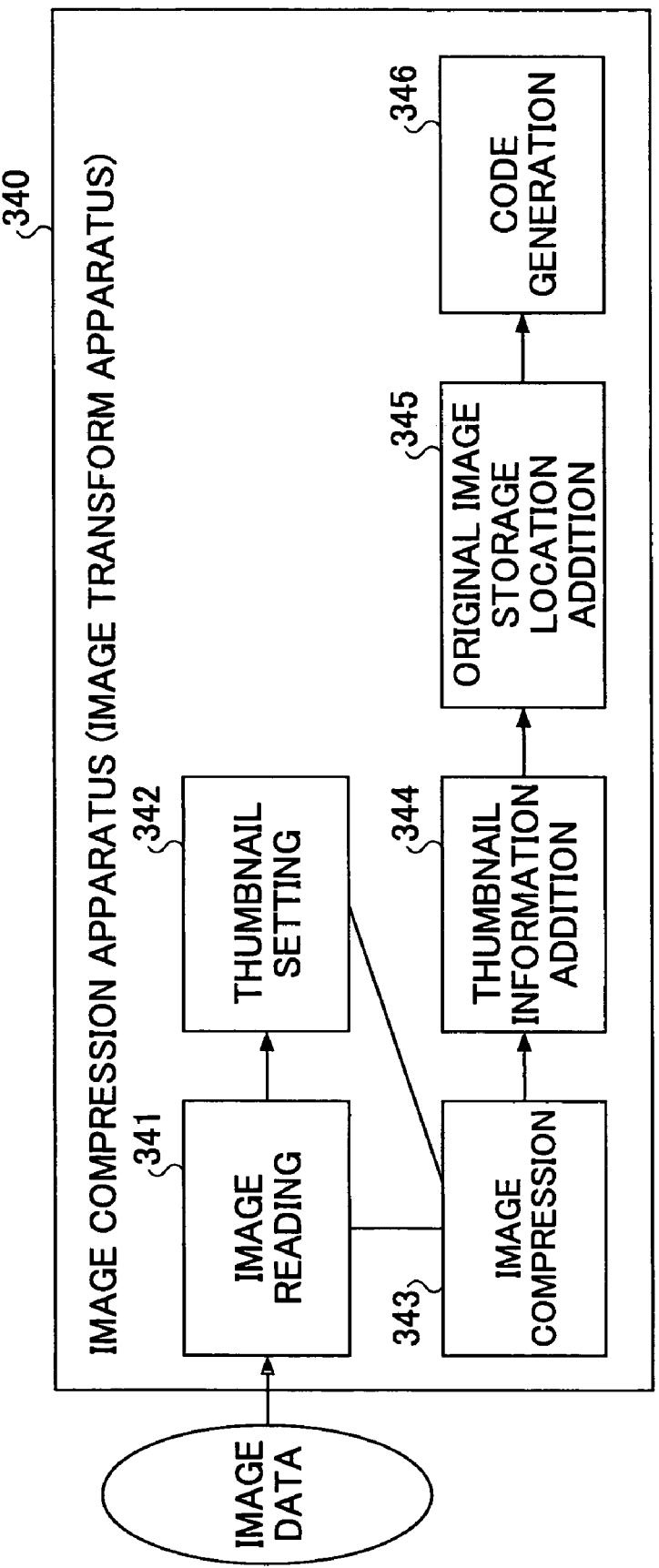
FIG. 49 illustrates an example of a functional block diagram of an image compressing apparatus according to an eighth embodiment of the present invention.
Figure 50:
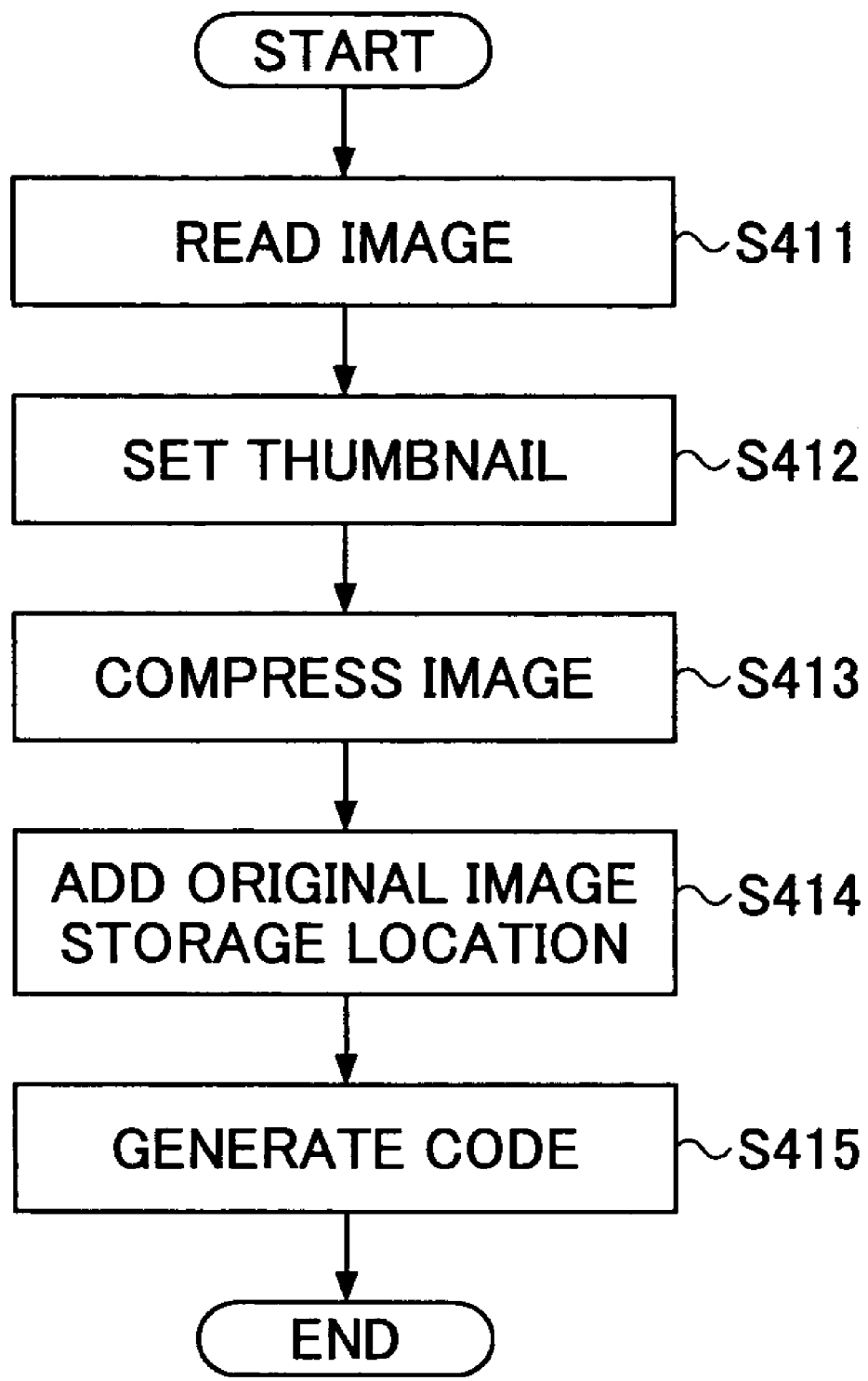
FIG. 50 illustrates an operation flow chart illustrating operation of the image compressing apparatus shown in FIG. 49.

FIG. 49 shows a functional block diagram illustrating an image compressing apparatus 340 according to an eighth embodiment of the present invention, which achieves the present invention in an aspect same as that of the above-mentioned sixth, seventh embodiments, and the variants thereof. FIG. 50 shows an operation flow chart illustrating an image compressing method which is executed in the apparatus 340 shown in FIG. 49, also according to the eighth embodiment of the present invention.

The image compressing apparatus in the eighth embodiment also generates compressed code data, and includes a thumbnail information setting part 342 and a thumbnail information adding part 344, as shown in FIG. 49. This apparatus 340 may be referred differently as 'image transform apparatus' since it handles not only not-yet compressed image data but also once-compressed image data, and transforms the given image data into a form by which, generation of a thumbnail image, or recording (additionally writing) of storage location information thereto can be easily made. With reference to FIG. 49, description will now be made assuming that the image compressing apparatus (image transform apparatus) 340 includes an image inputting part 341, the thumbnail information setting part 342, an image compressing part 343, the thumbnail information adding part 344, an original image storage location adding part 345, and a code generation part 346.

The thumbnail information setting part 342 sets one or a plurality of forms of thumbnail information as in the above-mentioned fifth embodiment. The thumbnail information adding part 344 adds the thus-set forms of (may be one or some of the set forms of) thumbnail information to the header part of code data during a code data forming process.

With reference to FIG. 50, the image compressing apparatus 340 first reads image data with the image reading part 341 in Step S411, and sets thumbnail information with the thumbnail information setting part 342 in Step S412. It is also possible that the thumbnail information setting part 442 previously sets the thumbnail information. Then, the image compressing part 343 compresses the image in Step S413. After that, the original image storage location adding part 345 add information indicating the storage location of the original image to the compressed image in Step S414. Then, the thumbnail information adding part 344 adds the thumbnail information set in Step S412 to the compressed image data, and then, the code generating part 346 generates code data therefrom in Step S415. It is noted that, in this example, the code generating part 346 generates codes after the thumbnail information adding part adds the thumbnail information to the compressed data. However, it is also possible that the thumbnail information is added during generation of codes by the code generating part 346.

An example of a location where the storage location information (URL or so) or the thumbnail information is recorded is the COM marker shown in FIG. 39, the file format XML boxes shown in FIG. 40, the file format UUID boxes shown in FIG. 40 or so. Any other part may also be applied as the location of recording the thumbnail information. An example of an XML description adding the thumbnail information '3LL', for example, is shown below:

```
<?xml version="1.0" encoding="Shift-JIS"?>
<!DOCTYPE html
    PUBLIC "-//W3C//DTD XHTML 1.0 Strict//EN"
    "http://www.w3.org/TR/xhtml1/DTD/xhtml1-strict.dtd">
<html xmlns="http://www.w3.org/1999/xhtml" xml:lang="ja"
lang="ja">
    <head>
        <title>THUMBNAIL</title>
    </head>
    <body>
        <p>3LL </p>
    </body>
</html>
```

Figure 51A:
FIGS. 51A and 51B illustrate an original image and an image output from an image decompressing apparatus after being compressed by the image compressing apparatus according to the present invention.
Figure 51B:
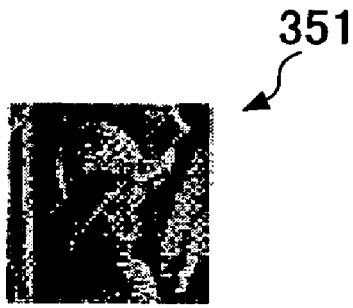

FIGS. 51A and 51B show an original first image (350) and a second image (351) which is obtained from data compression performed on the original first image (350) by the image compressing apparatus 340 according to the eighth embodiment of the present invention, and after that decompression performed on the thus-compressed image by an image decompressing apparatus. Especially, the second image (351) is an image obtained as a result of an instruction is given to the apparatus that a low-resolution image should be output as a thumbnail image.

FIG. 52 shows a table which is included in the well-known Exif standard showing types of available tags and relevant labels (private tags).

The above-mentioned storage location information (in a form of a list of photographs information or so) or thumbnail information may be added by describing the relevant information in a tag which is standardized by the Exif (exchangeable image file format) as shown in FIG. 52. For example, the relevant information may be described as tag information defined by the 'user's comments' included in the list shown in FIG. 52. Other than the method according to Exif as mentioned above, any similar method may be applied, and thus, a URL or IP address at which a list of photographs or so is stored may be written in a header part of a photographic image data file (second image file). The relevant Exif 2.1 standard is disclosed in the URL: 'http://it.jeita.or.jp/document/publica/standard/exif_ja p/jeida49jap.htm'.

According to the image processing apparatus according to the above-mentioned sixth, seventh and eighth embodiments of the present invention, it is possible to generate compressed image data, with a use of which a thumbnail image of relevant image data can be easily output at high speed, without increasing the data size of the compressed image data file as in the above-mentioned fifth embodiment of the present invention. Also, according to the sixth, seventh and eighth embodiments, an original first image file can be easily reached from a re-compressed or divided second image file, or contrary thereto, respective ones of a plurality of re-compressed or divided second image files can be easily reached from the original one.

Furthermore, in the header information of a second image file, location information of storage location such as URL, as well as a plurality of forms of thumbnail information may be recorded as in the fifth embodiment. As a result, it is possible to provide compressed code data from which a plurality of forms of thumbnail images may be created. Furthermore, it becomes easier to reach between image files having a parent-and-child relation or a brother relation.

It is noted that the apparatuses having these functions may be applied as an image dispatching system (image server) which dispatches images via a communication network.

Figure 53:
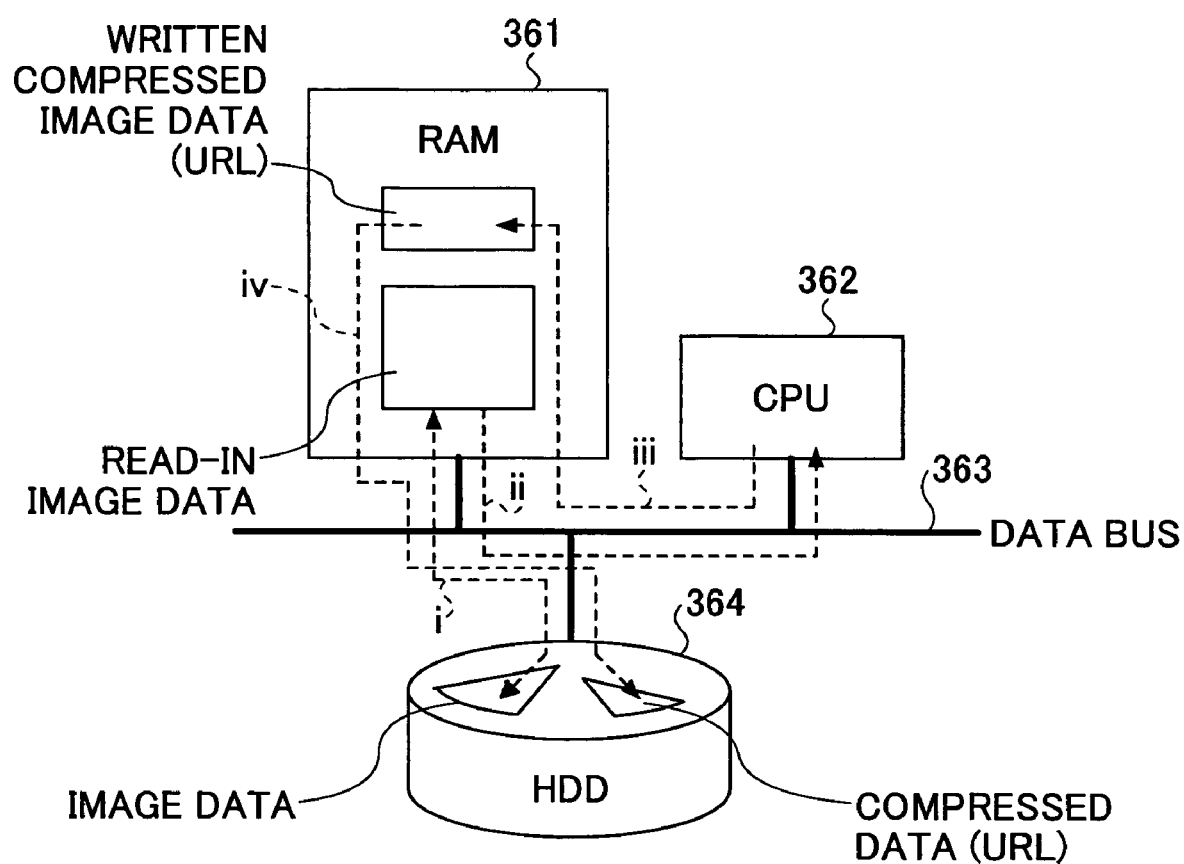
FIG. 53 illustrates an example of configuration of the image compressing apparatus according to the present invention.

FIG. 53 shows a configuration according to a variant of the above-mentioned eighth embodiment of the present invention.

An image compressing apparatus according to the variant of the eighth embodiment according to the present invention includes, as shown, a data bus 363, a RAM 361, a CPU 362 and a HDD 364 connected via the data bus 363. Thereby, from image data of original image, compressed image data is generated having the above-mentioned storage location information or thumbnail information added thereto, which compressed image data is then stored in the HDD 364.

In Step 'i', the image data of original image (or once compressed image data) is read out of the HDD 364 according to an instruction of the CPU 362, the thus-read-out data being then written into the RAM 361. Then, the CPU 362 reads the image data from the RAM 361, so as to obtain wavelet coefficients therefrom, and after that, according to the storage location information (URL information or so) adding processing or thumbnail information adding processing described above in the description of the eighth embodiment of the present invention, produces compressed image data thus having the storage location information or thumbnail information added thereto, in Step 'ii'. The CPU 362 writes the thus-produced compressed image data with the storage location information or thumbnail information into another area of the RAM 361 in Step 'iii'. Then, according to an instruction of the CPU 361, the compressed image data with the storage location information or thumbnail information is written into the HDD 364 in Step 'iv'.

With reference to FIGS. 54 through 62, ninth through sixteenth embodiments of the present invention, which embody respective particular basic functions of the above-described sixth through eighth embodiments and the variants thereof, will now be described in a diagrammatic manner.

Figure 54:
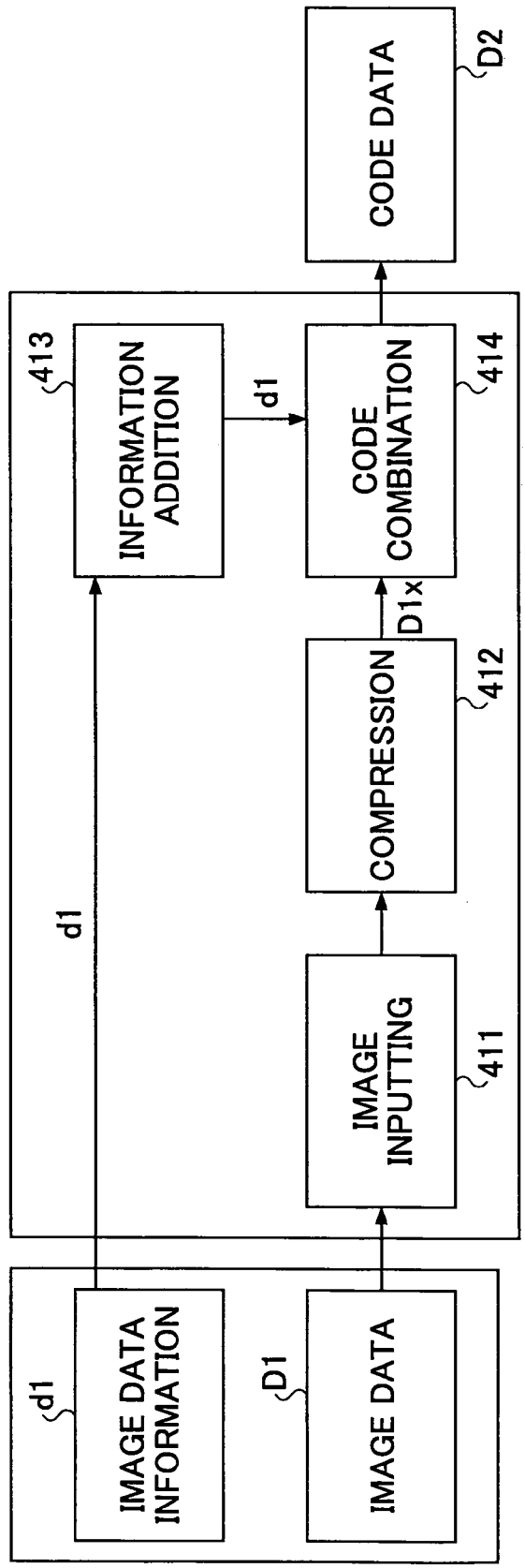
FIG. 54 illustrates a block diagram of a basic configuration according to a ninth embodiment of the present invention.

FIG. 54 shows a block diagram of an information processing apparatus according to a ninth embodiment of the present invention. As shown, the information processing apparatus includes an image inputting part 411, a compressing part 412, an information adding part 413 and a code combining part 414. The image inputting part 411 inputs original image data D1 externally, and is then compressed by the compressing part 412. On the other hand, the information adding part 413 supplies image data information d1 which is predetermined information concerning the above-mentioned original image data D1. The code combining part 414 produces final code data D2 by adding the additional information supplied by the information adding part 413 to the image data D1x having undergone data compression and coding by the compressing part 412.

Figure 55:
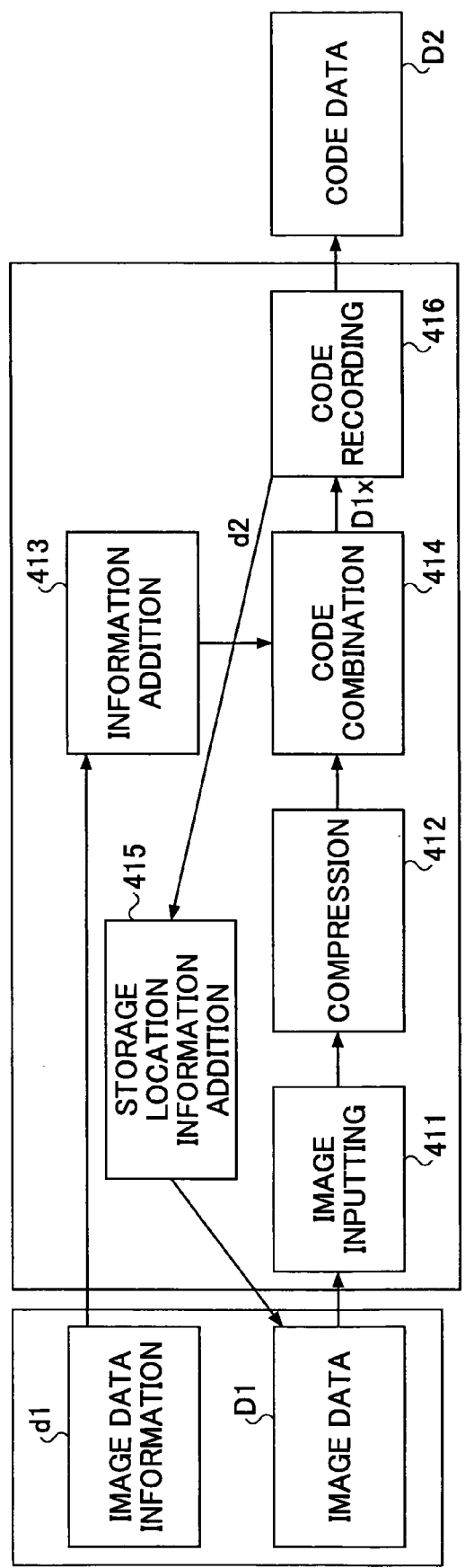
FIG. 55 illustrates a block diagram of a basic configuration according to a tenth embodiment of the present invention.

FIG. 55 shows a block diagram of an information processing apparatus according to a tenth embodiment of the present invention. As shown, the information processing apparatus includes, in addition to the image inputting part 411, compressing part 412, information adding part 413 and code combining part 414 included in the above-described configuration of the ninth embodiment shown in FIG. 54, a storage location information adding part 415 and a code recording part 416. Same as in the above-mentioned ninth embodiment, the image inputting part 411 inputs original image data D1 externally, and is then compressed by the compressing part 412. On the other hand, the information adding part 413 supplies image data information d1 which is predetermined information concerning the above-mentioned original image data D1. The code combining part 414 produces code data D2 by adding the additional information supplied by the information adding part 413 to the image data D1x having undergone data compression and coding by the compressing part 412. The thus-produced code data D2 is supplied to the code recording part 416.

The code recording part 416 records the code data D2 in which the additional information d1 is added to the compressed image data D1x. At this time, the code recording part 416 supplies information d2 concerning the recording medium in which the code data D2 is thus recorded (or information concerning the relevant recording device) to the storage location information adding part 415. The storage location information adding part 415 receiving this information d2 adds the thus-received information d2 concerning the recording medium in which the code data D2 is thus recorded (or information concerning the relevant recording device) to the original image data D1 (stored in the originally stored location) as shown.

Figure 56:
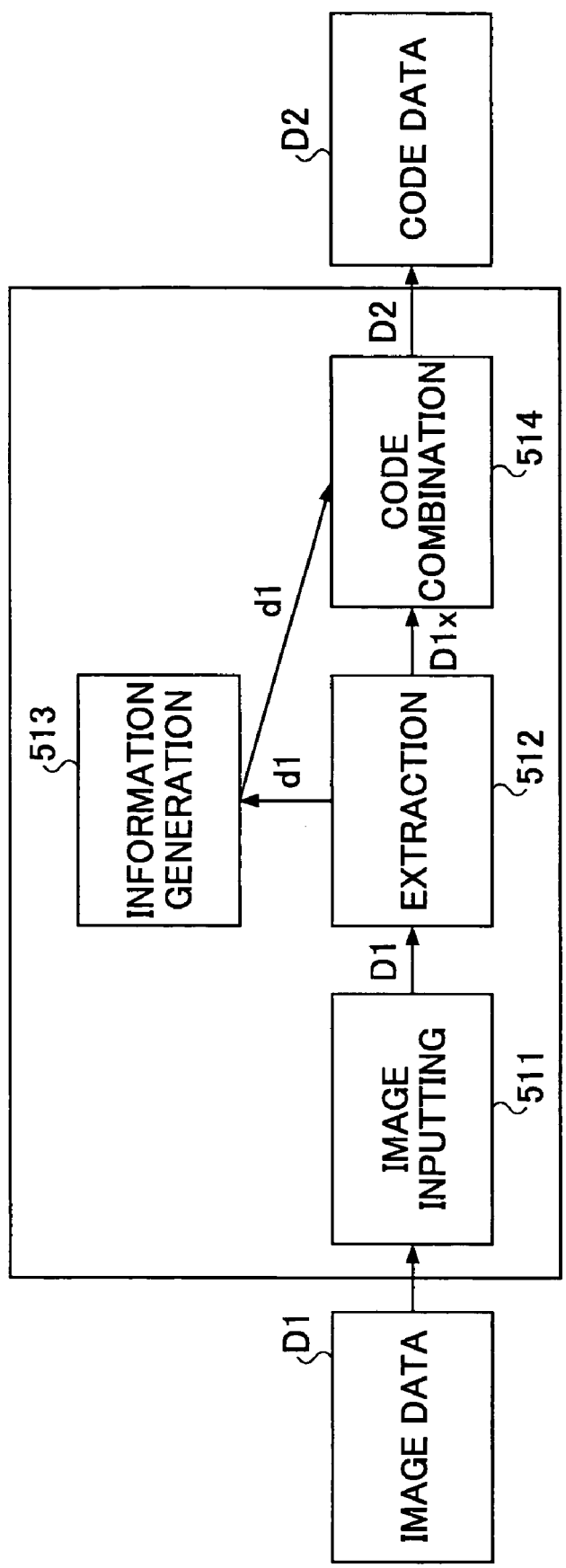
FIG. 56 illustrates a block diagram of a basic configuration according to an eleventh embodiment of the present invention.

FIG. 56 shows an information processing apparatus in an eleventh embodiment of the present invention. As shown, the information processing apparatus includes an image reading part 511, an extracting part 512, a code combining part 514, and an information generating part 513. In this case, compression of image data is not necessary, but, an image data part D1x is extracted from given image data D1 by the extracting part 512, and is thus utilized as a thumbnail image or so. Extraction in this case can be achieved by specifying a range of each of four types of classification concepts well known in a technical field concerning image compressing method according to JPEG 2000, i.e., resolution (R), position (P), color (C; component) and image quality (L; layer), for example, as in the fifth embodiment. In fact, according to JPEG 2000, original image data is output in a form of a stream, for example, including divisions of respective elements of the above-mentioned four types of classification concepts, R, P, C and L, during an image data coding process.

The above-mentioned resolution R of the four classification concepts will now be described. For example, in the configuration shown in FIGS. 32A through 32D described above, the resolution increases gradually in the stated order of 3LL, 2LL, 1LL and 0LL. For example, when 2LL is specified as the range to be extracted, an image (for example, utilizable as a thumbnail image) reduced from the original image of 0LL can thus be obtained. The position P will now be described. By specifying tiles, precincts or code blocks described above with reference to FIG. 34 as a range to be extracted, for example, the relevant spatial position range can be specified. Next, the color element C will now be described. For example, a case may be assumed to specify any one of the respective color components of R, G and B described above with reference to FIG. 33 as a range to be extracted. Finally, the quality element L will now be described. In this case, a layer described above with reference to FIGS. 35 through 37 may be specified. In other words, a case may be assumed to specify a bit plane to be applied. Thus, it is possible to arbitrarily specify ranges of the four respective classification concepts independently from code data obtained from a coding process according to JPEG 2000 and extract the thus-specified part to be utilized.

Returning to FIG. 56, the information generating part 513 takes predetermined information d1 concerning the extraction processing upon extraction of image data D1x having an arbitrary range for each of the above-mentioned classification elements from the original image code data D1 by the extracting part 512. The thus-taken information d1 may include information, for example, specifying the particular range of each of the above-mentioned classification elements RPCL (resolution, position, component, and layer) upon the extraction, information indicating the data size of the image data thus extracted, or so, as will be described with reference to FIG. 62. The information concerning the extraction thus taken by the information generating part 513 is then supplied to the code combining part 514. The code combining part 514 then combines the extracted information D1x and the information d1 concerning the extraction so as to produce final code data D2.

According to the eleventh embodiment described above, when the image data D1x which is extracted from the original image data D1 as a part is output, the information d1 concerning the extraction is added to the thus-output image data. Thereby, in case the code data D1 is destroyed by some cause upon utilization of the thus-output code data D2, the code data D1 can be restored from the original image data D1 through an extraction process in the same conditions as those of the initially performed extraction process with reference to the information d1 concerning the extraction included in the code data D2 as long as the information d1 can be read out even from the thus-destroyed code data D1.

Figure 57:
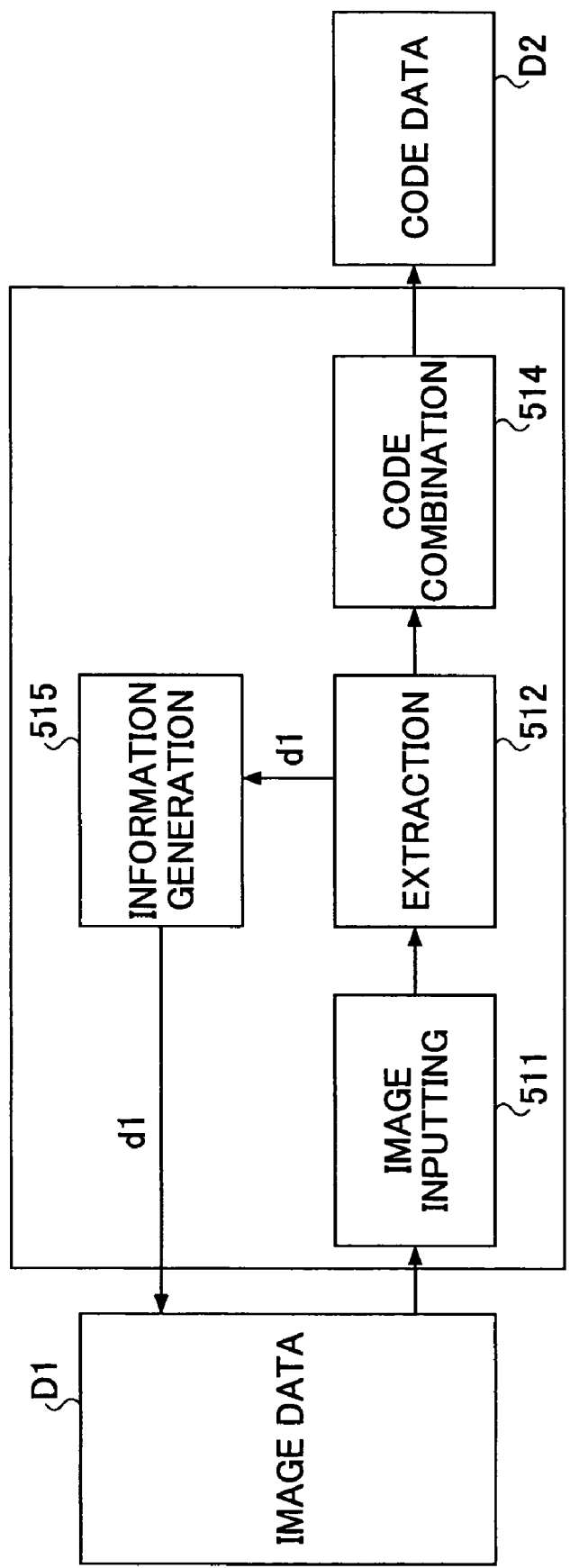
FIG. 57 illustrates a block diagram of a basic configuration according to a twelfth embodiment of the present invention.

FIG. 57 shows an information processing apparatus according to a twelfth embodiment of the present invention. This information processing apparatus has the same configuration as that of the eleventh embodiment described above with reference to FIG. 56 except that the information generating part 515 does not supply the above-mentioned information d1 concerning the extraction to the code combing part 514 but adds the same information d1 to the original image data D1 (stored in the originally stored location), as shown. As the information d1 concerning the extraction is added to the original image data D1, it becomes possible to recognize which type of extracted image was produced from the original image data D1, by reading the information d1 concerning the extraction thus included in the original image data D1. Thus, this scheme is advantageous for data management.

Figure 58:
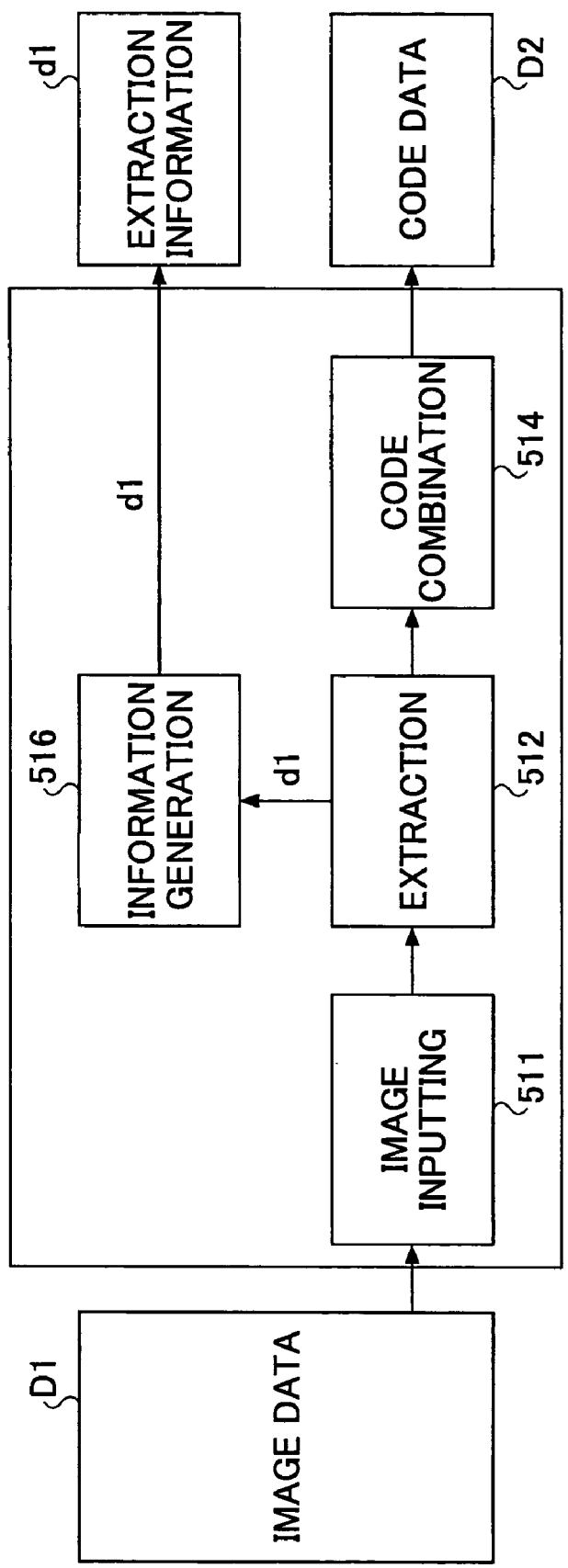
FIG. 58 illustrates a block diagram of a basic configuration according to a thirteenth embodiment of the present invention.

FIG. 58 shows a basic configuration of an information processing apparatus according to a thirteenth embodiment of the present invention. This information processing apparatus has the same configuration as that of the eleventh embodiment described above with reference to FIG. 56 except that the information generating part 515 does not supply the above-mentioned information d1 concerning the extraction to the code combing part 514 but outputs externally the same information d1 as it is, as shown. As the information d1 concerning the extraction is output externally, it becomes possible that a predetermined external management apparatus can manage usage status of the original image data D1 and so forth in a lump. Thus, this scheme is advantageous for data management. It is noted that it is assumed that the above-mentioned external management apparatus stores information indicating a relation between the extracted data D2 and the relevant extraction concern information d1 for each item.

Figure 59:
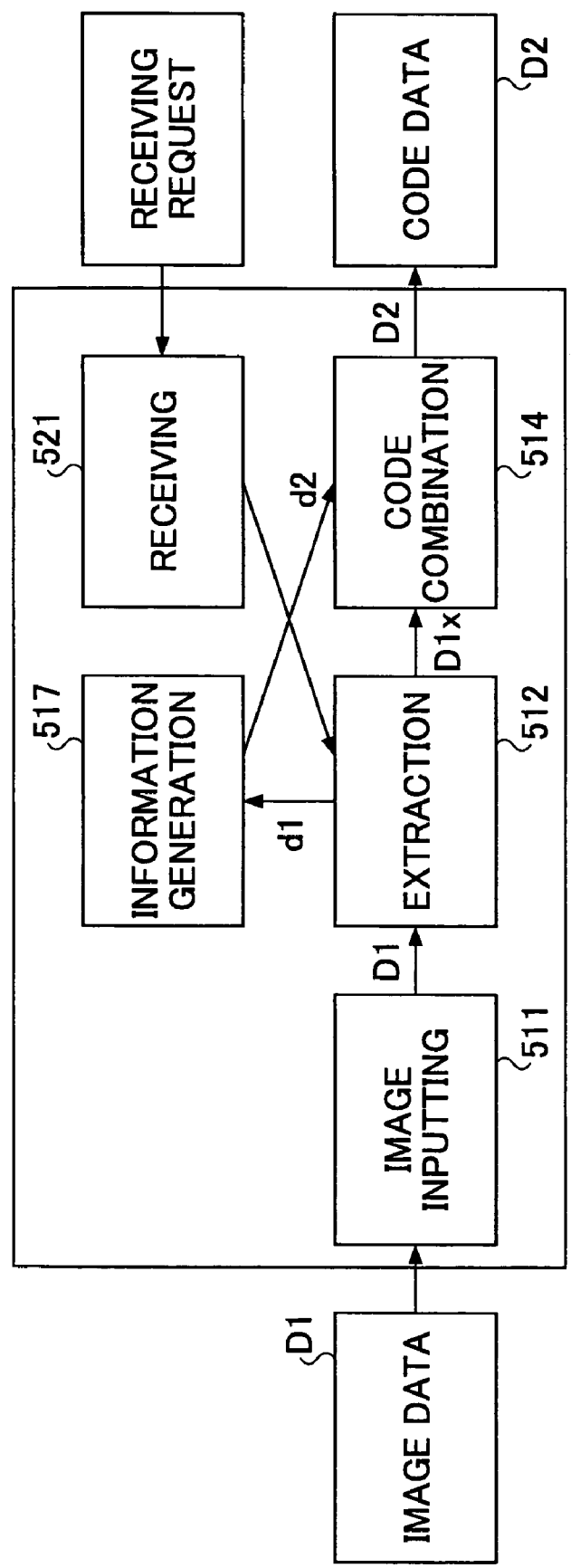
FIG. 59 illustrates a block diagram of a basic configuration according to a fourteenth embodiment of the present invention.

FIG. 59 shows a basic configuration of an information processing apparatus according to a fourteenth embodiment of the present invention. This information processing apparatus is same as the eleventh embodiment described above with reference to FIG. 56 except that a receiving part 521 is additionally provided for receiving externally a data transfer request.

Figure 60:
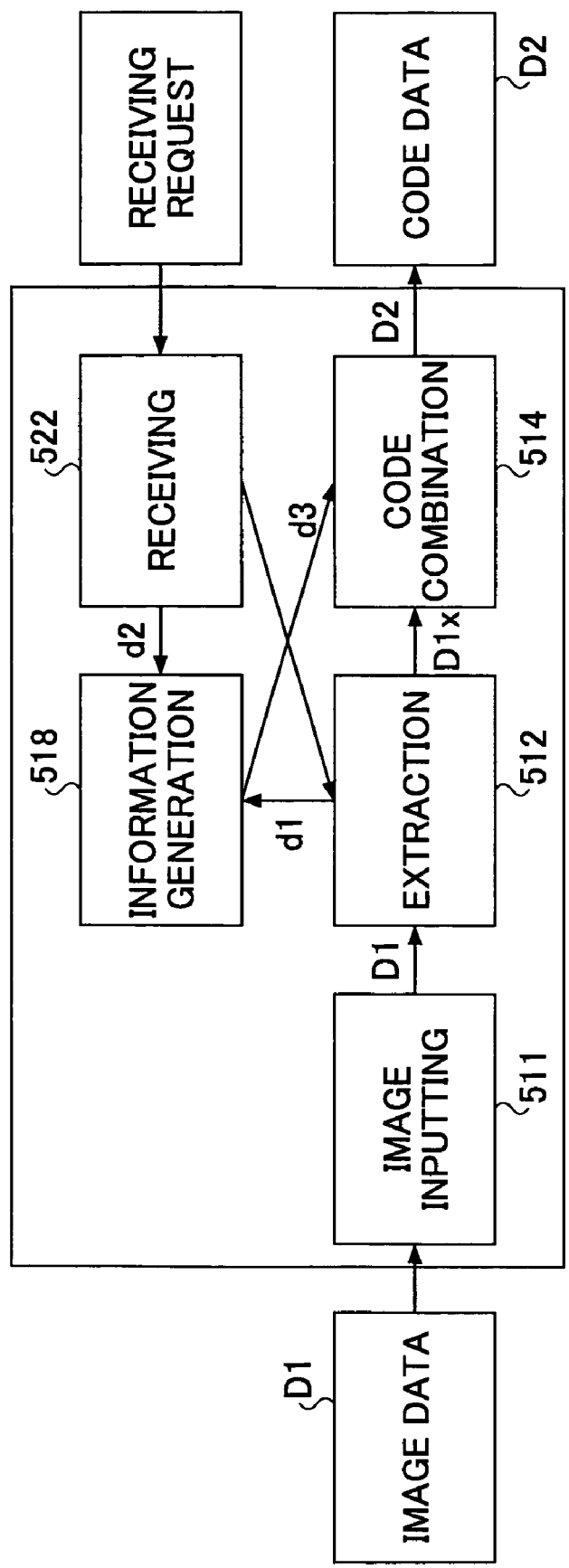
FIG. 60 illustrates a block diagram of a basic configuration according to a fifteenth embodiment of the present invention.

FIG. 60 shows a basic configuration of an information processing apparatus according to a fifteenth embodiment of the present invention. This information processing apparatus is same as the fourteenth embodiment described above with reference to FIG. 59 except that the receiving part 522 supplies information d2 concerning the data transfer request to the information generating part 518.

In the fourteenth embodiment shown in FIG. 59, the receiving part 522 receives a transfer request for extracted data, and the extracting part 512 extracts data from the original data D1 according to the thus-received transfer request. Then, the information d1 concerning the extraction is added to the extracted image data D1x by the information generating part 518, and thus, the final code data D2 is output.

In the fifteenth embodiment shown in FIG. 60, the receiving part 522 supplies information d2 concerning the reception of the extracted-data transfer request externally as in the above-described fourteenth embodiment, to the information generating part 518. The information generating part 518 then produces combined concern information d3 obtained by combining the extraction concern information d1 supplied by the extracting part 512 with the reception concern information d2 supplied by the receiving part 522, and supplies the combined concern information to the code combining part 514. The code combining part 514 adds this combined concern information d3 to the extracted information D1x so as to produce the final code information D2 to be output. Thereby, an external apparatus which has first made the extracted-data transfer request and then has received the thus-output code data D2, reads the above-mentioned reception concern information d2 therefrom, and, thus, can easily make a confirmation with the relevant transfer request of its own. Thus, this scheme is also advantageous for data management.

Figure 61:
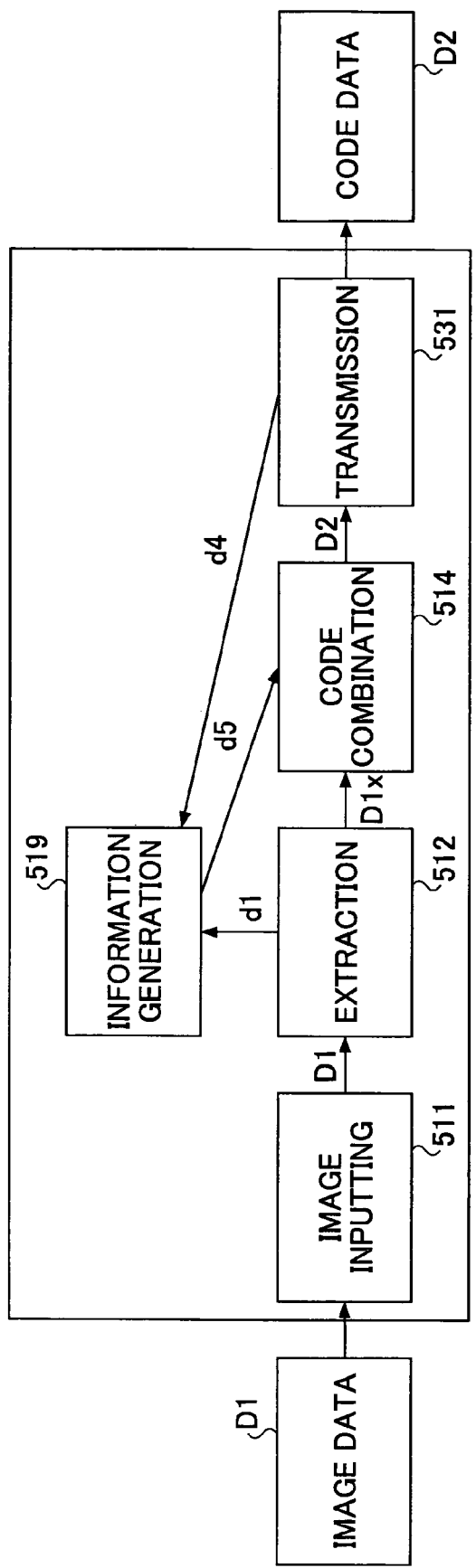
FIG. 61 illustrates a block diagram of a basic configuration according to a sixteenth embodiment of the present invention.

FIG. 61 shows a basic configuration of an information processing apparatus according to a sixteenth embodiment of the present invention. This information processing apparatus is same as the eleventh embodiment described above with reference to FIG. 56 except that a transmitting part 531 transmitting code data externally is additionally provided. In the information processing apparatus according to the sixteenth embodiment, the transmitting part 531 transmits to a predetermined external destination apparatus the code data D2 produced by the code combining part 514. At this time, the transmitting part 531 supplies information d4 concerning the relevant transmission to the information generating part 518. The information generating part 518 then combines the extraction concern information d1 supplied by the extracting part 512 with the above-mentioned transmission concern information d4 so as to produce combined concern information d5, and supplies the same information d5 to the code combining part 514. The code combining part 514 adds the thus-supplied combined concern information d5 to the extracted image data D1x so as to produce the final code data D2 to be output. Thereby, the external destination apparatus which receives this code data D2 reads the transmission concern information d4 therefrom, so as to be able to easily make a confirmation that the thus-received code data D2 is one which is surely addressed to the own apparatus, or so. Thus, this scheme is advantageous for data management.

Any of the information processing apparatuses according to the ninth through sixteenth embodiments of the present invention described above may be achieved by the personal computer shown in FIG. 47 or 48, or by the image compressing apparatus shown in FIG. 53, for example.

FIG. 62 shows items which may be applied as the information d1 added to the extracted data D1x by the information generating part 513 in the configuration described with reference to FIG. 56 or so, the information d1 added to the original image data D1 by the information generating part 515 or 516 in the configuration described with reference to FIG. 57 or 58, the information d1 output to the external managing apparatus, or the information d2, d3 or d4 described above with reference to FIGS. 59, 60 and 61. Thus, attributes of image data itself, attributes of a transmitting-end apparatus (destination) or a receiving-end apparatus (source) (corresponding to the transmission-end information or reception-end information d2 or d4 taken in the configuration of one of the fourteenth through sixteenth embodiments described above with reference to FIGS. 59 through 61), and extraction conditions, listed in FIG. 62, may be arbitrarily applied. As the attribute of image data itself, data size, created date/time, updated date/time, compression method, compression condition or so may be assumed. It is noted that the specification shown in FIG. 62 is basically according to JPEG 2000. As the transmission-end or reception-end attitudes, information concerning the operator, information concerning the apparatus (PC), transfer method or so may be assumed. As the extraction conditions, other than information based on the above-mentioned four types of classification concepts R, P, C and L, information concerning the extraction time taken and so forth may be assumed.

It is noted that, according to the present invention, any one or any combination of various types of information concerning the extraction, reception of transfer request, source of the original image file, destination to which the extracted image file is sent, the original image file itself, the extracted image file itself, and so forth may be added to the original image file or the extracted image file, or sent to the external management apparatus, for the purpose of improving image file management efficiency, or so.

The respective ones of the sixth through sixteenth embodiments of the present invention can be achieved not only in the form of the image compressing apparatuses but also image compressing methods including the steps of executing the processes performed in the respective apparatuses, or programs for causing a computer to execute these methods (software programs mounting the relevant processing contents). Furthermore, it is also possible to achieve the present invention in a form of computer-readable information recording media storing therein the programs (computer-readable recording media storing the relevant processing contents). Furthermore, a system may be provided by which reaching between image files having a parent-and-child relation or a brother relation can be easily achieved through the processes corresponding to the above-described respective embodiments with a use of the above-mentioned program or recording medium. These programs or recording media can be easily achieved with reference to the descriptions of the respective embodiments described above.

Specifically, the recording media applicable to store therein the programs or data needed for executing the functions of the image compressing apparatus/image processing apparatus may include CD-ROM, magneto-optical disk, DVD-ROM, FD, flash memory, or any other various types of ROM or RAM, or the like may be applied for the purpose. Then, a program for achieving one or some of the above-mentioned functions of the image compression, processing or decompression according to any one of the sixth through sixteenth embodiments of the present invention with a computer may be recorded therein, or the thus-produced media may be circulated wide in the market. Thereby, these functions may be easily achieved. In fact, by loading the above-mentioned recording medium into an information processing apparatus such as a computer (general-purpose one or in a form of one mounted in another specialized apparatus), which then reads the program therefrom, and thus, the information processing apparatus is made to operate according to the fifth embodiment. Attentively, the once read out program is stored in an internals storage of the information processing apparatus, and is read out as needed therefrom, and is executed so that the functions of the present invention can be executed accordingly.

Further, the present invention is not limited to the above-described embodiments, and variations and modifications may be made without departing from the basic concept of the present invention.

The present application is based on Japanese priority applications Nos. 2002-336022, 2003-034548, 2003-041529 and 2003-338079, filed on Nov. 20, 2002, Feb. 13, 2003, Feb. 19, 2003 and Sep. 29, 2003, the entire contents of which are hereby incorporated by reference.

What is claimed is:

1. An image processing apparatus, comprising:
a code stream generating part configured to convert image data into two-dimensional wavelet coefficients, quantize the coefficients, and code the quantized coefficients so as to compress the image data and generate a code stream;
an additional information creating part configured to create additional information concerning the image data;
an additional information embedding part configured to embed the created additional information into the code stream as a code in an off-rule zone, which is not decoded by a JPEG 2000 standard rule; and
a terminating code providing part configured to forcibly provide a terminating code at a position before a code length position defined by header information, wherein a zone defined from the position at which the terminating code is provided to the code length position is determined as the off-rule zone.

2. The image processing apparatus as claimed in claim 1, wherein:
said terminating code providing part is configured to provide the terminating code in a main header area of the code stream.

3. The image processing apparatus as claimed in claim 2, wherein:
said terminating code providing part is configured to provide the terminating code before the code length position defined by a PLM marker, which describes a main header packet length.

4. The image processing apparatus as claimed in claim 2, wherein:
said terminating code providing part is configured to provide the terminating code before the code length position defined by a TLM marker, which describes a main header tile length.

5. The image processing apparatus as claimed in claim 2, wherein:
said terminating code providing part is configured to provide the terminating code before the code length position defined by a PPM marker, which collectively describes main header packet headers.

6. The image processing apparatus as claimed in claim 2, wherein:
said terminating code providing part is configured to provide the terminating code before the code length position defined by a COM marker for comments.

7. The image processing apparatus as claimed in claim 1, wherein:
said terminating code providing part is configured to provide the terminating code in an actual code data area of the code stream.

8. The image processing apparatus as claimed in claim 7, wherein:
said terminating code providing part is configured to provide the terminating code before the code length position defined by an SOT marker, which is added at the top of a tile code sequence for starting a tile.

9. The image processing apparatus as claimed in claim 7, wherein:
said terminating code providing part is configured to provide the terminating code before the code length position defined by a PLT marker, which describes a tile header packet length.

10. The image processing apparatus as claimed in claim 7, wherein:
said terminating code providing part is configured to provide the terminating code before the code length position defined by a PPT marker, which collectively describes tile header packet headers.

11. The image processing apparatus as claimed in claim 7, wherein:
said terminating code providing part is configured to provide the terminating code before the code length position defined by a COM marker for comments.

12. A computer-readable medium storing a program for causing a computer included in the image processing apparatus claimed in claim 1 to execute each part of said image processing apparatus recited in claim 1.

13. An image reading apparatus comprising:
a photoelectric device reading an image of an original;
an addition determining part configured to selectively determine additional information concerning the image data read by means of said photoelectric device and to determine whether or not the additional information is to be embedded; and
the image processing apparatus claimed in claim 1 performing image processing including embedding the additional information to the image data read by means of said photoelectric device in case embedding of the additional data is determined by means of said addition determining part.

14. An image forming apparatus, comprising:
the image reading apparatus claimed in claim 13; and
a printer engine configured to form an image onto paper based on image data decompressed from code data by a decompressing part after being read by means of said image reading apparatus, and being processed by the image processing apparatus of said image reading apparatus.

15. The image forming apparatus as claimed in claim 14, further comprising an interface configured to externally transmit the code data obtained from reading image data by means of said image reading apparatus and then processed by the image processing apparatus.

16. An image processing apparatus, comprising:
an inverse converting part configured to decompress, into image data, a code stream generated as a result of converting image data into two-dimensional wavelet coefficients, quantizing the coefficients, and coding the quantized coefficients; and
an off-rule zone information reading part configured to read additional information embedded in an off-rule zone in the code stream as a code, the off-rule zone being not decoded according to a JPEG 2000 standard rule, wherein the off-rule zone is defined from a position at which a terminating code is provided in the code stream to a code length position defined by header information.

17. The image processing apparatus as claimed in claim 16, wherein:
the additional information is created by an additional information creating part, and is embedded into the code stream by an additional information embedding part.

18. The image processing apparatus as claimed in claim 16, further comprising:
an additional information processing part configured to perform processing concerning the image data based on the additional information read by means of said off-rule zone information reading part.

19. The image processing apparatus as claimed in claim 18, wherein:
said additional information processing part is configured to forcibly finish decoding processing upon detecting tampering based on a determination on the additional information read in case the additional information comprises tamper resistance information.

20. The image processing apparatus as claimed in claim 18, wherein:
said additional information processing part is configured to generate an alarm upon detecting tampering based on a determination on the additional information read in case the additional information comprises tamper resistance information.

21. The image processing apparatus as claimed in claim 18, wherein:
said additional information processing part is configured to not output a part having undergone tampering upon detecting the tampering based on a determination on the additional information read in case the additional information comprises tamper resistance information.

22. The image processing apparatus as claimed in claim 18, wherein:
said additional information processing part is configured to perform file arrangement concerning the relevant image data in case the additional information comprises management information for the image data.

23. The image processing apparatus as claimed in claim 18, wherein:
said additional information processing part is configured to perform access control for the relevant image data in case the additional information comprises management information for the image data.

24. The image processing apparatus as claimed in claim 18, wherein:
said additional information processing part is configured to perform filtering processing depending on a respective one of image portions on the relevant image data in case the additional information comprises image position information concerning image area classification according to an image feature including an edge part, a character part, a picture part, and a halftone dot part.

25. The image processing apparatus as claimed in claim 18, wherein:
said additional information processing part is configured to output image data having an image quality according to a payment condition in case the additional information comprises image data having an image quality different from the original image data.

26. A computer-readable medium storing a program for causing a computer included in the image processing apparatus claimed in claim 16 to execute each part of said image processing apparatus recited in claim 16.

27. An image reading apparatus, comprising:
a photoelectric device configured to read an image of an original; and
the image processing apparatus claimed in claim 16 performing decompressing, into image data, code data created from converting image data into two-dimensional wavelet coefficients, quantizing the coefficients, and coding the quantization result so as to compress the image data.

28. An image forming apparatus, comprising:

the image reading apparatus claimed in claim 27; and a printer engine configured to form an image onto paper based on image data decompressed from code data by a decompressing part after being read by means of said image reading apparatus, and being processed by the image processing apparatus of said image reading apparatus.

29. The image forming apparatus as claimed in claim 28, further comprising an interface configured to externally transmit the code data obtained from reading image data by means of said image reading apparatus and then processed by the image processing apparatus.

* * * * *